Aug. 6, 1968    S. JOHNSON    3,395,815
MECHANICAL CAR-PARKING TOWER
Filed Dec. 15, 1964    18 Sheets-Sheet 15

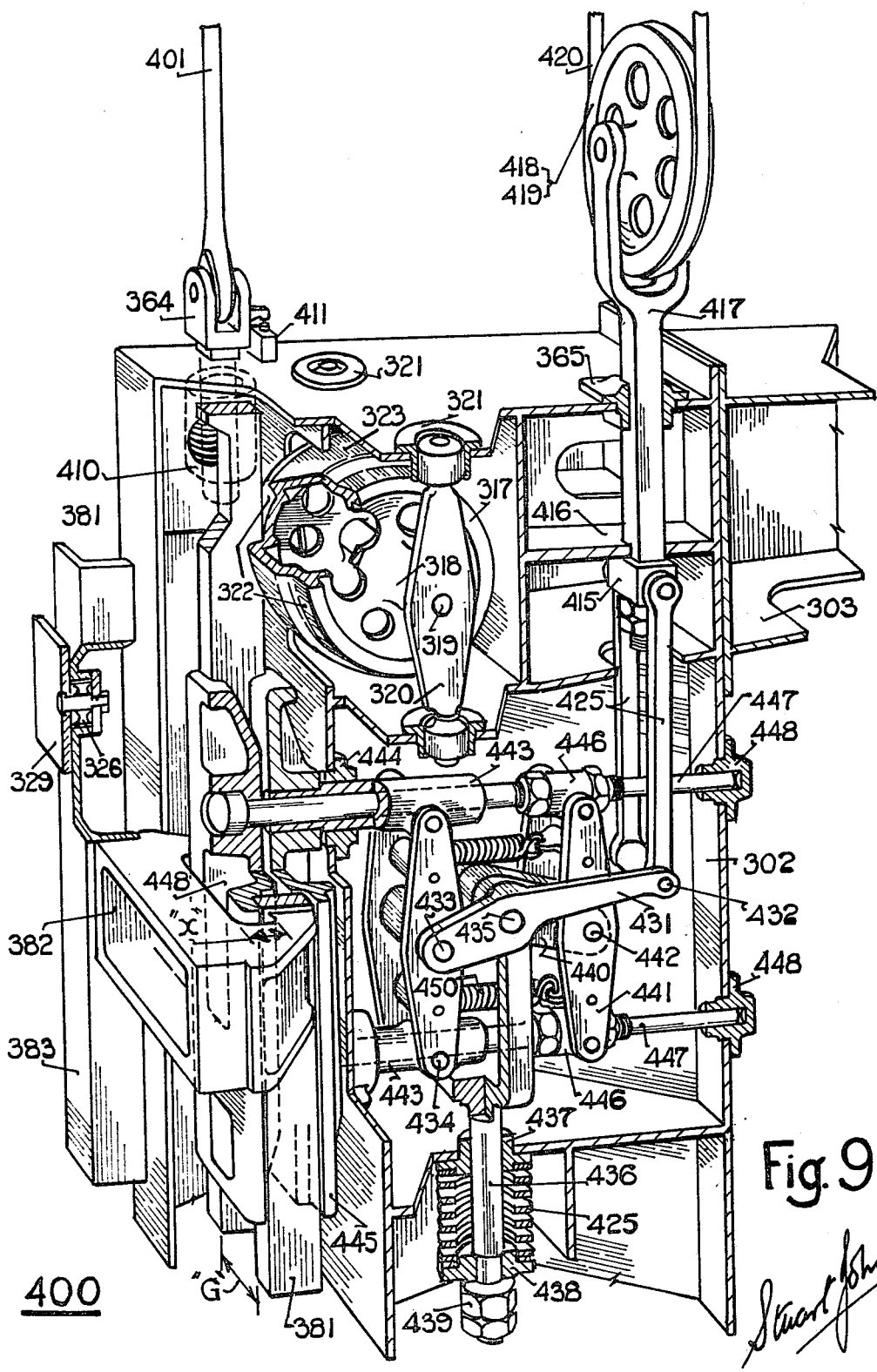

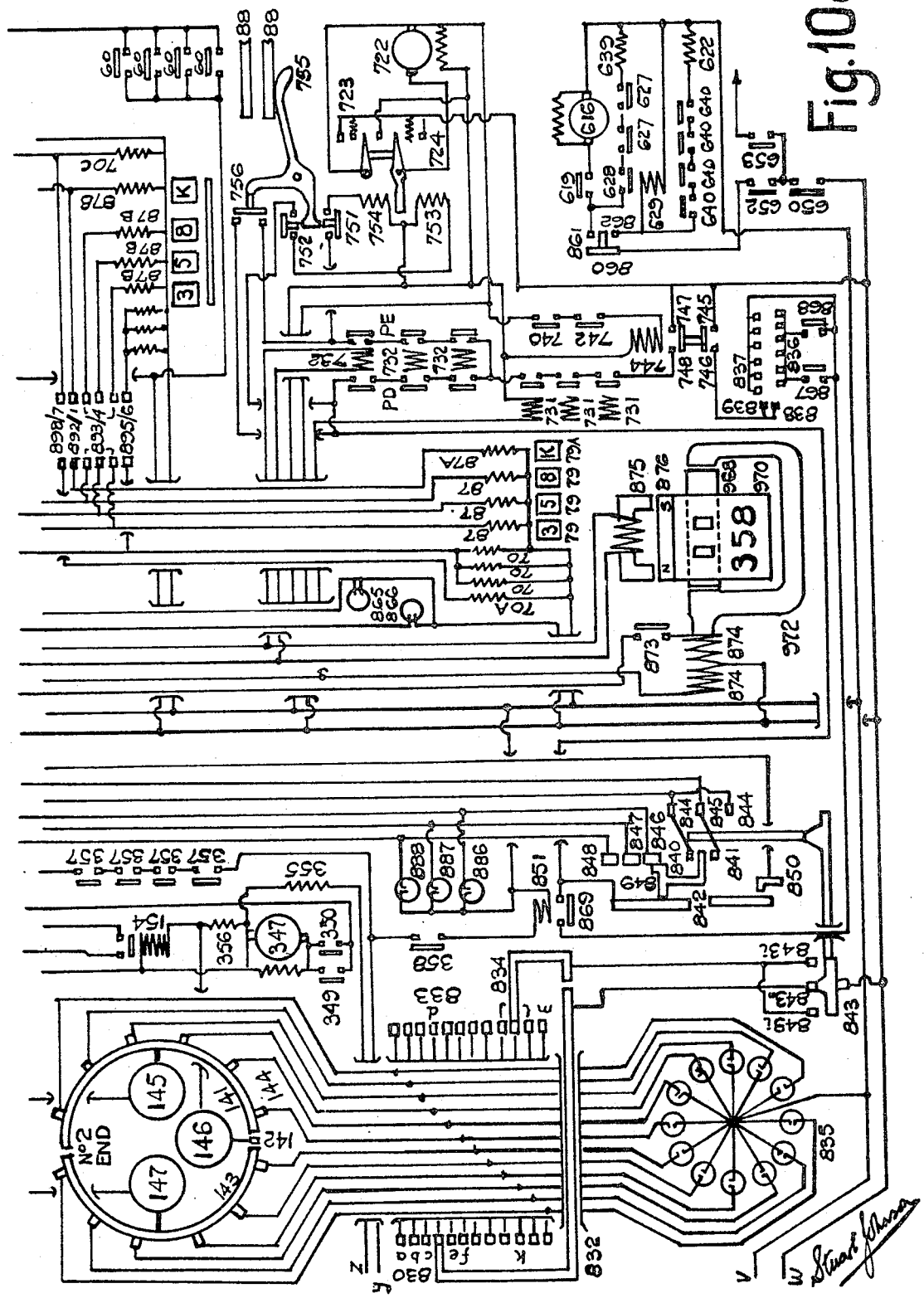

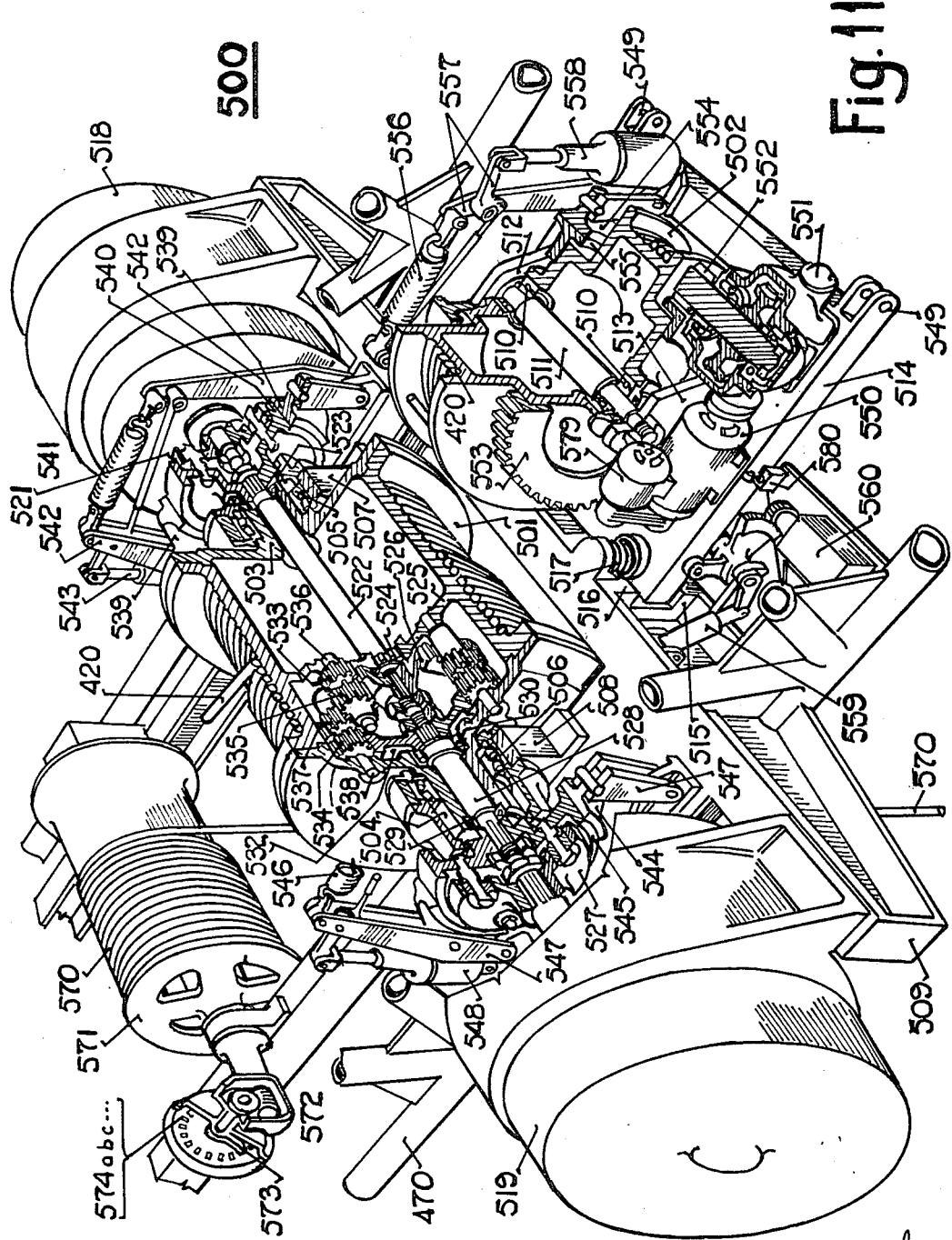

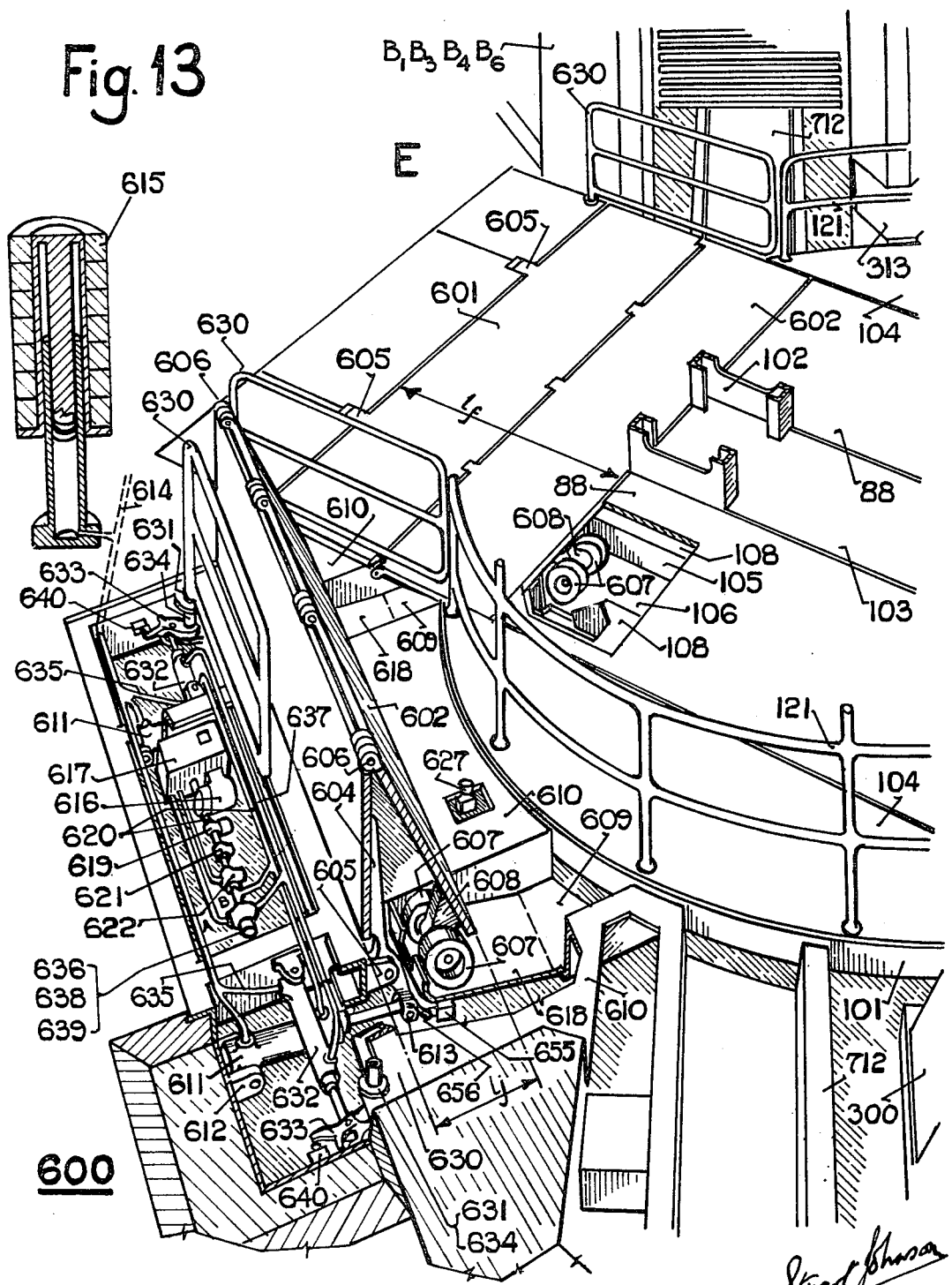

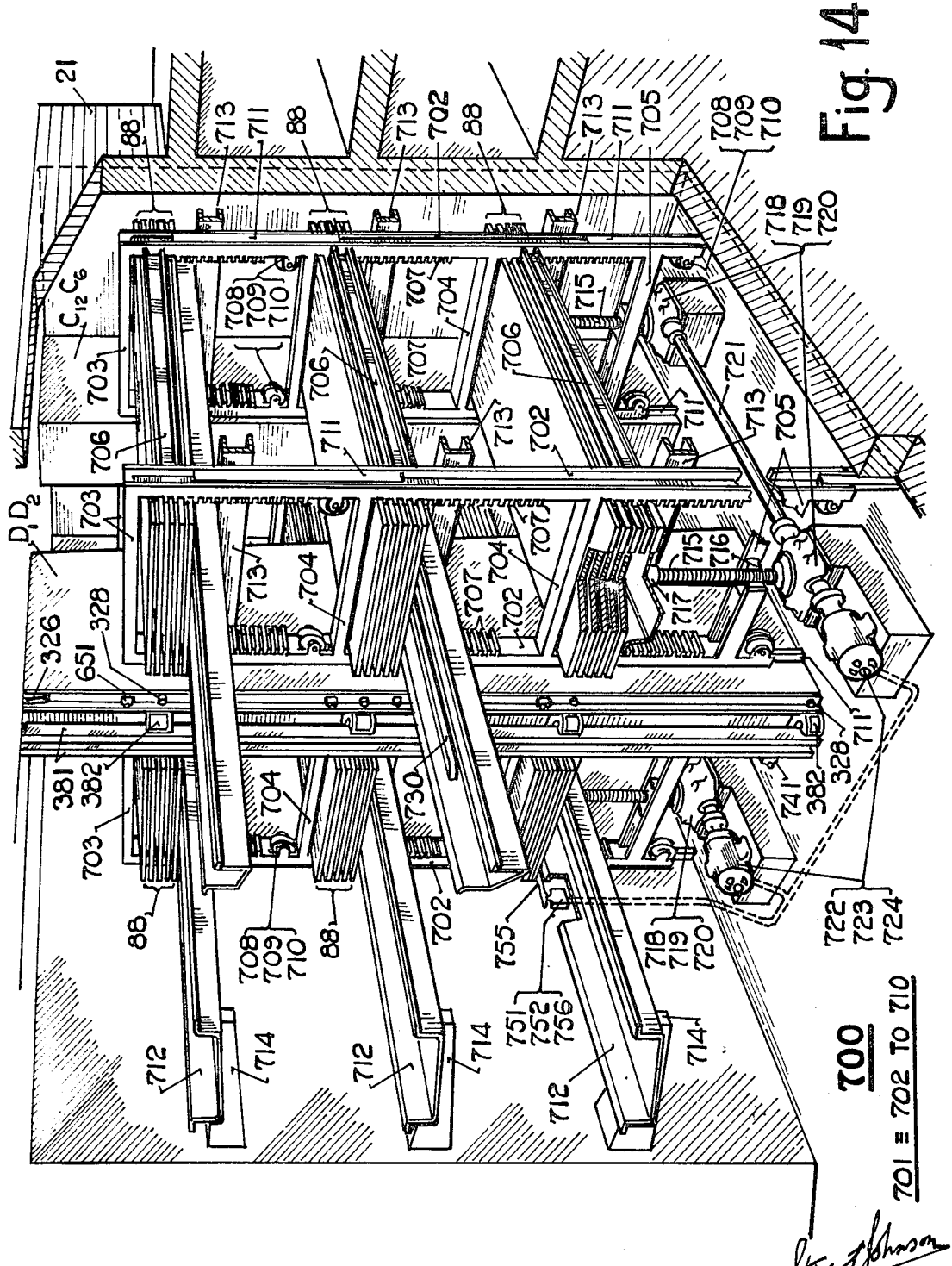

Stuart Johnson

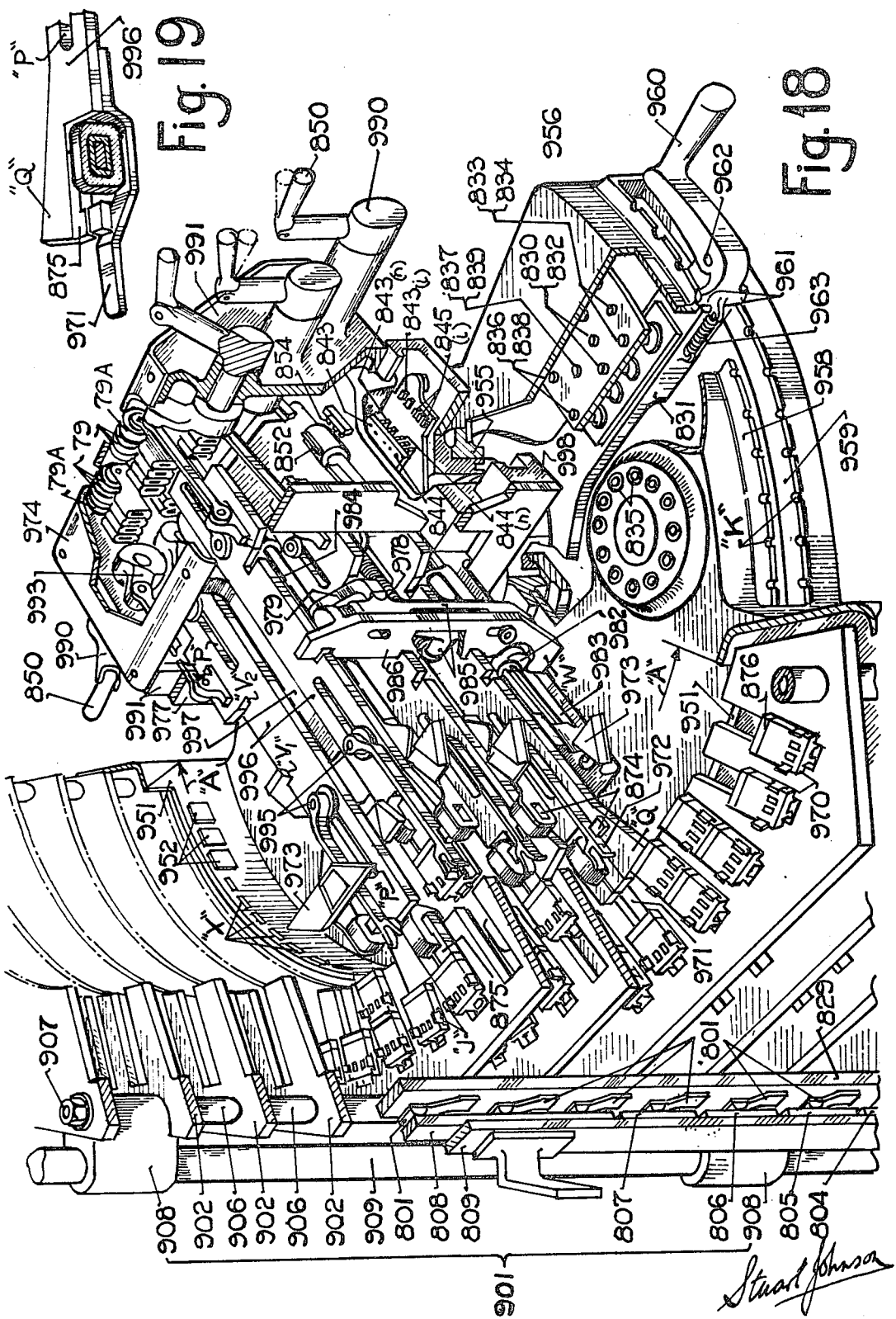

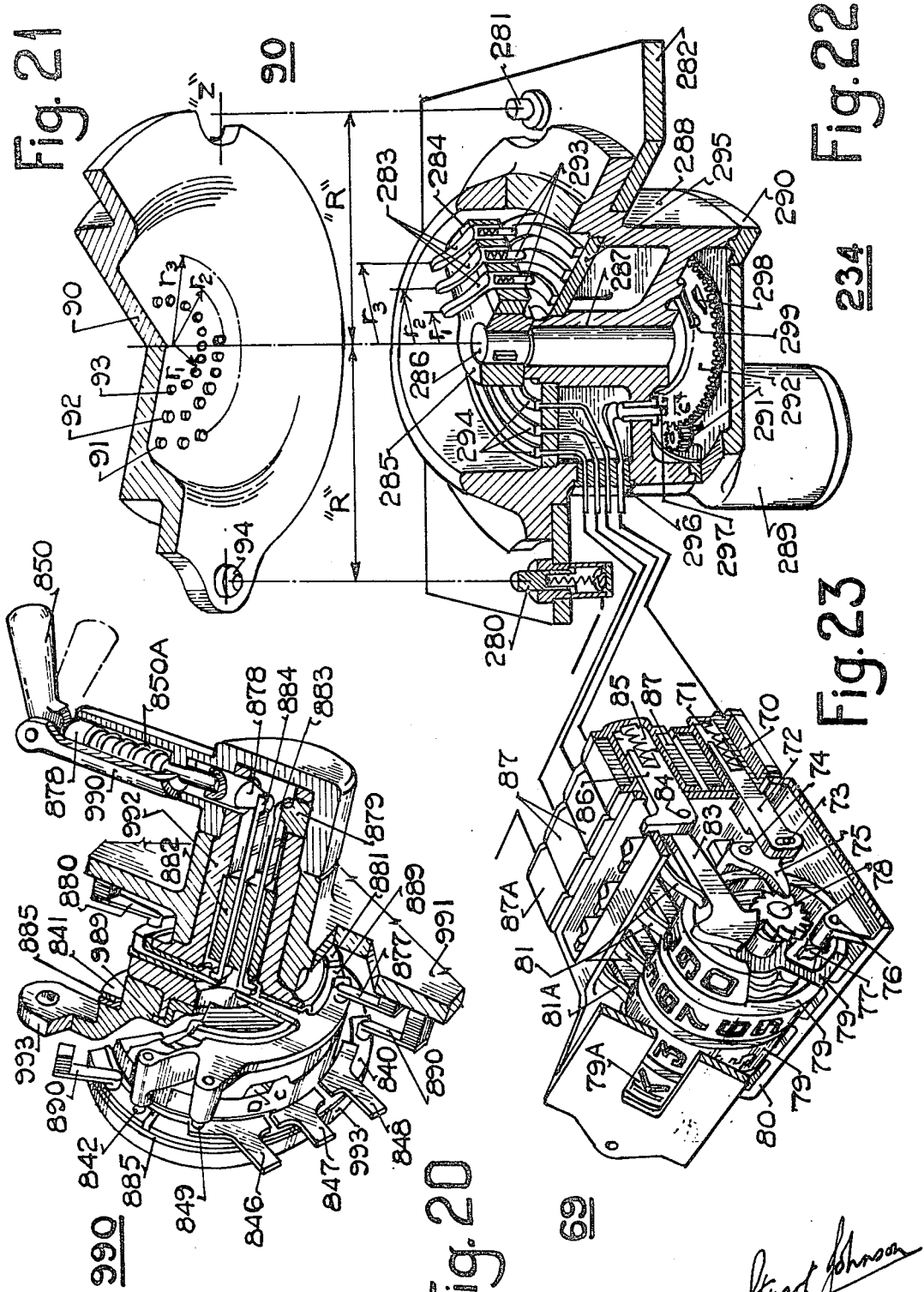

3,395,815
MECHANICAL CAR-PARKING TOWER
Stuart Johnson, "Red Oaks" Southwell,
Eccleshall, Staffordshire, England
Filed Dec. 15, 1964, Ser. No. 431,239
22 Claims. (Cl. 214—16.1)

The provision of adequate terminal parking facilities in towns to cope with the rapidly increasing numbers of motor cars coming into use, is a problem growing ever more acute, extensive parking spaces wherever conveniently sited being regularly filled to capacity, such that the provision of parking space by means of specially constructed works has now become a fundamental feature of town layout.

Of the methods of providing increased parking space by means of specially constructed works at present invisaged, two main classes are to be observed, the first of which can be said to embrace underground, basement and roof top car parks forming integral features of comprehensive building schemes, and the second of which are essentially independently constructed multi-level structures, vehicular access to the various levels provided being either by means of ramps or by means of mechanical devices differing from type to type.

In any design of car park in which it is intended that vehicles shall park under their own control it is essential that adequate room for manoeuvre shall be provided at each parking space in order to avoid collision with adjacent vehicles, and adequate provision shall be made for incoming vehicles to be able to pass outgoing vehicles, these being particularly limiting factors in the design of any ramp type multi-level structure.

An added limitation in this case also, is the space necessary in the provision of tolerable gradients and curvature in the vehicular access path. The combined effect of the said limitations therefore is that any ramp structure will necessarily be of very large site dimensions, and because there is a limit to the amount of inconvenience drivers will tolerate, only a few storeys will receive regular use, and consequently such structures can only multiply their effective site areas by a low factor.

In terms of vehicle parking spaces to a given site area, the various mechanical car parking structures offer a superior ratio because many more storeys can be served, and they usually possess the added advantage that occupants are relieved of their vehicles at street level. Of the mechanical devices so far observed it would appear that they invariably have a rectilinear configuration, single vehicles being mechanically traversed in at least four distinct directions to achieve their parked positions in the general case, traversing in two directions simultaneously, being possible in certain designs. Whilst the duration of each parking operation in any of the existing designs may not appear to be excessive, estimates would suggest that even the best design so far is incapable of coping with any likely day to day rush when built as a single unit, and in order to do so multiplication of the mechanism in a single installation is inevitable to enable additional operations to simultaneously take place. The consequence in this case is that as zones of the installation become completely filled or completely emptied further utilisation of their adjoining mechanism can be rendered impossible although extra expence will have been incurred by providing the increased mechanism, and which will be reflected in the operating costs.

As an alternative to the usual rectilinear configuration of most types of mechanical car parking installations, it has been proposed that cylindrical structures served by rotating lift cages shall be built the vehicles being deposited radially into an annular ring formation, and in such a design some advantage is to be obtained by more direct and possible quicker operation, but as far as the present inventor is aware no examples of this type have so far appeared, and it is thought that this is probably because without an excessive number of storeys it is not possible to provide sufficient vehicle places to justify mechanisation.

From the foregoing observations it has been concluded that the mere provision of extra places can not alone provide an adequate contribution to the general problem, because the degree of utilisation obtained in practice will depend upon the amount of trouble called for in parking, the quickness and availability of the facilities provided, and the relative working charges to be met, in conjunction with demands of prevailing external traffic pressures. To mitigate the critical problem of convenient vehicular access to parking facilities therefore, the device forming the subject of this specification is intended to fulfill substantially all of the advantages of the types so far considered up to limits imposed by external conditions and without their respective contradictory disadvantages. The device proposed takes the form of a single independent unit of high vehicular capacity, able to sustain a high rate of vehicular acceptance or vehicular discharge with little variation due to remoteness of parking spaces with respect to access point, and capable of being constructed on a site of limited area.

The device is calculated to realise a wide exploitation of small available sites and by virtue of the high ultimate capacity possible in a single unit, enables a wide choice of optimum capacity to be available to satisfy any given site requirements. The unit is intended in effect to become a versatile component of town layout by providing a compact, tolerable and convenient means of parking a higher concentration of motor cars than hitherto possible.

In the device proposed herein the vehicles are contained in a vertical cylindrical structure in concentric annular rings at successive deck levels, which is served by a central access lift arranged to elevate and rotate and to manipulate the vehicles into and out of their parked positions by means of traversing trolleys incorporated into the lift cage, acting in conjunction with flat pallets upon which the vehicles are rested. The vehicles are disposed parallel to and equidistant from equally spaced diametral axes of the said vertical cylindrical structure and lying tangentially to a common pitch cylinder concentric with the axis of lift rotation.

Access to the lift is provided at street level by means of articulated ramps contrived to align with the pallets of an aligned lift deck and is positively controlled by means of gates, gates and ramps being mechanically operated and interlocked with the action of the lift to avoid conflicting movements.

In order to accommodate pallets rendered surplus during the general operation of the tower, spare pallet bays are provided adjacent to the lower end of lift travel.

The various motions of the rotatable lift cage and its ancilaries are regulated automatically, mutually interlocked wherever necessary to avoid conflict of movement, and exercised selectively from a centralised operators control console situated at street level within the tower structure and contrived to simulate the various relationships set up between lift and tower by the exercise of operational control over the various motions, and to register the location of occupied and unoccupied parking space throughout the tower structure in order to facilitate such operational control.

All features of the invention are described in detail hereinafter with reference to the accompanying illustrative and diagramatic drawings comprising FIGURES 1 to 25 inclusive;

FIGURE 1 is an illustrative diagram of the parking formation upon which the device as a whole is based and in conjunction with FIGURES 2 and 3 shows the general structural configuration of a suitable common parking deck. FIGURE 1 shows also the plan form taken by the rotatable access lift provided to serve such parking decks and its relationship thereto.

FIGURE 4 shows the general arrangement of the device as a whole the tower structure being shown cut away to reveal the rotatable cage of the access lift at an intermediate alignment with vehicles at various translational stages of parking traverse, a view of lift suspension and haulage cables to show their layout in association with winding gear and balance weights, manner of accommodating the vehicles and the disposition of access (exit) bay, spare pallet bays, basement parking decks and principal power supply machines.

Figure 7:
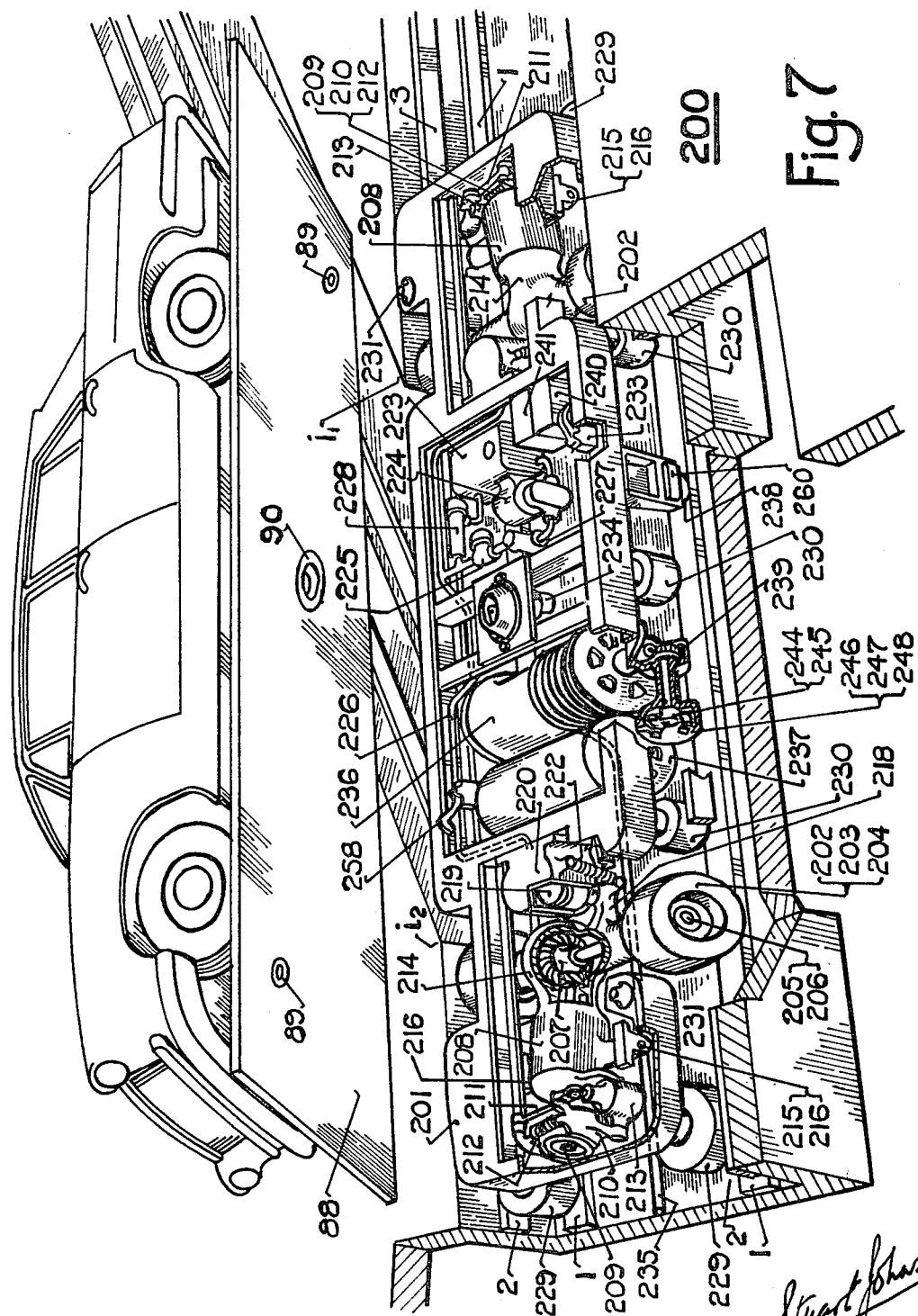

FIGURE 7 is a general view of a self propelled traversing trolley with an associated pallet carrying a parking vehicle, shown raised and tilted to display their respective mating location members, and the traction, elevating and trailing cable gear of the trolley. The view depicts the trolley during a reversed traverse to demonstrate the effect of the trailing cable idler drum such as occurs in the course of interchange working to be descibed hereinafter.

Figure 8:
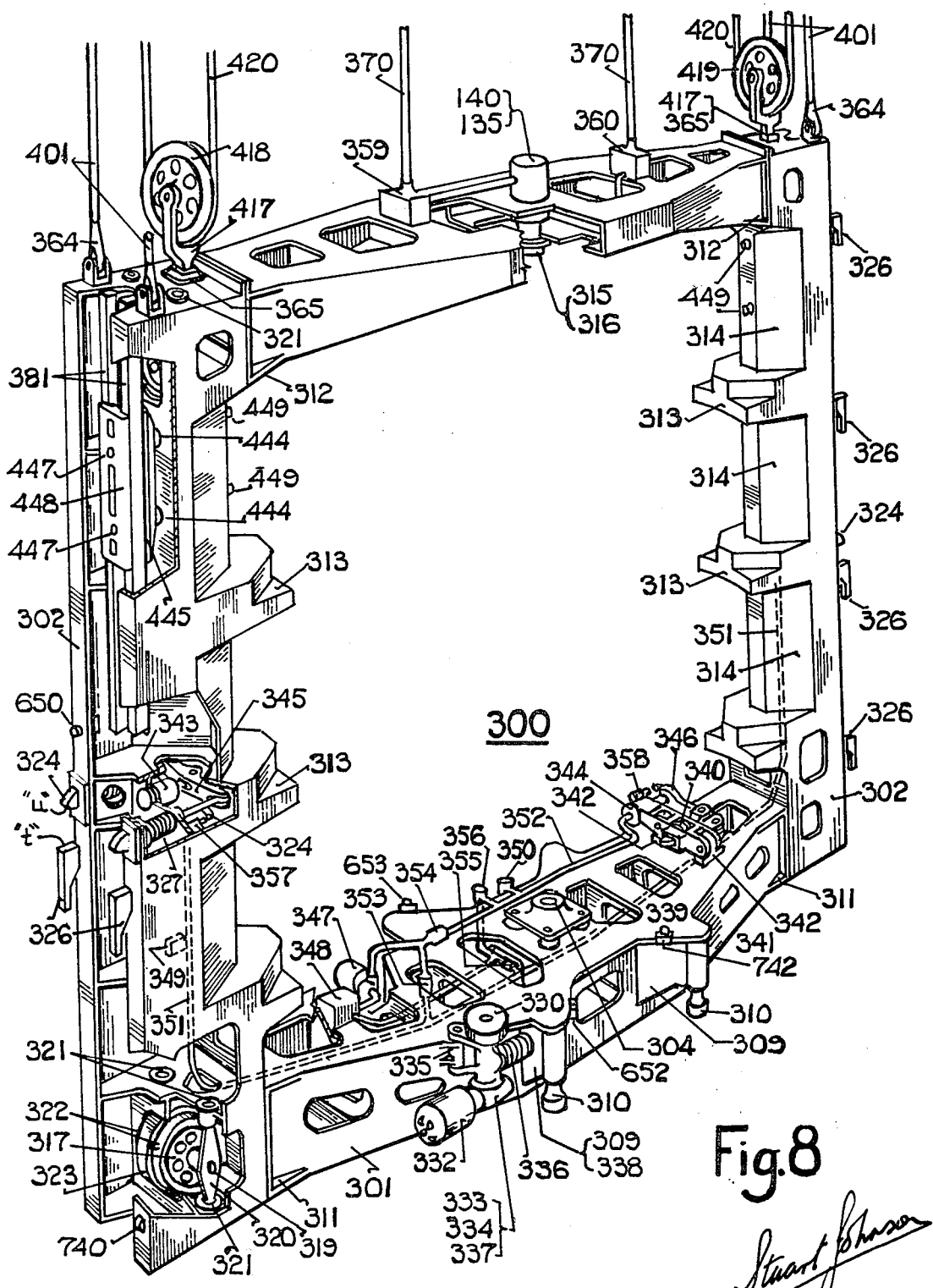

FIGURE 8 is a general view of the complete hoisting carriage and shows the form and disposition of all structural members and mechanism described, the side member track recesses and the relative positions of successive track mounted catchplates.

FIGURE 9 is an enlarged view at the top of the hoisting carriage side members to show the layout and action of the toggle operated brake and details of rails and saddle chairs of the vertical guide track.

Figure 10B:
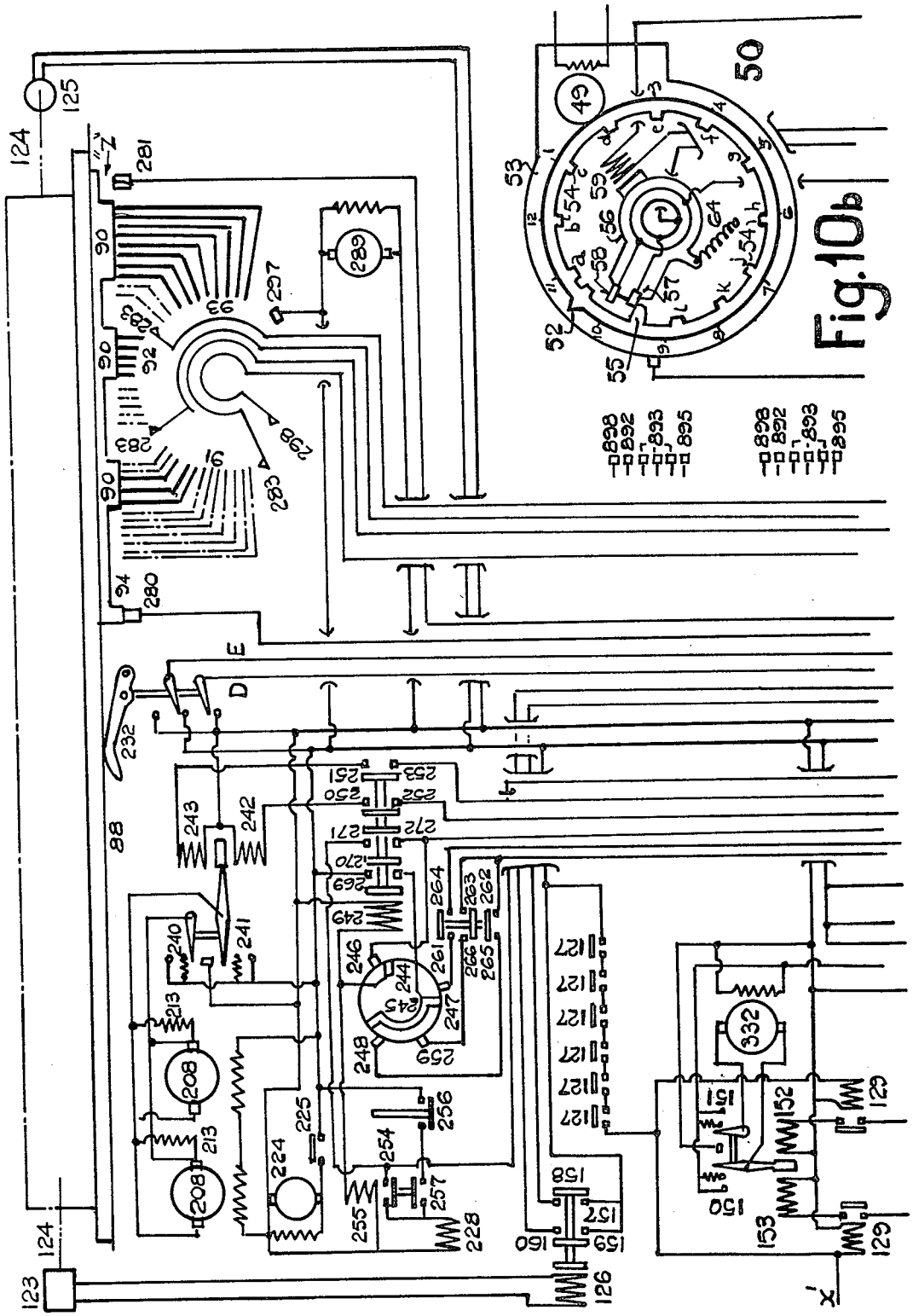

FIGURES 10a and 10b are general skeleton circuit diagrams the central T zone of which covers the trolley control circuits, the left hand side of which covers the lift rotation circuits, and the right hand side of which covers parking, access, and spare pallet bay circuits.

FIGURE 11 is a general illustration of the complete winding gear, the main winding motors geared to the main minding drum, the secondary inching drive and its mounting and the hanging cable gear to the lift cage.

Figure 12A:
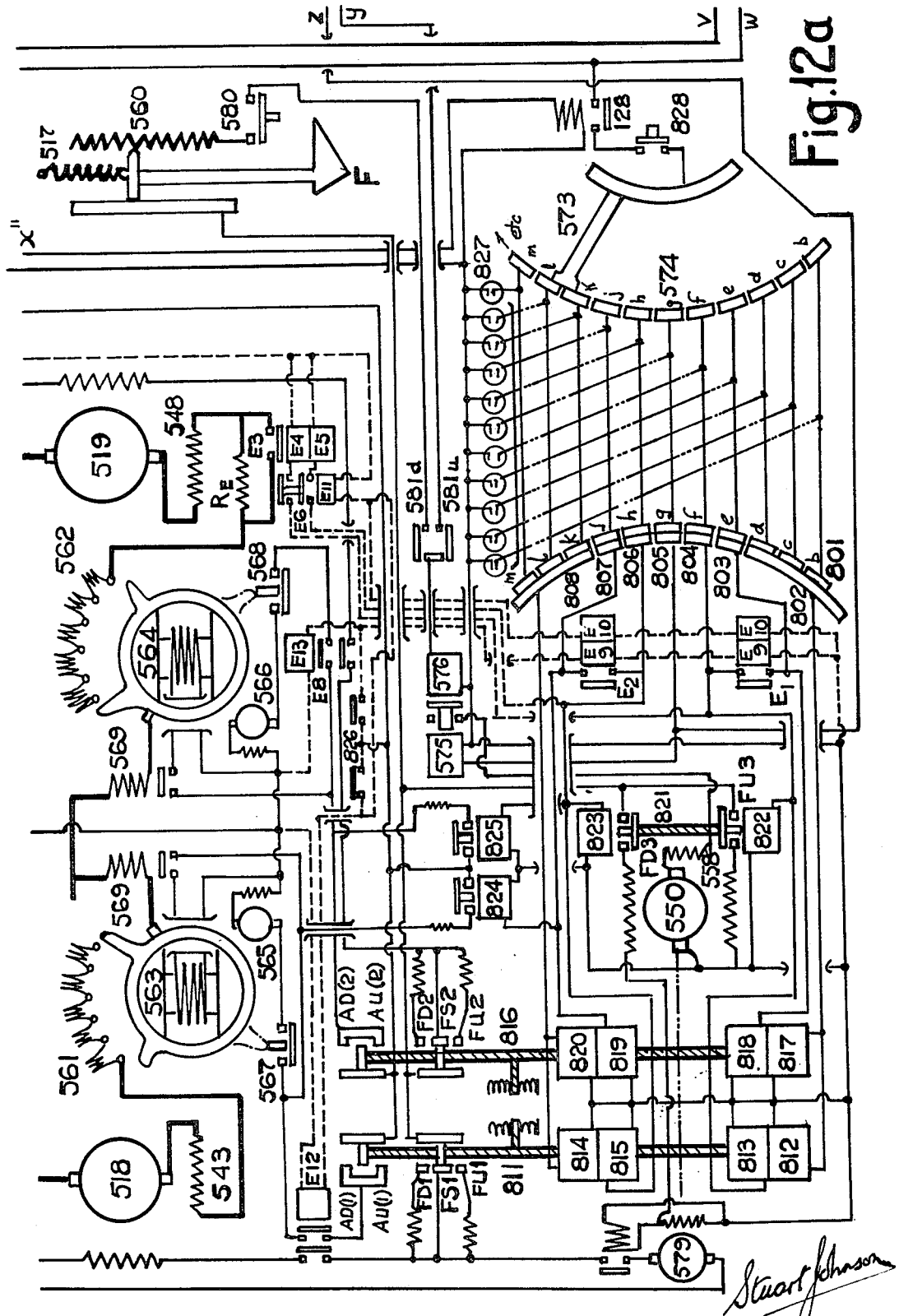
Figure 12B:
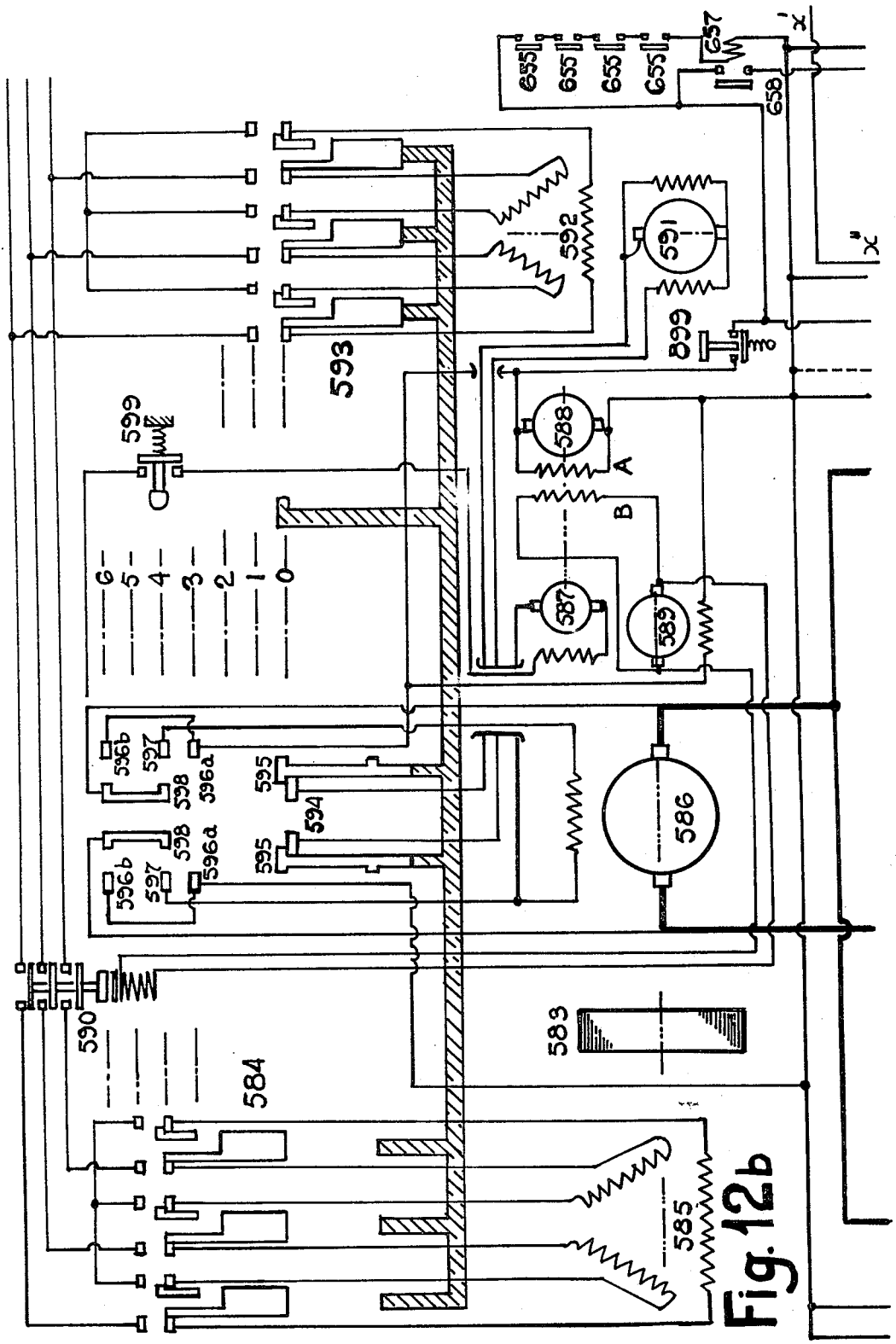

FIGURES 12a and 12b are skeleton circuit diagrams covering the control and operation of the entire winding gear. The top area of the diagram shows a schematic power supply regulating arrangement, the central area shows an arrangement of winding motor control, and the bottom area shows the operators winding control selector circuits.

FIGURE 13 is a view across the access bays showing extended and withdrawn atttiudes of adjacent ramps and gates and the manner of alignment with pallets and handrails of the rotatable lift cage decks. The hydraulic accumulator is inserted as shown merely to complete the schematic pipe circuit given in this view.

FIGURE 14 is a view into a spare pallet bay showing the motorised racks set in an atttiude ready to receive unladen trolleys for the withdrawal of pallets.

Figures 15, 16, 17:
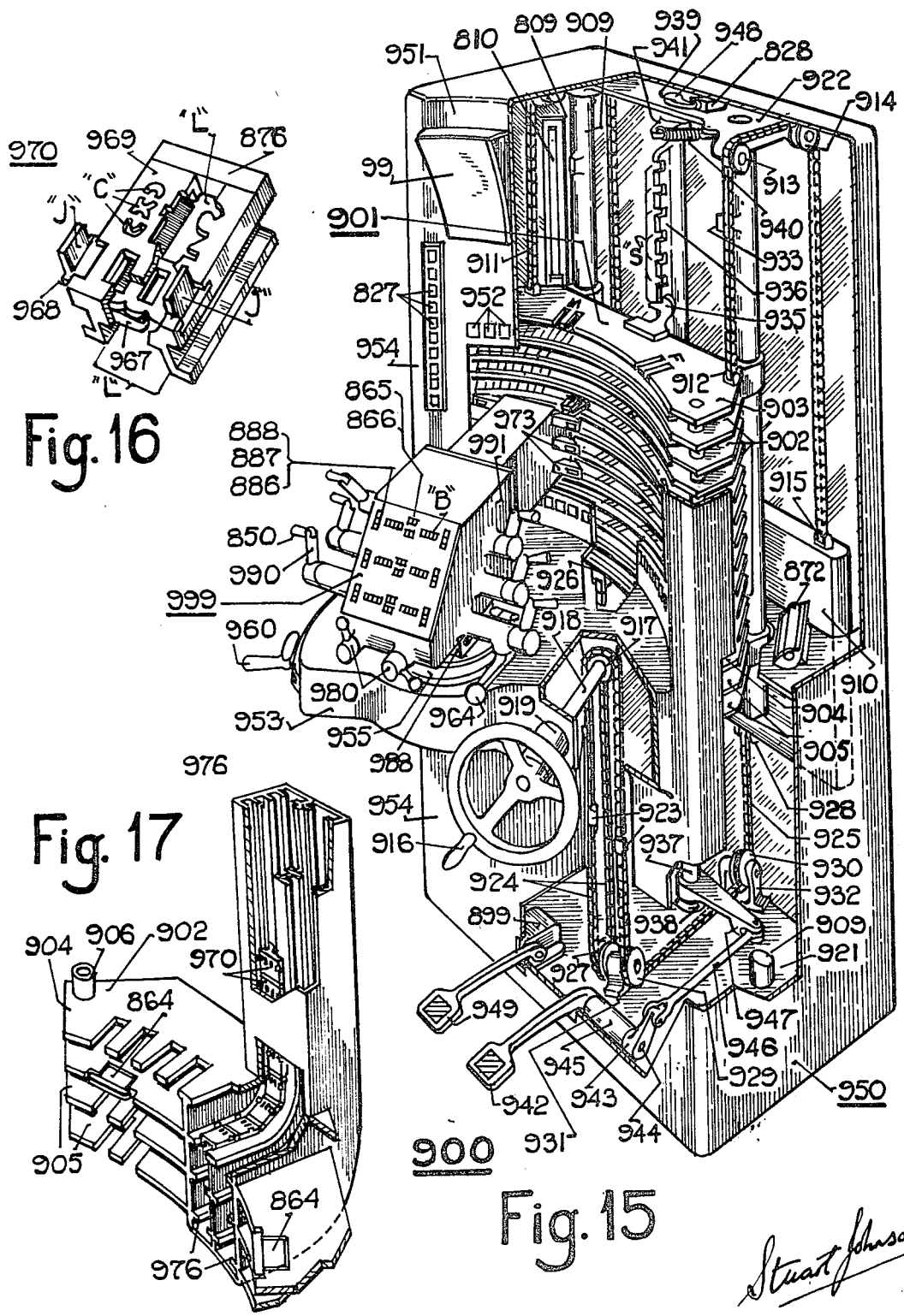

FIGURE 15 is a general view of the operators control console the cabinet of which is shown cut away to display the internal relationship and operation of the principal components, and which shows also the disposition of the various control handles, pedals and indicators.

FIGURES 16 and 17 are detailed illustrations of the magnetic market tablets and spare tablet magazine respectively as incorporated into the mechanism of the control console.

FIGURE 18 is an enlarged detailed general view of the electromagnetic-mechanical turret device which forms an integral feature of the operators control console, and which incorporates a number of sliding bolts the ends of which conform to the detail shown in FIGURE 19.

FIGURE 20 is a detailed view of a single operators trolley control handle from which all movements of a traversing trolley are initiated, FIGURES 21, 22 and 23 showing the elements of the associated pallet identifying gear comprising pallet number plate, trolley transmitter, and remote counter device respectively.

Figure 24:
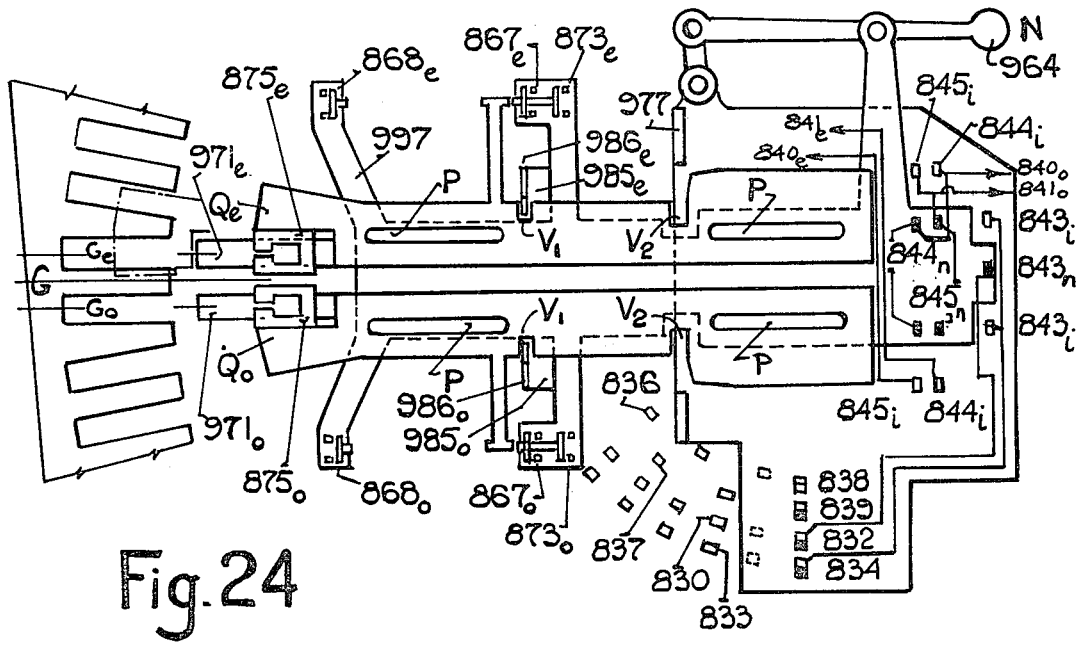
Figure 25:
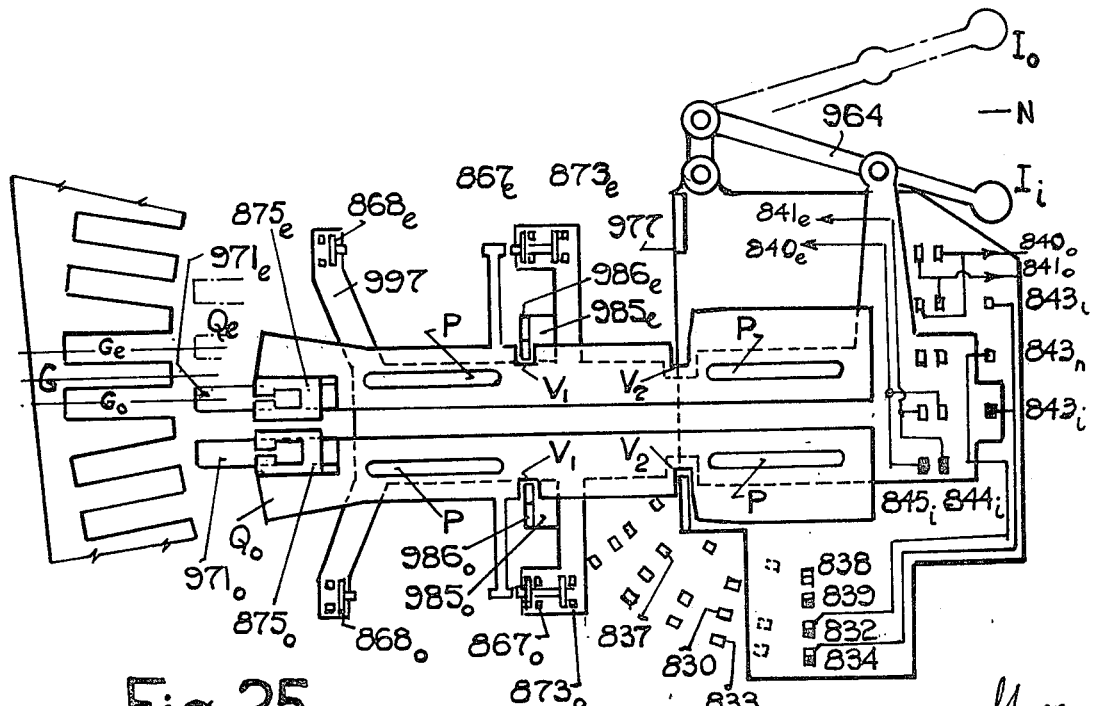

FIGURES 24 and 25 are diagramatic representations of the electromagnetic-mechanical operators control turret which is arranged to set over from the normal attitude of working depicted in FIGURE 24 to the attitude shown in FIGURE 25 for the purpose of interchange operations to be carried out within the tower.

The essential features of this invention are the geometric layout of the intended parking plan and the conception of the resultant tower structure, which are to be considered in conjunction with the form and manner of operation of the access lift described to serve such a structure.

Figure 1:
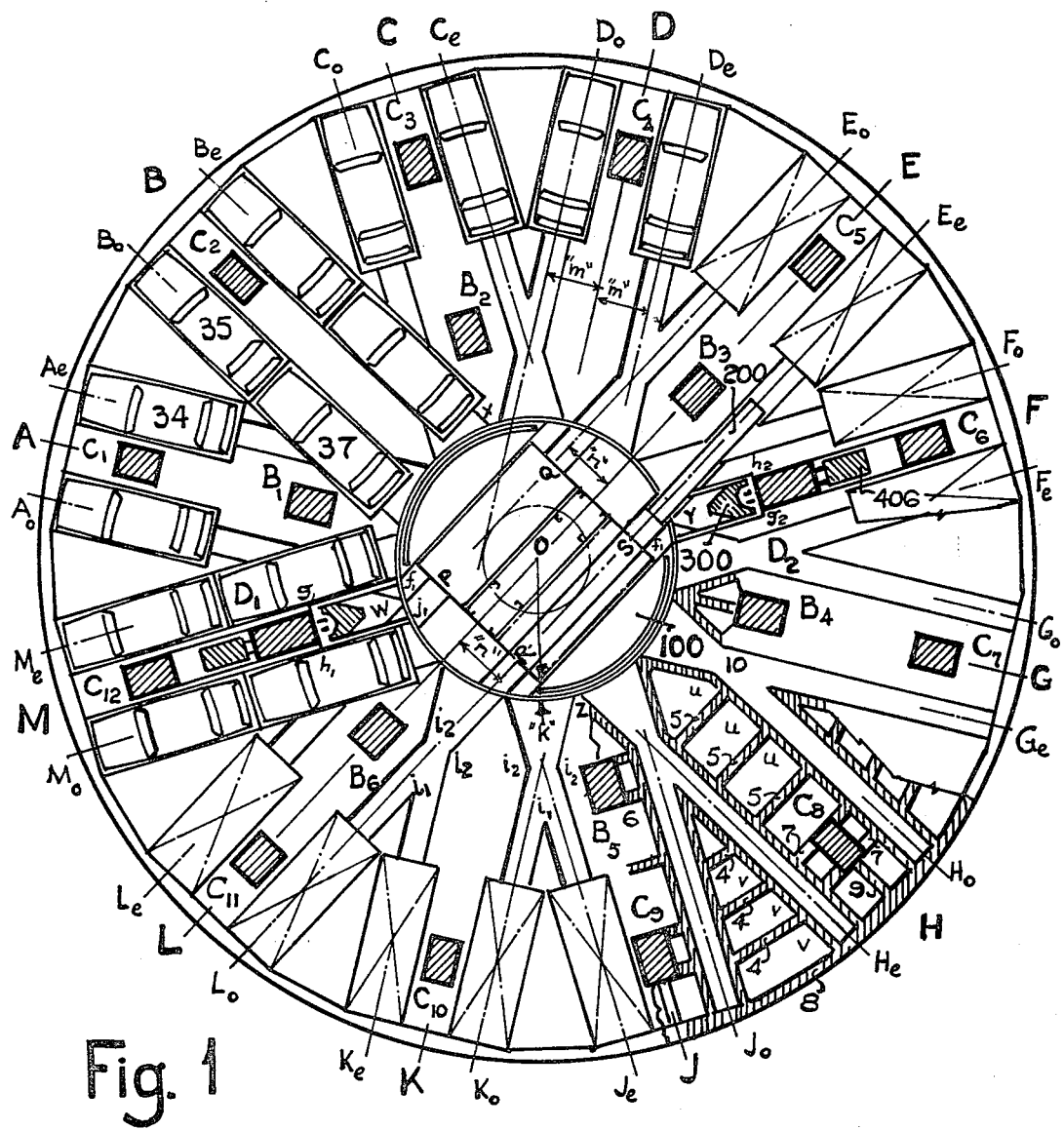
Figure 2:
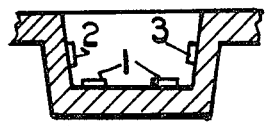
Figure 3:
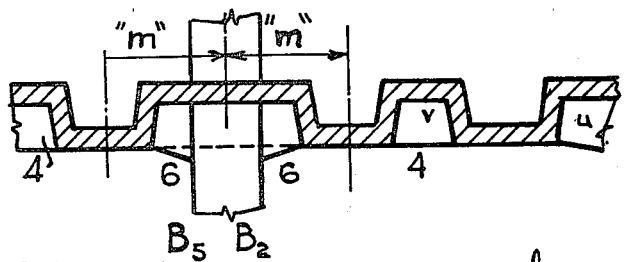

In the case of the tower structure, the geometric layout and structural conception are as shown in FIGURES 1, 2 and 3 of the accompanying drawings, the geometric layout of the tower plan being typified by vehicle parking axes parallel to and equidistant throughout from equally spaced diametral axes of the circular deck outline, such that all parking axes lie tangentially to a common pitch circle about the central vertical axis and whose radius is equal to the perpendicular distance between parking axes and their corresponding diametral axes.

The radial width of the annular parking deck provided for by the said geometric layout is such as to enable one or two vehicles only to rest longitudinally and with appropriate working end clearance on any single parking axis.

The structural conception embraces the flat circular ring formation of the parking deck arranged for cantilevered support from columns spaced on the common diametral axis between each parallel pair or vehicle parking axes, along and about which the deck upper surfaces are recessed to a constant symmetrical rectangular or trapezoidal profile to form access tracks to the parking positions for the traversing trolleys of the lift. The material formation arising from the recessed deck profile is arranged to constitute an integral feature the foregoing structure conception and all parking decks are spaced at equal vertical intervals.

Figure 4:
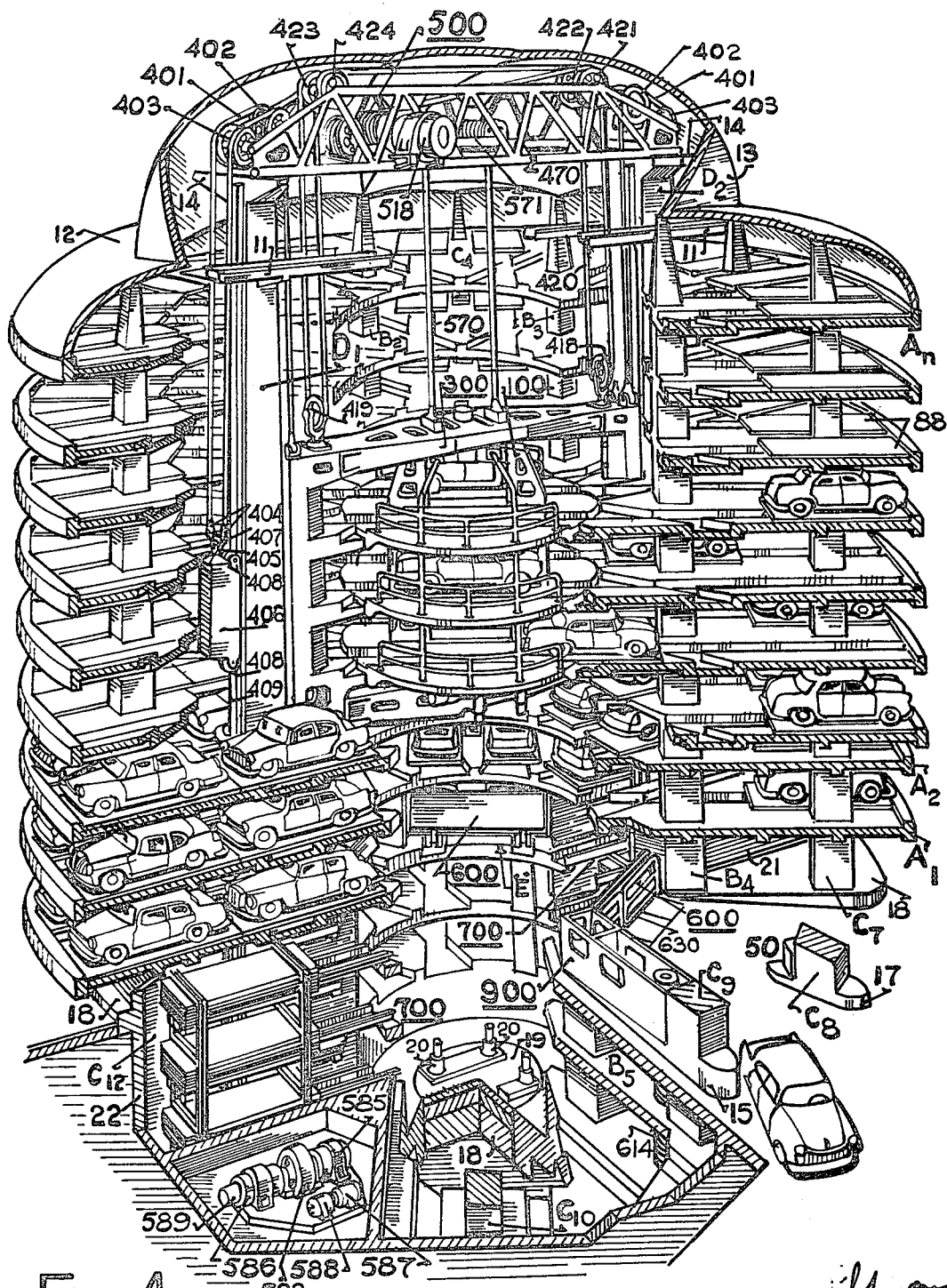

The common annular parking deck members, described are integrated or adapted in the complete tower structure as shown in FIGURE 4, support and constraint of the access lift being derived entirely from two diametrally opposite central columns D1 and D2. The radial distance of central columns D1 and D2 from the central vertical axis of the tower structure is such as to allow the side members of the access lift hoisting carriage to lie outside the vehicular path to adjacent oblique parking positions, all parking decks being slotted back to the inner faces of the central columns to provide passages for the hoisting carriage side members as specified.

Figure 5:
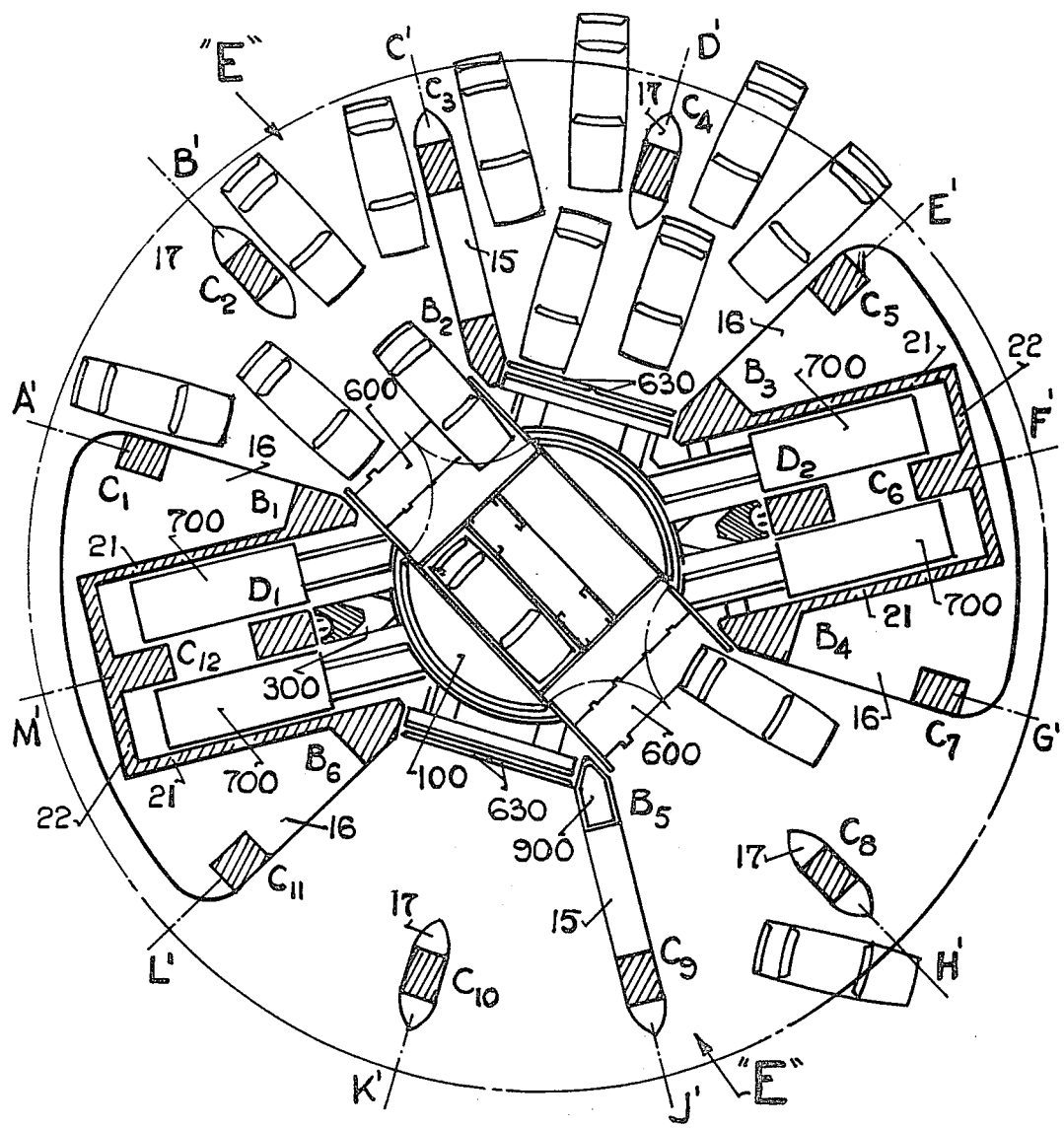
FIGURE 5 is a plan at street level to show the disposition of the access bays and spare pallet bays with respect to the access lift and the general tower structure.

The principal details of the tower structure consist of convergent access bays formed at street level, and spare pallet bays recessed into the basement of the tower, access bays and spare pallet bays being disposed in plan as shown by FIGURE 5.

In the case of the access lift, the form and manner of operation are as described in detail in the latter parts of this specification, it being intended that form shall mean conception of construction for incorporation into the complete tower and conception of construction for the manner of operation to be described, whilst manner of operation is intended to mean utilisation made of the form and features incorporated into the comprehensive mechanism and structure of the access lift.

The salient features of the access lift are essentially (1) the form taken by the lift cage as a means of manipulating the parking vehicles and also as a vehicle constrained to move within the tower, (2) the conception of the winding gate to be provided, (3) the use of tower based ancillaries in conjunction with lift operation and (4) the manner whereby overall operational control is exerted.

Figure 6:
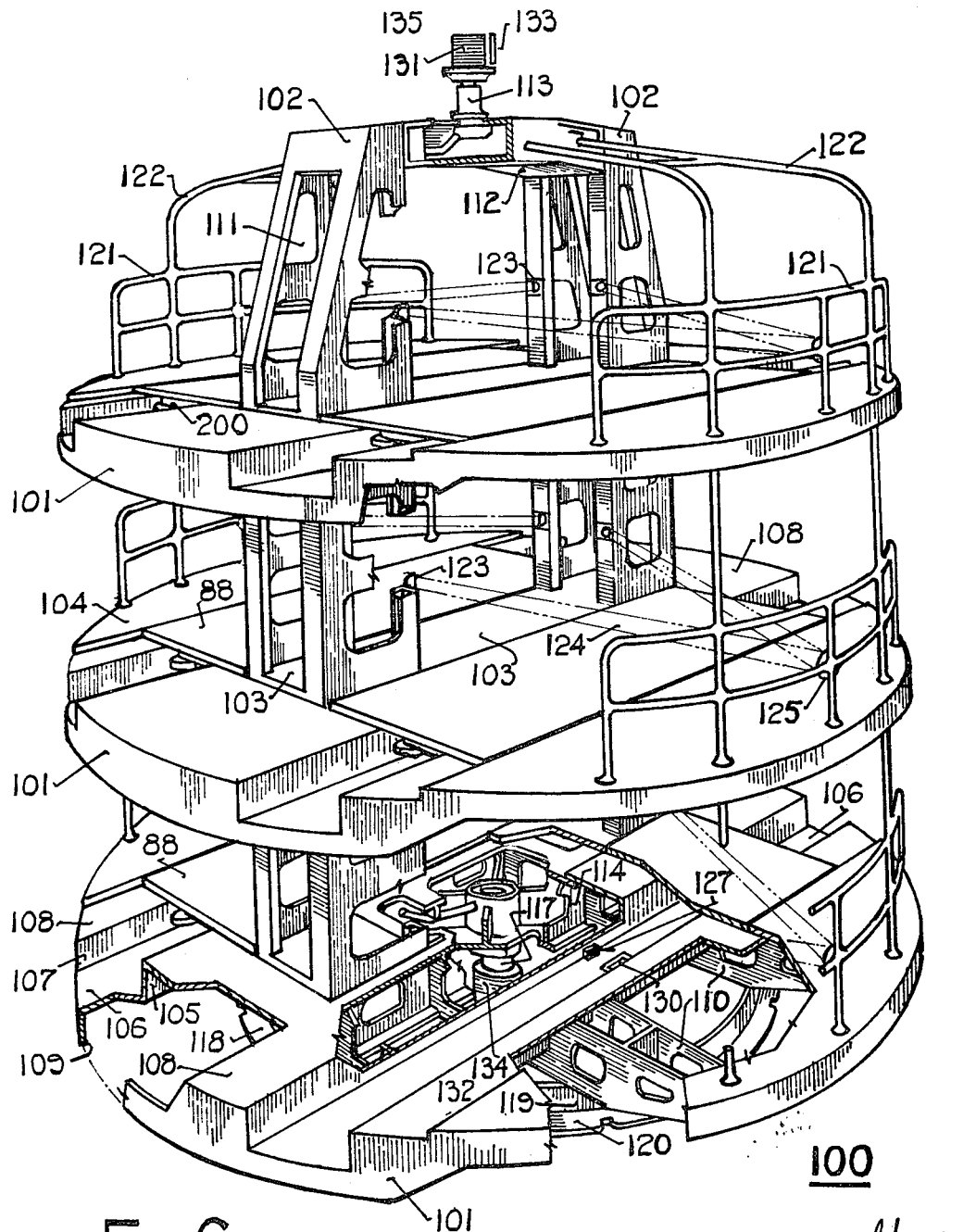
FIGURE 6 is a general view of the rotating lift cage shown with the bottom deck cut away to reveal lower thrust pivot journal and its constraints and also the angular location and drive ring.

The constructional form taken by the rotatable lift cage is generally as shown in FIGURE 6 and consists of flat circular decks spaced at the same common vertical intervals as the annular parking decks of the tower structure, cantilevered from and united by hollow upright box members symmetrically spaced about the common central vertical axis of all lift decks to lie about a common principal and vertical diametral plane. The circumference of each lift deck is arranged to be directly adjacent to the inner boundary of any parking deck with which vertical alignment is established, the upper surfaces of all decks being recessed on axes parallel to, on both sides of and equal in distance from the common principal diametral plane of the complete lift cage structure.

The transverse profile of the lift deck recesses is arranged to be identical with the transverse profile of the parking deck track recesses at their adjoining boundaries such that each lift deck is capable of complete alignment with any parallel pair of tower parking axes, the association between lift cage decks and tower decks being as shown in FIGURES 1, 4 and 5.

The manipulative function of the lift is performed by means of the traversing trolleys acting in conjunction with flat pallets upon which all parking vehicles are conveyed, the trolleys being essentially self-propelled wheeled vehicles operating independently from the decks of the lift cage and the pallets being essentially flat lightweight rectangular mats of limited rigidity. The trolleys are contrived to run along and within their respective lift deck track recesses and any aligned track of the tower structure, each trolley having a flat topped frame capable of passing under any pallet resting over an aligned parking track and supported by the upper surface of the adjacent deck, without interference. Engagement between suitably aligned trolleys and pallets is achieved by elevation of the trolley frame with respect to the associated track to the extent necessary to raise the engaged pallet clear of the adjacent deck surface, lugs on the trolley frames thereby entering mating pallet recesses to provide positive lateral location, the spacing of lugs and recesses being symmetrical about the plan central axes and common to all trolleys and pallets.

Each trolley incorporates two motored axles and a self contained frame elevating system all of which are energised from the lift cage under centralised control, power and control circuits between lift decks and trolleys passing through a common multi-core trailing cable contained on a trolley mounted reeling drum spring loaded to wind on the cable, with the approach of the trolley towards the lift cage. The rotation of the cable reeling drum with trolley locomotion is utilised by means of associated geared contactor device, to form the basis of the operationally selective system of trolley translational control whereby trolley alignments in lift, inner and outer parking annuli are defined, and at which pallet engagements or disengagements are confined, in order to facilitate subsequent operation. A general view of a trolley, pallet, trailing cable and parking track intersection are given in FIGURE 7.

The entire cantilevered circular deck structure of the access lift cage is pivoted to rotate about is central vertical axis and supported such that the axis of rotation coincides at all levels with the central vertical axis of the tower structure, by means of the hoisting carriage. The hoisting carriage is essentially an open upright rectangular framed vehicle, formed to embrace the rotatable lift cage symmetrically in and about a single diametral plane, which is constrained to move along a vertical path by means of opposed pairs of centrally flanged and cylindrically treaded guide wheels acting in conjunction with a track formed of closely spaced colateral twin rails laid along the diametrically opposite inner faces of central colums D1 and D2 of the tower structure.

The hoisting carriage frame forms the structurally intermediate basis necessary for the rotational and locational mechanism of the lift cage. A motorised spring-loaded friction roller mounted thereon and acting on a concentric cylindrical drive path integral with the lift cage is provided for rotation, whilst motorised bolts also mounted thereon, acting in conjunction with a cage mounted detent and track mounted catchplates, provide for positive angular and vertical location respectively, to suit all operational alignments within the tower structure. The structural form and general arrangement of the mechanism of the hoisting carriage are shown in FIGURE 8.

Rotational operation of the lift cage is performed under a system of centralized angular traverse selection, which co-ordinates the operation of the lift rotational motor with the action of the lift cage angular locating bolts and causes the lift cage to seek its destined angular alignment by the shortest extent of angular displacement. Rotation of the lift cage is interlocked with the actions of the traversing trolleys to avoid conflicting movements, provision being made also to associate contrary operations of the lift cage rotary motion with reversed operation of the trolleys in order to facilitate interchange of pallets when access to the outer annulus is obstructed by pallets resting in the inner annular positions of any parking deck.

The access lift is suspended from and within the tower structure by means of support cables anchored in equalised pairs to balance weights constrained to paths inclined to the vertical within the deck area of the tower and equal in magnitude to a major fraction of the total deadweight of the entire lift cage, attachment thereto being made at the frame of the hoisting carriage.

Motive power is transmitted to the lift cage by means of a single haulage cable, which is arranged to an equalising configuration and attached at each end of the hoisting carriage by means of spring-loaded drawbars mechanically linked to interact with toggle-operated equalised brake blocks contrived to engage with the colateral twin rails of the vertical track in the event of haulage cable becoming relaxed. A span girder above and on the same diametral axis as the hoisting carriage, and carried by central columns D1 and D2 at each end provides the structural support from the tower to the entire mechanism of the lift, generally as shown in FIGURE 4, a detailed view of the toggle brake and drawbar mechanism situated at the top of the hoisting carriage framing being given in FIGURE 9.

Motive power to the lift is transmitted by means of the primary and secondary motions of the winding gear which act on opposite ends of the haulage cable, and consist of the main and secondary winding drums respectively, and their associated motors and mechanism.

The primary winding motion serves to provide a fast inter-deck traverse throughout the full range of access lift vertical travel, the motive power being applied by means of a two motor, differentially geared drive to the main winding drum, one motor of which is made about twice as powerful as the other, the geared drive being proportioned to provide equal winding torque from either motor.

The secondary winding motion serves to provide a slow speed inching traverse for the completion of any vertical access lift movement and consists of a self contained low powered geared drive to the secondary winding drum mounted on an independently suspended subframe. The subframe is arranged to act against balance springs under the effect of haulage cable tension, in order to provide the means whereby inching movements are terminated and variations in lift loading accommodated automatically.

In normal operation the access lift vertical translational movements are controlled by means of a system of motor field strength selection according to the state of motion required, the variations in lift loading being compensated for by means of a system of comprehensive motor field strength adjustment derived from the displacement of the secondary drive subframe under load, in order to maintain a strict relationship between applied winding torque and total moving load.

The entire winding gear is arranged to meet operational requirements made of the access lift by means of a selective system of control derived from the movement of a live contactor device and driven through suitably proportioned gearing from the rotation of the reeling drum to the main hanging cable connecting lift cage with centralised control, and arranged to cause optimum motive power to be applied to the lift cage for any length of traverse necessary to reach a selected destined vertical alignment.

By the nature of the lift application, a relatively large energy-turnover is to be anticipated and a recuperative system of power supply is therefore provided by means of which the energy expended due to the elevated parking of vehicles is partially retrieved on exit, stored and rendered available for re-use in subsequent operations in order to minimise the amount of energy to be taken from the external supply. The power and control circuits normally catering for the selective mannar of independent winding motor operation are arranged also to provide for complete operation at a necessarily reduced rate by means of the surviving single motor should either motor fail in action. The mechanical arrangement of the winding gear is illustrated by FIGURE 11 and a skeleton circuit diagram for the entire winding system is given in FIGURE 12.

Vehicular access to and from the lift cage is obtained at street level by means of articulated ramps mounted adjacent to the lift shaft in and from each entrance and exit bay of the tower structure. Each access ramp consists of a pair of flat flaps hinged to fold clear of the lift shaft when withdrawn, and to align with both pallets of any one lift deck when extended. The access ramps are arranged to operate as self contained units in conjunction with associated access gates, provided to positively control vehicles and occupants at the inner confines of the tower, ramps and gates being arranged generally as shown in FIGURE 13. Operation of the access ramps and gates is arranged to take place in diametrically opposite entrance/exit bay groups in order to expedite traffic flow, under the action of centralised control, ramps and gates being mutually interlocked and interlocked with the operation of the lift to avoid conflicting movement of their respective elements.

To expedite the general working of the tower as a whole, the inner parking annulus is kept clear of unoccupied pallets in order to maintain direct access to as many outer annular parking positions as possible, and to accommodate the pallets thereby rendered surplus, spare pallet bays are provided, situated adjacent to the lower extreme of lift vertical travel. The spare pallet bays consist of motorised racks constrained to move vertically within a basement chamber of the tower structure and arranged to embrace trolley access tracks, and are contrived to accept and dispense pallets at all deck levels and either or both sides of the lift cage to enable half or full lift sets of pallets respectively, to be simultaneously transferred.

The spare pallet bays are arranged to operate in conjunction with the traversing trolleys upon suitable alignment of the lift cage with the pallet rack access tracks, the general configuration of the pallet racks and tracks being as shown in FIGURE 14. Control of the spare pallet racks is exerted by means of appropriate selective operation of the trolleys, the racks being arranged to act automatically in accordance with the occupied state of entering trolleys and since correct operation is dependent upon all trolleys in any one group being in the same state of pallet engagement or disengagement and vacant, control is overridden until these conditions are appropriately fulfilled.

General operational control over the lifting, angular and translational motions of the access lift in association with appropriate operational control of access ramps, gates and spare pallet bays, is exercised from a centralised control console in a selective manner, the console being contrived to simulate the various movements and situations completed within the tower structure.

The control console consists essentially of a concave rack which is composed of a series of flat regularly spaced plated slotted in a manner geometrically analogous with the tracks of the tower parking decks, and which is constrained to slide along a vertical path within cabinet of the console, the cabinet being arranged to carry an electro-magnetic-mechanical control turret pivoted about the axis of rack concavity. The control turret represents the rotating cage of the access lift and incorporates horizontally sliding bolts arranged to act along the axes of the concave rack slots which lie tangentially to a common pitch cylinder about the axis of concavity, in a representative order corresponding to the trolleys of the lift cage. The tangential sliding bolts are arranged to transfer mating tablets each of which represents a particular parking pallet, between concave rack and turret in a manner comparable with the transfer of pallets between tower structure and access lift, the tablets made capable of engagement with any rack plate slot.

The relative movements made between the various components of the operators control console are co-ordinated with the various respective movements of the centralised selective lift motion controls, such that access lift movement is preselective in accordance with the prevailing pallet order throughout the tower as denoted by tablet order set up in the concave rack. Tablet transfer within the control console is arranged to be dependent on pallet transfer in the tower and the state of occupation of each pallet is registered automatically from transient conditions experienced in the access lift by means of changeable aspects provided in the respective tablets, such that a comprehensive illustration of the instantaneous state of affairs within the tower is at all times made available to the operator.

By the use of additional circuits at the controller a constant pattern of parking plan is maintained on all decks of the tower, and a means of identifying pallets in engagement with trolleys independently of controller tablet registration is provided from which a parking procedure according to anticipated time of departure is derived. The parking procedure is intended to generally facilitate vehicular exit from the tower and parking meters acting in conjunction with lift operation are provided for the issue of expendible tickets bearing a retrieving reference at the time of entry.

To expedite access lift operation under favourable circumstances, the controller is arranged to enable half or full sets of trolleys to traverse their respective tracks and to engage or disengage pallets simultaneously, and in the event of access being required to outer annular pallets obstructed at the inner ring, means are provided at the controller whereby an interchanged system of access lift operation is established automatically in which the trolleys traverse their respective tracks in a direction contrary to normal in association with reversed angular alignment selection of the lift cage.

FIGURE 15 is a general view of the operators control console which shows the disposition of the principal components and FIGURES 16 and 17 show details of magnetic marker tablets and spare tablet magazines forming features of the controller. FIGURE 18 is an enlarged view of the electro-magnetic-mechanical control turret device which shows its action in association with the slotted concave rack FIGURE 19 being a detailed view of the ends of the sliding tangential bolts to show the manner of taking up the tablets.

FIGURE 20 shows a single operators trolley control handle by means of which all movements of a given trolley are initiated and which is interlinked within the control turret to the corresponding sliding bolt, FIGURES 21, 22 and 23 the pallet number plate, trolley transmitter, and remote counter device of the pallet indentification gear, and FIGURES 24 and 25 show the manner in which the turret is set over from its normal attitude for the establishment of interchange control.

For the purpose of detailed description of the device this specification has been subdivided into five sections each of which covers the salient features of conception, constructional design and operational functions of a particular principal component of the device as a whole, the sections being as follows:

Section I covers (a) Principal geometric features (b) Structural conception and (c) Principal details of the entire tower structure in conjunction with FIGURES 1 to 5. Alphabetic references are used to describe the principal geometric and structural features whilst principal details are covered by numerical references 1 to 21.

Section II covers (a) Access movements within the tower (b) Lift motions provided; and detailed descriptions of (c) Rotating cage (d) and (e) Traversing trolleys in conjunction with pallets, (f) Lift hoisting carriage in conjunction with vertical track, (g) Rotational control of lift cage, and (h) Hoisting gear to access lift. Items (a) and (b) are illustrated by further reference to FIGURES 1, 4 and 5, whilst item (c) is shown in FIGURE 6, all details of which have reference numbers of the form 1XX the lift cage as a whole being allocated No. 100.

Item (d) is shown on FIGURE 7 trolley details having reference numbers of the form 2XX trolleys complete being No. 200. In the case of all parking pallets the complete item has reference No. 88 pallet details having numbers 89 to 94. For the purposes of section IIa(9) to (13) and FIGURE 1 only, to differentiate between the several pallets and vehicles involved, numbers 34, 35 and 37 are used, no other tangible details carrying these numbers.

Item (f) is shown in FIGURE 8 all details having reference numbers of the form 3XX, hoisting carriage complete being No. 300, vertical track complete being No. 380 and track details of the form 38X. Item (h) is illustrated as a whole in FIGURE 4 and that contained in hoisting carriage 300 being shown in FIGURE 9. Items (e) and (g) are descriptions of operational control of trolleys 200 and lift cage 100 respectively and are illustrated as parts of skeleton circuit diagram given in FIGURE 10, the associated electrical components carrying reference numbers taken from the principal mechanical component to which they are permanently attached.

Section III is a complete description of the lift winding gear which operates the principal (vertical) traverse of the tower and covers (a) Layout, (b) Main drum motive power, (c) Winding gear main drive, (d) Winding gear secondary drive (e) Winding motor control, (f) Winding gear operational control, (g) General winding gear operation, (h) Power supply and (j) Emergency operation of the lift. Items (a) to (d) are illustrated in FIGURE 11 and items (e) to (j) are shown as grouped sections of the diagrammatic skeleton circuit given in FIGURE 12.

The winding gear as a whole has been allocated reference number 500 and all details reference numbers of the form 5XX. In the case of item (j) only, all special circuits are shown in dotted lines throughout and all special components have reference numbers of the form EXX. Where such components occur it is intended that the parent circuits shall be regarded as unbroken during normal operational usage.

Section IV covers (a) Access raps, (b) Access gates (c) Operational control of access ramps and gates, and (d) Spare pallet bays, (e) operational control of spare pallet bays, items (a), (b) and (d) being classified as lift ancillary equipment. Items (a) and (b) are illustrated in FIGURE 13 all details having reference numbers of the form 6XX, ramps complete and gates complete having numbers 600 and 630 respectively. Item (d) is shown in FIGURE 14 spare pallet bays complete having reference number 700 and details numbers of the form 7XX. Items (c) and (e) are illustrated as parts of the circuit given in FIGURE 10 associated electrical components carrying reference numbers taken from the respective mechanical groups.

Section V covers all aspects of general operational control for the device as a whole and indicates the manner of co-ordinating the actions of the components described in Sections II, III and IV to suit the intended method of operation by means of the operators control console which has been given reference number 900 to denote this component in its entirety, as shown in FIGURE 15, the principle of operation of which forms the subject of item (a) in this section.

Control console 900 is composed of a number of mechanical subassemblies, and therefore section V is subdivided into detailed descriptions to cover each section of the control console, the numbers given referring to the complete sub-assembly described, as follows: (b) Concave rack 901, (c) Control console cabinet 950, (d) Control turret 999, (e) Tablets and tablet gears 970, (f) Parking plan control, (g) Pallet identification gear 90 to 94, 234, 282 to 299 (pallet and trolley group numbers) (h) Parking procedure 50 (tower group number), (j) Multiple trolley control 986, (k) Lift interchange control.

In general mechanical details of the operators control console have numbers of the form 9XX whilst electrical details embraced thereby have numbers of the form 8XX, most of which are introduced in sections II, III and IV to denote operators control contactors and similar details involved in the operation of their respective items, and which appears on the skeleton circuits in FIGURES 10 and 12, as parts of the relevant description.

Items (b), (c), (d) and (e) are illustrated by FIGURES 15 to 20. In the case of item (f), this is demonstrated in FIGURE 18 in conjunction with FIGURE 24, limit switches 867, 868 and 873 with each belt 996 which should otherwise appear on FIGURE 18, being omitted therefrom for clarity and illustrated instead on FIGURES 24 and 25 only. Item (g) is illustrated by FIGURES 21, 22 and 23, whilst item (h) appears in FIGURE 10. Item (j) is illustrated by means of FIGURE 18 whilst item (k) is demonstrated by FIGURE 24 in conjunction with FIGURE 25.

To cover the various geometric relationships which arise throughout this specification the term "Modular" has been utilised to denote the dimensions of the space necessary to accommodate the largest vehicle upon which the design of the device as a whole is based. Modular length and width for the purposes of the illustrative drawings included, are shown to be equal respectively to the length and width of the parking pallets, although in practice the pallets may well be smaller. In this specification also, modular height is intended to mean the vertical distance between corresponding points on adjacent decks, i.e. floor to floor height necessary to accommodate highest vehicle plus depth of supporting deck structure.

In this specification generally, need often occurs to describe a connection, and which may be either mechanical or electrical in nature. To differentiate between the two possibilities therefore, the terms "rigidly attached" and "mechanically linked" are used where any connection is purely mechanical in function, and the terms "wired" and "electrically bonded" are used to denote any connection of purely electrical significance, "wired" being used for remote items and "electrically bonded" for adjacent features of a common detail. In this context also the terms "fixed" or "moving contactors" occur in the descriptions of the various functions. Where such terms occur and wherever specific reference is omitted, suitable insulated mountings are presupposed.

In this specification materials of construction and methods of manufacture are not stipulated, and wherever specific properties are not stated, to realise all of the components involved fitness of materials and techniques to be used for the form and function of the respective items, are assumed.

In certain cases components described are in fact the elements of complete units, such as relays, gear units, brakes and the like, which are obtainable ready made in their various respective forms from a number of alternative sources. Where such items occur in this specification, their details are included in this manner in order to display the sense and sequence in which these details are intended to function, in the context of this invention only.

The drawings accompanying this specification which are not purely diagrammatic are drawn in perspective in order to convey a general impression only, the layout of components depicted being chosen to facilitate this projection, some exageration from true perspective and proportion having proved to be necessary throughout, to avoid concealment of salient detail.

I. THE TOWER STRUCTURE

(a) Principal geometric features (1) The Tower Structure consists of a series of flat circular decks A1–A2—A$n$ as shown in FIG. 1$a$ equally spaced along a common central vertical axis O at intervals in excess of vehicle modular height.

(2) Each deck embraces an open circular access are WXYZ concentric with common vertical axis O. The diameter of space WXYZ is such as to contain with radial clearance $k$ side by side, and in line, two vehicles symmetrically disposed about axis O with longitudinal axes PQ and RS parallel.

(3) All decks are supported by two concentric rings of columns arranged in equally spaced diametrically opposite pairs, inner ring columns B1 to B6 being arranged to lie symmetrically on alternative diametral axes AOG, COJ & EOL of outer ring columns C1 to C12.

(4) The chordal spacing of columns B1–B2, B2–B3 etc., and of columns C1–C2, C2–C3 etc., is such as to permit vehicles to rest in pairs about and between adjacent columns of the respective rings with the longitudinal parking axes A$o$–G$e$, A$e$–G$o$; B$o$–B$e$, B$e$–B$o$, etc., parallel to and equidistant from their respective diametral axes AOG: BOH: etc.

(5) The perpendicular distances $m$ of vehicle parking axes from their respective diametral axes is in all cases equal to the perpendicular distances $n$ of the vehicle axes PQ and RS from vertical axis O. Hence by appropriate extent of angular displacement about O either vehicle axis PQ or RS can be made to coincide with either parking axis of any diametral pair.

(6) The annular width of all decks XM, YC etc., is in all cases equal to one or two vehicle modular lengths with appropriate working clearance, such that one or two annular rings of parked vehicles each concentric with axis O may be carried on each deck.

(b) Structural conception and details of construction (1) The upper surface of each deck is in one horizontal plane throughout to form a universal support for flat pallets 88 upon which the vehicles are parked into positions described in I$a$(4) and (5).

(2) The upper surfaces of each parking deck are recessed from the boundary of space WXYZ along each parking axis to the respective outer ends A$o$, A$e$, B$o$, B$e$, etc.

(3) The transverse section of the recesses is of uniform depth throughout and of trapezoidal profile symmetrically disposed about the respective parking axis such that the greater parallel side coincides with the upper surface of the deck and the lesser parallel side forms the bottom of the recess as shown in FIGURE 2.

(4) The recesses described in I$b$(2) and (3) form access tracks from central area WXYZ to all parking positions and due to the modular lengths and widths necessary, the tracks of adjacent diametral pairs i.e. from A$e$ and B$o$; from B$e$ and C$o$, etc., intersect at points $i_1$ and $i_2$ in a region approximately at inner column ring radius.

(5) The bottom and splayed sides of each track are provided with wear resistant liners 1, 2 and 3 spaced locally to suit support rollers 202 and guide rollers 228 and 229 of trolleys 200 described in Section II$d$ and suitably strengthened at intersections $i_1$ and $i_2$.

(6) The recessed flat surface described in I$b$(1) to (3) forms the basic feature of all parking deck members A1, A2—A$n$, the soffit of each member being relieved between adjacent tracks for lightness and to maintain a fairly uniform thickness of structural material across the composite section, as shown in FIGURE 3.

(7) The soffits of parking deck members are relieved in panels as shown at U and V in FIGURES 1 and 3 structural material between adjacent panel spaces forming intermediate stiffening ribs 4 and 5 and support ribs 6 and 7 cantilevered from columns B1 to B6 and C1 to C12 respectively.

(8) The outer edge of each parking deck is supported by a stiff rim of structural material 8 cantilevered from columns C1 to C12 by ribs 9. This rim also provides a positive stop-end to the access tracks and outer pallets.

(9) The inner edge of each parking deck is supported by a shallow reinforced rim within the thickness of structural material at the bottom of the parking track recesses, and supported by ribs 10 cantilevered inwards from columns B1 to B6.

(10) The inner edge of each parking deck is slotted at $f_1$, $g_1$, $h_1$, $j_1$, and $f_2$, $g_2$, $h_2$, $j_2$, symmetrically along about and parallel to diametral axis MOF to provide horizontal clearance for the passage of Hoisting Carriage 300 described in Section II$f$(6).

(11) The tangential back faces $g_1$, $h_1$ and $g_2$, $h_2$ of the clearance slots coincide respectively with the perpendicular inner faces of two additional diametrically opposite columns D1 and D2 equally spaced about O and axis MOF to provide a track bed for hoisting carriage guide rails 380XXO also described in Section II$f$(14).

(12) The rectangular sections of columns D1 and D2 are reduced in radial width with increase in height above base to provide a uniform taper on the outer face of each column.

(13) The space between columns D1 and C12 and columns D2 and C6 of each parking deck is pierced by apertures $p_1$ and $p_2$, each aperture being of constant profile for all decks and in all cases adjacent to D1 and D2 respectively, to provide a clear passage for lift balance weights 406.

(c) General details (1) Beyond top Deck A$n$ columns D1 and D2 are continued upward by a distance sufficient to permit Hoisting Carriage 300 to serve one level further to that of A$n$, and to provide end seatings for lattice span girder 470 as shown in FIGURE 4.

(2) At the level above A$n$ parallel tracks 11 are cantilevered from columns D1 and D2 on axes M$o$, F$e$ and M$e$, F$o$ and adjoining space WXYZ to form spare trolley refuge and exchange bays.

(3) Columns B1 to B6 and C1 to C12 are continued beyond the level of A$n$, to support light canopy shell 12 above top deck by a distance in excess of vehicle modular height, over the annular parking zone of A$n$.

(4) The central section of the canopy 13 is formed as a clerestory dome to enclose girder 470 and the top of the access shaft, further bracing being sprung from columns D1 and D2 at 14.

(5) The tower structure is arranged such that parking deck A1 is set at first floor level above ground and the area below A1 at ground level, being denoted E, is laid out as shown in FIGURE 5 the boundary of E being denoted A'B'C'D'E'F'G'H'J'K'L'M'.

(6) Area E is intersected by columns B1 to B6, C1 to C12 and D1 and D2 form annular sectors around the access shaft and about axis O.

(7) The surfaces of annular sectors subtended by angles A'OC', C'OE', G'OJ' and J'OL' are finished flush and inclined downwards towards the boundary of E to connect with adjacent street surfaces.

(8) The spaces subtended by angles A'OC' and C'OE' form separate entrance bays to the tower, and the spaces diametrically opposite to each entrance bay subtended by angles G'OJ' and J'OL' respectively form separate exit bays from the tower.

(9) The radial boundarys of each access by are defined by low kerbs 15 and 16 which in conjunction with low kerbs 17 serve to protect columns B1 to B6 and C1 to C12 against collision from vehicles.

(10) Column B5, between each of the exit bays and between ground floor level and parking deck A1 is suitably arranged for the accommodation of control console 900.

(11) The central circular space about O by W'X'Y'Z' is continued downwards below the level of E by a distance sufficient to accommodate the lower members of hoisting carriage 300 when the level of the surface of the top deck of cage 100 coincides with the level of access bay floor surfaces at W'X'Y'Z' to form the lift shaft bottom.

(12) The bottom of the lift shaft space is finished flat and this surface forms the upper face and centre of foundations appropriate to the nature of site subsoil which support the columns B1 to B6, C1 to C12, D1 and D2 of the tower structure.

(13) The centre of the foundation slab is recessed radially about O to contain a shock absorbent packing 18 in direct contact with subsoil and which supports a raft 19 carrying main buffing shock absorbers 20 in isolation from the main structural foundations.

(14) The diametrically opposite central rectangular spaces of remaining annular sectors subtended by angles AOL and EOG, and bounded by columns B1, C2, B6 and B3, C6, Br respectively, adjoin the lift shaft space for the full depth below E, and are enclosed by walls 21 and 22 to accommodate spare pallet bays 700.

(15) The diametrically opposite segmental spaces outside walls 21 and below area E, extend to a depth corresponding to the lift position described in Ic(11), to form basement vaults.

(16) The areas of the basement vaults between parking axes BoO and DeO and between HoO and KeO are laid out as described in Ia(1) to (5) over a number of levels equal to the number of lift decks below E when the top deck is in position Ic(11), to form basement parking positions.

(17) The spaces between the basement parking positions and adjacent walls 21 are arranged at appropriate levels for the accommodation of necessary power apparatus 580.

II. THE ACCESS LIFT.—SEE FIGS. 1 TO 5

(a) Access movements within the tower (1) All vehicles enter area W'X'Y'Z' at level E and on axes P'Q' and R'S' as shown in FIGURE 5 via one of alternative entrance bays as described in Ic(8).

(2) All vehicles next undergo vertical movement along axis O and rotary movement about axis O to arrive at the level of any chosen parking deck and facing the direction of any chosen parking axis as shown in area W'X'Y'Z' in FIGURE 1.

(3) Each vehicle is then traversed longtiudinally along its selected parking axis to be set into one of the two alternative vacant positions which lies within the inner or outer annulus of each parking deck and along each parking axis, these positions denoted R$i$ and R$o$ respectively, for each parking axis.

(4) All outer parking positions R$o$ of any deck, i.e. A$o$, R$o$, A$e$, R$o$, B$o$, R$o$, B$e$, R$o$ etc., may be occupied in succession or in any order in the manner described in IIa(1) to (3).

(5) All inner parking positions about alternative diametral axes i.e. B$o$, R$i$, B$e$, R$i$, D$o$, R$i$, D$e$, R$i$ etc., may be occupied upon completion, in whole or in part of operation Ia(4) e.g. inner positions B$o$, R$i$, and B$e$, R$i$ may be occupied directly after outer positions A$e$, R$o$, B$o$, R$o$, B$e$, R$o$, and C$o$, R$o$ have been occupied.

(6) Vehicles may be withdrawn from any of the inner positions for exit from the tower by the sequence of operations described in IIa(1) to (5) performed in reverse order and direction, to leave via one of the alternative exit bays described in Ic(8).

(7) Vehicles may be withdrawn from any of the outer positions in a manner similar to IIa(6) when all or sufficient related inner positions are already unoccupied.

(8) The procedure described in IIa(1) to (7) represents access movements ideally timed to suit the positions to be occupied and vacated.

(9) In the general case a vehicle in an inner parking position will lie over the intersection $i$, (FIGURE 1) of two adjacent parking axes e.g. the intersection of axes A$e$, G$o$ and B$o$, H$e$ etc., and so obstruct direct access to vehicles parked in the outer positions of the same axes. i.e. Assuming vehicle 37 lies at the intersection of axes A$e$, G$o$ and B$o$, H$e$. Vehicle 37 will obstruct access to vehicles 34 and 35 resting in the outer positions A$e$, R$o$ and B$o$, R$e$, respectively.

(10) For access to vehicle 34, vehicle 37 is first withdrawn into central area WXYZ and on to axis RS. Vehicle 34 can then be traversed along the appropriate parking axis to or from axis PQ, suitable intermediate rotary traverse being made about O to obtain the axial alignments necessary for each operation respectively. Vehicle 37 can then restore to its original position on axis B$o$, H$e$, reversed on to axis A$e$, G$o$ or placed wherever vacant elsewhere, by similar movements.

(11) For access to vehicle 35 vehicle 37 is first withdrawn on to axis QP. Vehicle 35 can then be traversed along the appropriate parking axis to or from axis RS, suitable intermediate rotary traverse being made about O to obtain the axial alignment necessary for each operation, respectively. Vehicle 37 can then be restored as required to inner or outer positions on its original axis B$o$, H$e$ or placed wherever vacant elsewhere by similar movements.

(12) When axes PQ and RS are common to more than one level vehicle 37 may be first withdrawn on to axis RS at level No. 1 and vehicle 35 traversed along appropriate parking axis to or from axis RS situated at level No. 2, suitable intermediate vertical traverses being made along O to obtain the axial alignment necessary for each operation respectively. Vehicle 37 can then be restored to its original position or repositioned wherever vacant elsewhere, by similar movements.

(13) All dicetly accessible parking positions throughout the structure of the tower are served in the manner described in IIa(1) to (7) and all parking positions throughout the structure of the tower which may be obstructed as described in IIa(9) may be served by any one or combination of procedures described by example in IIa(10) to (12).

(b) Lift motions (1) Parking, Interchange and Withdrawal movements within the tower as described in IIa(1) to (7) and (10) to (13) to and from parking positions described in Ia(4) to (6) are all performed by means of the access lift, which is arranged for motion along and about vertical axis O. The lift is also arranged to manipulate the vehicles along their parking axes between central area WXYZ and inner or outer annular parking positions R*i* and R*o*.

(2) For the purpose of movements described in IIb(1) every vehicle to be parked within the tower is driven on to a light flat rectangular pallet 88 placed on axis PQ or axis RS, whilst entering area W'X'Y'Z' from one entrance bay at level E, and which is vacated at the same level when the vehicle leaves the tower via an exit bay.

(3) The access lift is composed of three principal moving components comprising a rotating cage 100 traversing trolleys 200 and hoisting carriage 300 from which the rotary, tangential and vertical traversing motions of the lift are respectively derived.

(4) Motive power for rotation and tangential traversing trolleys is provided by means of independent electric motors built into the components.

(5) Motive power for vertical traversing is transmitted by hoisting gear 400 from winding gear 500 situated on lattice girder 470.

(c) *The rotating cage 100 (see FIGURE 6)*

(1) In general, rotating cage 100 consists of several circular decks 101 arranged about a common central vertical axis OO and spaced at vertical intervals between corresponding points of adjacent members, equal to the vertical spacing of the parking decks within the tower structure as described in I*a*(1).

(2) The diameter of all decks is equal to that of the central access areas of the tower parking decks with appropriate working radial clearance between the periphery of each deck and the inner edges of the parking decks bounded by points WXYZ as shown in FIGURE 1.

(3) Each deck of the cake is arranged to support side by side parallel and in line, two rectangular pallets 88 symmetrically spaced about OO such that the perpendicular distance between OO and the longitudinal axes of the pallets P″, Q″ and R″, S″ is equal in length to the distance *n* defined in I*a*(5).

(4) All deck members of the cage are united by two upright boxed members 102 symmetrically disposed about OO and spaced within rectangular area 103 which lies between the rectangular spaces provided for pallets 88.

(5) The top surface of each deck is recessed along and symmetrically about parallel axes P″, Q″ and R″, S″ to accommodate traversing trolleys 200. The width throughout and the depth at each end of the trolley accesses is arranged to coincide with that described in I*b*(3) whilst the central trolley wheel base length is arranged at the lesser depth necessary to enable the upper face of a trolley frame when depressed, to coincide with the top surface of the adjacent lift deck. All pallets 88 therefore receive direct support and lateral location from the adjacent lift deck to resist centrifugal action, without being disengaged from their conveying trolleys, the floor of each recess being inclined to provide a smooth change of profile between ends and centre.

(6) The recessed circular deck form described in IIc(5) is defined by flat plates 105 and 106, and 107 and 108 and contained by cylindrical rim 109. The resultant deck member is supported by vertical ribs 110 cantilevered outward from boxed upright members 102 in planes traverse to deck recesses to form a stiff boxed composite structure.

(7) The distance between upright members 102 along the common central diametral axis and the traverse width across the diametral axis of the upright member 102 is such as to provide a clear central rectangular space into which the adjacent doors of vehicles resting on pallets 88 placed in positions given in IIc(3) may be opened with ease of external access.

(8) The central rectangular area 103 and described in IIc(7) is made accessible from without by means of passages 111 at deck level and on the common diametral axis of the upright members 102, to enable occupants to enter or leave vehicles via the central area.

(9) Upright members 102 are extended upwards beyond lift top deck level by a distance corresponding to vehicle modular height where the two members are joined together by box stay 112 which carries hollow pivot journal 113 set on axis OO.

(10) In the space below the central area of the bottom deck additional stiffening ribs 114, 115 and 116 are placed under the bases of uprights 102 to transmit the entire weight of the composite cage structure to a hollow shouldered pivot journal 117.

(11) A large diameter angle ring 118 is arranged beneath the bottom deck of the cage, and about axis OO. The ring is rigidly suspended from the vertical ribs of the deck structure such that the vertical flange 119 lies inward and the horizontal flange 120 lies downwards as shown in FIG. 6. The inner vertical surface of 119 is left unobstructed, to provide a continuous cylindrical drive track, and the outer edge of 120 is notched at regular angular intervals to suit diametral parking axes AOG, BOH etc., for indexing purposes.

(12) The segments of each deck bounded by rims 109 and the sides of pallets remote from lift centre, form access areas to the outward facing doors of vehicles resting in positions Ic(4) on the respective pallets.

(13) The outer access spaces given in IIc(12) are defined to vehicle occupants by handrails 121 attached to plates 104. Certain handrail pillars 122 may be extended upward to join adjacent decks together and to boxed central stay 112 for added stiffness.

(14) The level of central and outer lift deck access areas 103 and 104 is raised to the level of pallet upper surfaces, and to coincide with the upper surfaces of access ramp flaps 601 when the latter are extended, in order to form a smooth path throughout the central area W'X'Y'Z' when aligned with level E FIG. 5, for vehicles and persons entering or leaving on foot.

(15) The absence of vehicles from pallets 88 is registered by means of photo electric cells 123 from unbroken beams of light 124 projected from lamps 125 at the waist height. The presence of vehicles on the respective pallets is detected when the beams of light are broken by means of relays 126.

(16) All trolley recesses of lift cage 100 are each provided with a limit switch 127 set to make by trips 238 attached to each respective trolley frame when the latter is in its central lift alignment as described in I*c*(4) only. All recess limit switches 127 are wired in series, such that when the resultant circuit is completed, master relays 128 and 129 are energised to close hoisting and rotational control circuits respectively. When any trolley 200 is away from the central alignment the series circuit is broken such that lifting and rotational circuits are deprived of current thereby preventing elevation and rotation of lift until all trolleys centralise.

(17) Each trolley recess of the lift cage is provided with a multiple socket 130 for the convenient attachment of trailing power and control circuit cables to the trolleys and spaced to conform with II*d*(29).

(18) The electrical circuits associated with items IIc(15), (16) and (17) are arranged to pass through the hollow pivot journals described in IIc(9) and (10) to multiple slip ring groups 131 and 132 constrained to rotate with cage 100, and mating contactors 133 and 134, fixed respectively to hoisting carriage top and bottom members 301 and 302.

(19) A circular conductor ring 140 split into three isolated segments 141, 142 and 143, FIG. 10 is constrained to rotate with the cage slip rings, and separate contactors 144 fixed to hoisting carriage top member are provided to correspond with each diametral axis of the tower, for angular positional selection.

(20) The multiple slip rings and circular conductor ring are combined into top and bottom drum units 135 and 136 located axially from the adjacent stay members in order that axial movement can take place between rotating cage and hoisting carriage, when the bottom pivot is resiliently supported in the manner described in IIf(3), without effecting ring and contactor alignment.

(d) Traversing trolleys 200

(1) Traversing trolleys 200 are independent wheeled vehicles arranged to run along and within the lift deck recesses described in IIc(5) and (6) and suitably aligned parking deck recesses as described in Ib(3), (4) and (5) to convey vehicle parking pallets 88 along any of the various parking axes of the tower, generally as described in IIa(3) to (13).

(2) The frame member 201 of each trolley is a generally symmetrical rectangular integrally framed structure the flat upper surface of which is made capable of rendering adequate full length support to any one of parking pallets 88.

(3) The transverse profile of trolley frames 201 is contrived such that each trolley can pass beneath any pallet 88 with working clearance, when the same pallet is in direct contact with the adjacent flat upper deck surface as described in Ib(1).

(4) Trolley frame 201 is supported from below on two pairs of wheels 202, which are symmetrically spaced about the central longitudinal and transverse axes of the vehicle, to run along the upper surfaces of track recess bottom liners 1 as described in Ib(5).

(5) Wheels 202 comprise of resilient tyres 203 provided for absorption of shock particularly whilst negotiating the clearance gap between aligned lift and parking decks, and wheel centres 204 rigidly attached to opposite ends of axles 205, which are arranged to rotate in axially locating bearings 206.

(6) Both wheel and axle sets 202–205 of each trolley 200 are driven through suitable reduction gearing 207 by means of reversible traction motors 208. Reduction gearing 207 may be either of pinion and spur, or alternatively of bevel form.

(7) The armature shaft of each traction motor 208 incorporates a brake drum 209 upon which engage brake blocks 210 under the action of spring 211 by means of levers 212. When motor 208 is energised, brake blocks 210 are released from brake drum 209 by the thrust of solenoid 213, which is arranged to be energised simultaneously with motor 208 to overcome the action of spring 211, and so permit rotation. Rotation is thereby prevented until the motors are energised and hence the trolley remains at rest in its track.

(8) The traction motor, electro-magnetic brake gear, reduction gearing and axle of each wheel and axle set are contained by a light enclosed suitably shaped housing member 214 to form an integral motorised traction unit, the traction motor of which, being generally disposed such that the armature axis lies at or near to the horizontal, and at or about the same height above track liner surface level as the axes of rotation of wheels 202.

(9) Both traction units of each trolley are attached to their respective trolley frame 201 by means of widely spaced transverse co-axial pin joints 215 formed between frame brackets 216 of trolley frame 201 and outward extensions 217 of traction unit casing. Extensions 216 are arranged such that the transverse axes of pin joints 214 lie generally adjacent to the outer faces of the casings enclosing traction motors 208, such that wheels 202 can be swung up and down with respect to horizontal trolley frame 201.

(10) The swinging ends of traction unit casings 214 are extended radially outward and away from motors 208 to form upward facing cylindrical thrust seatings 218 of relatively large radius, and whose axes lie parallel to the axes of pin joints 215 and axles 205.

(11) Thrust seatings 217 are arranged to receive the direct downward thrust of single acting hydraulic rams 219 when applied, such that trolley frame 201 is elevated as a result of the downward action of traction unit wheels 202 with respect to the trolley frame, rams 219 sliding in mating cylinders 220 rigidly attached to trolley frame 201.

(12) The working stroke of elevating rams 219 and the lengths of the associated lever arms, are proportioned such that, at the inner limit of travel trolley frame 201 is at the lower level as indicated in IId(3), and at the outer limit of rams travel the flat upper surface of trolley frame 201 is at a level which permits a pallet 88 resting there-on to pass over and along the adjacent deck surfaces with working clearance between.

(13) The fluid inner face of hydraulic ram 219 is shaped such that when resting in direct contact with the inner face of the upper end of cylinder 220, the lower limit of trolley frame elevational travel is positively defined, and the outer cylindrical length of rams 219 is made to a reduced diameter to pass through lower concentric cylinder guide cover 221. The resultant shoulder formed on ram 219 in conjunction with the inner face of cover 221 are proportioned to positively define the upper limit of trolley frame elevational travel. The outer end face of rams 219 is flat, and perpendicular to the line of thrust, such that the thrusts transmitted to traction unit seatings 218 are applied normally with respect to cylinders 220 to eliminate side thrust on cylinder 220.

(14) When the inner faces of rams 219 are not under effective fluid pressure, the trolleys are maintained at the lower attitude as described in IId(3), (12) and (13) by return springs 222 anchored between traction unit casings 214 and their associated trolley frames, and generally adjacent to cylinders 220, springs 222 being arranged to act in a manner opposed to the working thrust of hydraulic rams 219.

(15) Fluid under pressure is supplied to the elevating rams of each trolley from reservoir 223 by means of motorised pump 224 which form elements of a self contained hydraulic system mounted on trolley frame 201.

(16) During all operations of each trolley, pump 224 is controlled by pressure switch 225 situated in the common pipe line 226, to the cylinders to run at all pressures up to that necessary for loaded trolley elevation and to cut out at pressures above this value.

(17) When fully elevated each trolley frame is hydraulically locked at the upper position by fluid trapped in cylinder pipeline 226 by check valve 227 situated between pump 224 and cylinders 220.

(18) Depression of trolley frame 201 under the combined action of their inherent deadweight and of return springs 222 is controlled by the release of fluid from the associated hydraulic cylinder pipe lines by means of electro-magnetically operated release valves 228, which return the fluid released to the respective reservoirs 223 for further use, valves 228 being timed for rapid release actions.

(19) Each of trolleys 200 is guided laterally along its adjoining track by means of side controlling end rollers 229 and side controlling intermediate rollers 230 which are mounted on both sides of each trolley frame 201, in generally opposite pairs, and situated at points along frame 201 to provide overlapping location to the trolley when the latter is negotiating the parking track intersections $i_1$ and $i_2$ described in Ib(4).

(20) Side rollers 229 and 230 are resiliently tyred to permit accommodation to possible variations in track profile to be made, and to absorb attendant shock, end rollers 229 being made to relatively large diameter to ensure smooth entry into track liner sections.

(21) Side rollers 229 and 230 are arranged to rotate about axes parallel to the adjacent splayed track sides as described in Ib(3), and with a degree of axial freedom corresponding in length to the elevational travel of trolley frame 201 with respect to track level. The axial length of the treads of rollers 229 and 230 is proportioned such that despite the axial freedom permitted alignment with track side liners 2 and 3 described in Ib(5) is maintained at all times.

(22) Due to the taper arising from the splayed track sides and the vertical elevational motion of the trolley frame a mild wedging action is induced during depression which promotes accuracy of transverse alignment and which is relieved during elevation to increase the lateral freedom of the trolley.

(23) For positive location of pallets 88 when supported by the trolleys as described in IId(2), tapered lugs 231 are provided which project upward above the flat top surface of trolley frame 201 to engage in mating recess units 89 set into the undersurface of each pallet 88.

(24) Locating lugs 231 and locating recess units 89 are situated in symmetrically disposed pairs about the geometric centres of trolley frames 201 and pallets 88, the spacing of both lugs and recess units being equal in all respects to permit reversal of pallets with respect to trolleys, in all cases.

(25) The lengths of locating lugs 231 projecting above trolley frame top surfaces is arranged to be less than the working clearance indicated in IId(3), and the tapered profile of each lug and its mating pallet recess are shaped to facilitate smooth mutual engagement from possible initial misalignment.

(26) Engagement and disengagement between a trolley and a pallet are registered by an independent reversing trip switch 232 such that one direction E of current flow denotes engagement, and the opposite direction D of current flow denotes disengagement. Reversing switch 232 is operated by trip 233 whose upper surface has a range of vertical movement coincident with the locating levels of lugs 231.

(27) The particular pallet in engagement with a trolley, and the end-to-end relationship existing between the same pallet and trolley at any one time, are identified by trolley transmitters 234 which engage with pallet number plates 90. Trolley transmitters 234 and pallet number plates 90, are mounted about the geometric central vertical axis of trolley frames 201 and pallets 88 respectively and have mutually mating profiles identical with and the same relative levels as the corresponding trolley locating lugs 231 and pallet recess units 89 to co-ordinate with the location of pallets with trolleys. The operation of trolley transmitter 234 is described in Vg.

(28) The power and control circuit conductors associated with the items described in IId(6), (15), (18), (26) and (27) are transposed from their respective trolleys to rotating cage 100 by means of multi-core trailing cables 235 which connect by suitable plugs to multiple sockets 127 situated as described in IIc(17).

(29) When trolleys 200 are centrally located along their respective lift cage tracks, the entire working length of each trailing cable 235 is contained on a spring loaded cylindrical cable reeling drum 236 mounted from and across trolley frame 201 to rotate about a horizontal transverse axis. At the central position along the track, the relationship between reeling drums 236 and track sockets 130 is such that cable 235 lies perpendicularly to the track.

(30) When trolleys 200 leave lift cage 100 by the No. 1 end common to all lift tracks, cable reeling drum 236 is arranged to roll over the unwinding trailing cable, the cable lying flat and stationary behind the receding trolley. When trolleys 200 leave lift cage 100 by the No. 2 end, also common to all lift tracks, due to the reversed direction of travel, cable reeling drum 235 precedes the unwinding cable as shown in FIGURE 7. To provide a symmetrically opposite configuration to the trailing cable within the confines of its trolley therefore, idling guide drum 237 of identical length and radius to reeling drum 236 is mounted adjacent, parallel and at the same relative level as reeling drum 236 from trolley frame 201, to follow the unwinding cable.

(e) *Operational control of traversing trolley*

(1) Reversible trolley traction motors 208 are separately excited direct current machines the armatures of which are arranged for control by one of two mutually opposite starter circuits appropriate to the alternative directions of travel along the adjoining tracks and energised from a common trolley supply main, such that both traction motors 208 act together in either direction of traverse.

(2) Motor starters 240 and 241 are arranged to actuate only when their respective relay solenoids 242 and 243 are energised the armature cores of each 240/241 pair of solenoids being so coupled that at any one time, one only of starters 240 or 241 is activated, and to centralise under return spring action, when neither of solenoids 242 and 253 are energised. Both of the alternative starter circuits are thereby broken, hence preventing rotation of the motors 208, the trolley being braked along its track by the action of springs 211 as described in IId(7).

(3) Starter solenoids 240 and 241 are controlled through separate circuits energised respectively through operators trolley directional contractors 840 and 841 by means of operators live trolley traverse contactor 842.

(4) Directional contactors 840 and 841 are arranged such that in normal operation, the respective trolleys leave lift cage 100 via No. 1 end which contactors 840 are energised, and return in the reverse direction, and via No. 1 end when contactors 841 are energised.

(5) For the purposes of interchange movements which arise as described in IIa(9) to (11) and entail reversed relative traverses via No. 2 end of lift cage 100, the circuits controlling solenoids 242 and 243 respectively are exchanged by means of intermediate reversing contactors 844 and 845 arranged in the solenoid control circuits, such that by the same actions on the part of the operator, each trolley can be made to leave initially, and return to the lift cage via No. 2 end instead of No. 1 end as described in IIe(4).

(6) The cable reeling drum 236 of each trolley 200 is arranged to drive two isolated rotary contactors 244 and 245, over a ring of three fixed isolated contactors 246 and 247 and 248 by means of reduction gearing 239 the ratio of which is such to cause contactors 244 and 245 to move over fixed contactors 246, 247 and 248, once only respectively during the full extent of trolley working travel between central alignment within the lift cage and outer parking alignment on the tower structure for all parking tracks.

(7) The three fixed contactors 246, 247 and 248 are of short circumferential length, and are spaced at the relative angular intervals which, when full length contact has been established with moving contactors 244 of equal circumferential length, the trolleys are at central lift, inner annular and outer annular parking translational alignments respectively.

(8) Trolley moving contactor 244 is wired direct to relay solenoid 249, which when energised is arranged to break the circuits feeding both of traction motor starter relay solenoids 242 and 243 by means of circuit breaking contacts 250 and 251, and isolated mechanically linked moving contactors 252 and 253 respectively, acting on the common impulse from solenoid 249, against return spring action.

(9) Trolley fixed contactors 246, 247 and 248 are wired direct to complementary operators fixed contactors 846, 847 and 848 respectively which are arranged in sequence, and at a common radius to the axis of rotary travel of operators trolley alignment selector contactor 849.

(10) Trolley alignment selector contactor 849 forms a bonded extension of live trolley traverse contactor 842, and has a circumferential length greater than the isolating gaps separating complementary contactors 846, 847 and 848, such that continuous contact is maintained between contactor 849 and at least one of contactors 846, 847 or 848, at all times.

(11) When trolley moving contactor 244 is energised, from IIe(8) current to the traction motor starter solenoids 242 and 243 is cut off, and by return spring centralising action on the armatures of solenoids 242 and 243, as described in IIe(2), current to the armatures of traction motors 208 is cut-off. Also due to the limited circumferential length of trolley fixed contactors 246, 247 and 248, trolley moving contactor 244 can only be energised when the trolley is at or near to a translational alignment position. Hence trolleys 200 are maintained at or brought to rest at the translational alignment whose contactor 246, 247 and 248 received current originating at trolley alignment selector 849.

(12) When operators selector contactor 849 is moved to suit a different translational relationship between lift cage and trolley, current to trolley moving contactor 244 is cut-off, as a consequence of which solenoid 249 relaxes, the return action completing the circuits to starter relay solenoids 242 and 243, to render the particular trolley free to be moved.

(13) As a result of the movement of operators selector contactor 849 to suit a different translational relationship between trolley and lift cage, current from live contactor 849 passes through the appropriate operators fixed contactor to trolley fixed contactor circuit, to energise the trolley fixed contactor corresponding to the newly defined destined translational alignment required of the trolley.

(14) Operators trolley directional selector contactors 842 as described in IIe(3) are mechanically linked to set the direction of the respective trolley to suit the relative direction of the newly defined translational traverse, and from IIe(10) energise the appropriate trolley traction motor starter relay solenoid in conjunction with the sequence of events described in IIe(13).

(15) In the general case, translational motion of a trolley, initiated as described in IIe(12) to (14), is continued by traction motors 208 as long as trolley moving contactor 244 does not pick up current.

(16) As soon as trolley moving contactor 244 picks up current originating at operators contactors 849 during approach of the trolley to its destined alignment, from IIe(8) motive power from traction motors 208 is discontinued, whereupon the situation described in IIe(11) is restored, the trolley completing its traverse under its own momentum prior to final alignment.

(17) Motorised pumps 224 of each trolley hydraulic system as described in IId(15) to (18) are wired to the common trolley electrical supply main to run, subject to the control of their respective pressure switches, to maintain a continuous elevating tendency by trolley hydraulic rams 219 whose action is described in IId(10) to (14).

(18) Engagement of a trolley 200 with a parking pallet 88 is carried out at a common alignment by the elevation of the trolley frame 201 within respect to the adjacent lift or parking deck, by the action described in IId(17), electro-magnetic release valve 228 being sprung to close automatically when its operating solenoid thrust is relaxed from an absence of energising current.

(19) Disengagement of a trolley 200 from a parking pallet 88 is carried out at a common alignment by the depression of the trolley frame 201 with respect to the adjacent lift or parking deck, by the action described in IId(18) electromagnetic release valve 228 being arranged to open by the action of its operating solenoid when energised.

(20) Energising current to electromagnetic release valve 228 is controlled by operators pallet engagement switch 850, which when closed allows current from the operators supply to energise valve 228 and when opened breaks the supply to the valve.

(21) From IIe(18), engagement of a trolley with a pallet depends upon accurate initial mutual alignment at all times, and it therefore follows that before any engagement between a trolley and a pallet is made, it is necessary that the particular pallet shall have been placed in the same position at which engagement is to be made.

(22) In order not to impede any of the various access movements described in IIa(1) to (13), it is necessary that when resting on the adjoining parking deck all pallets shall conform to the general geometric pattern described in Ia(1) to (6) and illustrated by FIGURE 1, since if allowed to rest elsewhere along their respecting parking axes, the paths available to other pallets could be obstructed, and as pallets might also overlap the inner boundary WXYZ of any parking deck, the vertical passage available to the access lift cage could be obstructed.

(23) For all normal operations between any of the alternative trolley aligments and via either No. 1 end of No. 2 end of the lift, the relative circumferential length of trolley moving and fixed contactors 244, 246, 247 and 248 is proportioned to meet the necessary standard of accuracy described in IIe(22) is automatically satisfied as a consequence of IIe(7), means of adjustment being provided at the trolley contactor mountings such that the relative spacing between the fixed contactors, and timing of the moving contactors 244 can be matched to suit the geometric spacing of the pallets in their parked alignments.

(24) From IIe(18) and (19) elevation and depression of trolley frames 201 with respect to their adjoining tracks, are at all times under operators control, and unless these operations are performed at any normal destined trolley alignment along its adjoining track, the requirements described in IIe(21) and (22) are not necessarily fulfilled.

(25) All disengagements of trolleys from pallets are therefore confined to destined trolley alignments only, by overriding the control circuit linking operators pallet engagement switch 850 with magnetic release valve 228 at the respective trolleys by means of overriding switches 254 operated by relay solenoids 255.

(26) Overriding relay solenoids 255 are wired in parallel with traction motor starter control solenoids 249 to trolley moving contactors 244 in order to act only when traction motor control circuit solenoids 249 are energised, and to be maintained in the open position at all other times, by the action of a return spring.

(27) Due to the return spring action, the circuit controlling electromagnetic release valve 228 is maintained in the open condition, and since magnetic release valve 228 is thereby prevented from being operated, engagement between trolley and pallet is sustained as described in IIe(18) being locked as described in IId(17). When solenoid 255 is energised, overriding switch 254 closes to permit release valve 228 to be operated and from IIe(11) and (16) this condition occurs at alignment positions only.

(28) Under the circumstances described in IIe(27) and from IId(12) all traverses are necessarily made with the respective trolleys in the elevated attitudes only. Between successive parking and withdrawal movements however, it is necessary for the trolleys to run unladen, i.e. carrying no pallets, and from IIe(18) and IId(12) also, it is necessary for an unladen trolley to pass beneath a destined pallet before engagement is made therewith. Furthermore if permitted to run in the elevated attitude, an unladen trolley could foul any pallet resting on the parking axis being traversed.

(29) Absence of pallets from trolleys is therefore detected at the trolleys by means of limit switches 256, the vertical plungers of which are arranged to extend above the flat upper surfaces of trolley frames 201 under spring action. When the pallet detector plungers are extended, limit switches 256 are arranged to complete an alternative circuit from the trolley supply main, to energise electro-magnetic release valves 228 such that the trolley frames are maintained in the depressed attitude necessary to satisfy the requirements in IIe(28).

(30) For engagement to take place between a trolley and a pallet from IIe(18) energising current to electro-magnetic release valve 228 is not required. The alternative release valve energising circuit initiated by detector limit switch 256 is therefore arranged to be broken for engagement by means of circuit breaking switch 257 mechanically co-ordinated to overriding switch 254 to open when solenoid 255 energised and to close under the same return spring action as in IIe(26).

(31) Since from IIe(11) and (26) solenoid 255 is energised at alignment positions only, electro-magnetic release valve 228 is allowed to close at alignments only, by the absence of alternative energising current such that engagement between a trolley and pallet can take place only at alignment. Upon the completion of engagement, current to release valve 228 is cut off completely by the depression of the detecting plunger of limit switch 256 in a manner contrary to that described in IIe(29) and caused by the presence of the engaged pallet at rest on the flat top of trolley frame 201 when in the elevated position.

(32) As a result of the operations described in IIe(31) a situation identical to that described in IIe(27) is set up and which can only be changed as described in 11e(19) and (25) when operators control over disengagement is available.

(33) To ensure that laden and unladen pallets are correctly secured in the left cage as described in IIc(5) at the start of all vertical and angular traverses all trolleys 200 are arranged to depress automatically on arrival at their respective lift central alignments. Electro-magnetic release valves 228 are therefore wired in series with fixed trolley contactors 271 to operators complementary selector contactors 846, which are energised whenever the central lift trolley alignment is required as described in IIe(11).

(34) Contactors 271 are closed by moving contactor 272 mechanically linked to contactors 252 and 253, when solenoid 249 is energised, such that from 11e(7) electro-magnetic release valve 228 is energised only when the respective trolley has attained central lift alignment, the energised circuit forming a parallel byepass loop to engagement switch 850, which is cancelled as soon as a new destined translation alignment is set up by the operator, thereby permitting electro-magnetic release valve to close and the trolley frame to elevate during the start of the succeeding outward traverse.

*(f) The hoisting carriage (see FIGURE 8)*

(1) The hoisting carriage 300 is a wheeled vehicle with an open upright rectangular frame arranged to embrace the rotating cage 100 in order to convey this member and its contents along a vertical track within the tower structure such that the decks of the cage can be aligned at the various levels of the tower decks.

(2) The upright frame of the hoisting carriage is formed of four main structural members, comprising: bottom horizontal cross stay 301, two identical vertical side members 302 and top horizontal cross stay generally disposed as shown in FIGURE 8.

(3) Bottom stay 301 is formed as boxed girder which is symmetrical about both longitudinal and traverse axes, and which acts as a beam loaded at the axial intersection by the dead weight of the rotating cage. The central loading is transmitted from the shouldered seating of the lower lift pivot journal 117 to the combined radial and axial thrust being 304 contained in housing 305 which may rest directly on the stay top plate 306 or be supported therefrom by intermediate elastic mountings 307.

(4) Bottom stay side plates 308 are extended outwards at 309 to contain secondary buffing shock absorbers 310 on the same vertical axes as main shock absorbers 20 described in Ic(13).

(5) The bottom stay is joined at each end to vertical members 302 which transmit the combined loading of cage and stay equally to two sets of balance gear 400 and hoisting gear 420.

(6) The horizontal cross section or vertical member 302 and the adjoining points of attachment 311 and 312 in bottom and top horizontal stays 302 and 303 respectively is based on a rectangular form proportioned to clear spaces *f1, g1, h1, j1* and *f2, g2, h2, j2* of the top tower decks described in Ib(10).

(7) Between bottom and top stays 301 and 303, the rectangular profile of vertical members 302 is extended inward in the planes of the decks of the rotating cage to adjoin the periphery of each deck with a radial working clearance in the form of lugs 313. The lugs are shaped to fill gaps in the trolley tracks on neighbouring parking axes AOG and EOL, which occur in area F1, G1, H1, J1 and *f2, g2, h2, j2* of each parking deck.

(8) The inward faces 314 of vertical members above all filler lugs 313 are formed to a tapered profile in order to clear the edges of pallets 88 when the latter are being moved along axes AOG and EOL.

(9) The upper ends of the vertical members 302 are stiffened to anchor balance weight cable shackles 364 and hoisting gear drawbar guides 365, through which the combined total weight of all lift components are transferred from the hoisting carriage frame.

(10) The vertical side members are joined at their upper ends by top stay 303, which is symmetrical about both longitudinal and transverse axes. The top stay is formed as a light-weight girder which carries no major vertical loading, but which is braced for lateral stiffness. At the axial intersection, and vertically above the axial intersection of 301 it supports housing 315 containing axially floating, radial, bearing 316 which engages with upper pivot journal 113 of the rotating cage.

(11) The outer face of each vertical member of the hoisting carriage frame is recessed centrally through the full height in order to contain the inner sections of the vertical track 380.

(12) The upper and lower ends of each vertical member 302 are arranged to accommodate guide wheels 317, which are supported between widely spaced axially locating radial bearings 318 to rotate about fixed axles 319, the ends of which are anchored by suspension bars 320.

(13) Suspension bars 320 may be rigidly attached to 302 or alternatively resiliently supported therefrom by means of intermediate elastic mountings 321 arranged in suitable housings, and which may be preloaded to provide a side controlling force between the hoisting carriage and the vertical track 380.

(14) Vertical track 380 consists of two opposed sets of double bull head or rectangular section rails 381 supported by saddle chairs 382 from baseplate member 383 which are secured along the inner faces *g1, h1* and *g2, h2* of columns D1 and D2 of the tower structure as described in Ib(11) and IIf(21), as shown in FIGURE 9.

(15) Saddle chairs 382 support twin rails 381 such that the rails are separated apart by a continuous parallel gap G and such that the backs of the rails clear the inside profile of the chairs as shown in FIGURE 9 at X, both rail heads being transversely in line, and symmetrically disposed about the common diametral axis MOF of the tower.

(16) Guide wheels 317 have a common cylindrical peripheral profile, forming twin treads 322 which engage with the heads of rails 381. The two treads are separated by a central flange 323 the width of which is equal to rail gap G and which engages with the inner flanks of the twin rails.

(17) In the manner indicated in IIf(16) the hoisting carriage is constrained to move such that its longitudinal and transverse central axes coincide with diametral axes MOF and COJ of the tower respectively, in order to cause the axis of rotation OO of the lift cage to coincide with the common vertical axis of the tower, at all levels.

(18) At all points along the vertical track where the lift decks may be aligned with the decks of the tower, the hoisting carriage can be positively located at the appropriate level by means of spring operated self acting bolts 324 arranged to slide in guides 325 attached to hoisting carriage frame, which engage with catch plates 326 secured to the vertical baseplates 383 at intervals to suit each parking deck.

(19) Catch plates and bolt gear are arranged on both sides of each set of rails such that the hoisting carriage is supported at four points when aligned to suit any parking deck, the flat undersurface of each bolt U resting directly on the flat upper surface T of each catch plate.

(20) When approaching an alignment position from below or above, bolts 324 are allowed to extend prior to engagement, under the action of springs 327. When the lift cage is rising, the bolts follow the tapered inner profiles of the catchplate causing temporary retractions until alignment is obtained, when the springs 327 cause repeat extension to secure lift in position. When the lift is lowering, the extended bolts engage directly on contact.

(21) The rate of approach to alignment is regulated by the winding gear described in III in order to minimise the magnitude of impact on contact, and residual shocks may be either transmitted directly from the catchplates to the tower columns by track baseplates rigidly secured thereto or alternatively absorbed by elastic bushes 328 mounted at intervals along the tracks to act in shear, between the baseplates and rigid housings 329 incorporated in the respective columns of the tower.

(22) Lift cage 100 is rotated by means of a friction drive between the internal cylindrical surface 119 of the drive ring suspended below the lower lift deck and the periphery of resilient tyred roller 330 attached to the hoisting carriage frame.

(23) Roller 330 rotates on a vertical shaft and bearing assembly 331 driven from motor 332 through reduction gear box 333, all of which are supported by housing 334.

(24) Housing 334 is attached to the bottom stay 301 by means of pivot 335 to swing about a vertical axis such that roller 330 is brought into contact with drive track 119 with an adhesive force provided by compression spring 336 acting between swinging housing extension 337 and abutment 338 formed on the stay structure.

(25) Rotating cage 100 can be positively located to suit all diametrical pairs of parking positions by means of self acting spring operated bolt 339 which engages in one of the slots in indexing ring 120 described in IIc(11) and appropriate to the required axis.

(26) Bolt 339 is arranged to slide under the action of compression spring 340, in guide yoke 341 which may be rigidly attached to bottom frame stay 301 or alternatively be suspended therefrom by means of intermediate elastic mountings 342, provided for the absorption of the tangentially acting impact when the angular motor of the rotating cage is arrested by bolt 339, from either direction of rotation.

(27) During approach to engagement with indexing ring 120 bolt 339 is released in advance of alignment from either direction, to bear onto the edge of ring 120 in order to apply an initial braking force to the rotating member and so minimise tangential impact, at alignment. The nose of bolt 339, and the corners of the notches in 120 are radiused and generally shaped as indicated in FIGURE 6 to facilitate smooth retardation at end of each angular traverse.

(28) For movements subsequent to engagement bolts 324 (IIf(18) to (21)) and 339 (IIf(25) to (27)) are arranged to be withdrawn by electrically controlled local thrusting mechanisms which may be either hydraulically, pneumatically or solenoid operated.

(29) When hydraulically operated as shown in FIGURE 8 single acting cylinders 343 and 344 oppose and overcome the action of compression springs 327 and 340 respectively by means of intermediate mechanical linkages 345 and 346, fluid under pressure being supplied to the respective cylinders by motorised pump 347 from reservoir 348, items 347 and 348 being common to both bolt systems.

(30) During all operations of the lift, pump 347 is controlled by pressure switches 349 and 350 in the cylinder pipe lines 351 and 352 respectively, to run at all pressures up to that necessary for bolt withdrawal and to cut out at pressure attained above this valve. The pressure switches are wired in parallel circuits common to pump motor control to enable fluid to be supplied independently to either branch of the system.

(31) Each bolt when withdrawn is hydraulically locked clear of engagement by fluid trapped in its supply pipe branch by check valve 353 and 354 situated between pump outlet and entry to the respective cylinder pipe line branches.

(32) Movement of bolts 324 and 339 into engagement under the action of springs 327 and 340 is controlled by release of fluid from the respective branch pipes by means of electro-magnetically operated valves 355 and 356 which return the released fluid to reservoir 348 for further use, valves 355 and 356 being timed to operate in accordance with the retardation to rest of the hoisting carriage and/or rotating cage respectively.

(33) When pneumatically operated the layout would be generally analogous to that described in IIf(29) a constant supply of compressed air being maintained in reservoir 348 by motorised compressor 347 acting under the control of pressure switch 349 only, situated on reservoir 348 and operating according to air pressure therein.

(34) Each bolt when withdrawn clear of engagement is locked pneumatically by air trapped in the respective branch, by check valves 353 and 354 any fall in cylinder air pressure being restored via the appropriate check valve from the common supply.

(35) Movement of bolts 324 and 339 into engagement under the action of their respective springs is controlled by release of air from the appropriate branch pipes by means of electro-magnetically operated valves 355 and 356. The valves exhaust their respective cylinders to atmosphere and cut off the supply of air from the reservoir simultaneously, each valve being proportioned and timed to operate in accordance with the retardation of hoisting carriage or rotating cage respectively.

(36) When solenoid operated each bolt cound be connected directly or by means of intermediate mechanical linkage, to the moving core of a solenoid. For bolt withdrawal each solenoid would be energised by an electric current flowing in a circuit associated with the control of the respective traversing motor. (Viz. winding or rotating motors) such that during the operation of the appropriate motor the bolt is magnetically locked out of locating engagement.

(37) When locating bolts 324 and 339 are allowed to enter engagement with the respective mating members 326 and 120, the full extent of each resulting bolt movement is registered independently by means of limit switches 357 and 358 wired in series to form one circuit which when completed causes trolley master relay solenoid 851 to be energised from the common supply, to close all trolley control circuits. Hence when all bolts are fully extended (i.e. hoisting carriage and rotating cage both positively located) a current flows in the common series circuit, which permits control current to be supplied to all trolleys 200 and so be caused to leave the lift cage as required. When hoisting carriage and/or rotating cage are not positively located (i.e. when bolts 324 and/or 339 are not at the full extent of travel the circuit is broken and since no current flows trolleys 200 are prevented from leaving the cage, thereby avoiding conflict with the motions of the lift).

(38) The electrical circuits associated with items IIf(22), (28) and (29), (30), (32) or (33), (35) or (36) and (37) together with circuits associated with IIc(15), (16), (17) and (20) are gathered to centralised terminal boxes 359 and 360 attached to hoisting carriage top stay 303, where connection is made to multi-core flexible cables 570 anchored thereto, to convey the various circuits to their respective sources of supply and control within the tower structure.

*(g) Rotational control of lift cage.—(See left hand side of FIGURE 10)*

(1) The mechanical elements of the drive to rotating cage 100 from motor 332 are described in IIc(11) and IIf(22), (23) and (24), motor 332 being a reversible separately excited direct current machine, the armature of which is arranged for control by one of two mutually opposed starter circuits which are arranged appropriately to the alternative directions of rotation and energised from common lift supply mains.

(2) Considering the lift as viewed from above in both of the alternative cases, the armature of motor 332 is arranged to rotate clockwise when under the control of starter 150 and to rotate anticlockwise when under the control of alternative and opposite acting starter 151.

(3) Motor Starters 150 and 151 are arranged to act only when their respective relay solenoids 152 and 153 are energised, the armature cores of solenoids 152 and 153 being mechanically coupled, such that one only of starters 150 or 151 is activated at any one time. When neither of solenoids 152 and 153 are energised, both of the alternative starter circuits are broken thereby breaking the armature circuit of motor 332 to prevent rotation.

(4) The segments 141, 142 and 143 which make up circular conductor ring 140 constrained to rotate with the lift cage 100 as described in IIc(19), are isolated by gaps of longer circumferential length than the circumferential length of angular positional contactors 144a, b, c, etc., such that continuity of contact is broken at intermediate points as the gaps are negotiated in turn by successive contactors 144a, b, c, etc.

(5) Of circular conductor ring 140, and including for the isolating gaps described, segment 141 is proportioned to subtend 180° about common central vertical axis O, segment 142 is proportioned to have the same circumferential length as each of positional contactors 144a, b, c, etc., and segment 143 is arranged to subtend the remaining circumferential length of conductor ring 140.

(6) The radial bisector of the circumferential length of rotating segment 142 is arranged to lie parallel to, or correspond with the direction of lift deck track recess axes PQ and RS such that segment 142 denotes No. 1 end of the lift cage, and hence the relationship between rotating segment 142 and fixed angular positional contactors 144a, b, c, etc., defines the direction of the lift with respect to the parking decks of the tower structure.

(7) Segment 142 is wired to electro-magnetic release valve 356 together with relay solenoid 154 arranged to break the circuit feeding current to starters 150 and 151, when segment 142 is energised.

(8) Segments 141 and 142 are wired to relay solenoids 152 and 153 respectively such that when segment 141 is energised, starter 150 operates, and the segment 143 is energised starter 151 operates.

(9) The circuits associated with segmental contactors 141, 142 and 143, are conveyed from lift cage 100 to hoisting carriage 300 by means of slip ring and contactor sets 145, 146 and 147 respectively.

(10) Each of angular positional contactors 144 fixed to hoisting carriage frame about common vertical axis O as described in IIc(19), is wired direct to a fixed operators selector contactor 830 to form part of a corresponding series at the central control point.

(11) Contactors 830a, b, c, etc., are spaced at equal circumferential intervals along and are subtended from the pivoting axis of the operators angular selector lever 831 upon which is mounted contactor 832, arranged to slide over contactors 830a, b, c. (See also FIGURE 18.)

(12) During normal operation of the lift trolleys 200 negotiate No. 1 end only, and under this condition operators moving angular selector contactor 832 is energised from a source of current at constant potential.

(13) When rotating segment 142 is energised, from IIf(7) current to the armature of motor 332 is cut-off by the action of relay solenoid 154, and magnetic release valve 356 is energised to permit engagement of bolt 339 with indexing ring 120 under the action of self acting spring 340, as described in IIf(26) and (27). Also, due to its limited circumferential length rotating segment 142 can only be energised to or near to one of fixed angular positional contactors 144, and from IIc(19) as contactors 144 correspond only with each diametral parking axis of the tower, therefore, rotating cage 100 is maintained at or brought to rest at the angular position whose contactor 144 receives current originating at angular selector contactor 832.

(14) When operators selector lever 832 is moved to suit a different angular relationship between lift and tower, current to segmental contactor 142 is cut-off, as a consequence of which electro-magnetic release valve 356 closes and bolt 339 is withdrawn from engagement with indexing ring 120 as described in IIf(28) to (31) etc., such that rotating cage 100 is rendered free to rotate.

(15) As a result of the movement of operators selector lever 831 to suit another angular relationship between lift and tower, current from live operators moving selector contactor 832 passes though the corresponding 830 to 144 contactor circuit such that either of rotating segmental contactors 141 or 143 may pick up current, according to the relationship created between the newly defined destined angular position and the original angular position at which rotating cage 100 was at rest.

(16) From IIg(8) and (2) when rotating segment 141 is energised lift cage 100 is caused to rotate clockwise by the action of motor 332, and when rotating segment 143 is energised lift cage 100 is caused to rotate anticlockwise by the reverse action of motor 332. Hence the direction of rotation of lift cage 100 is determined from the relationship described in IIg(15) such that of the two rotary traverses possible to serve any newly destined position, the shortest, and hence the quickest is always selected.

(17) In the case of a rotary traverse required to extend through 180°, which arises when the destined angular position lies diametrically opposite to the originating angular position of lift cage 100 two equal and opposite alternative courses would be possible to arrive at the same result. To avoid ineffective directional selection in this case therefore, lift cage 100 is arranged to rotate in a clockwise direction only since, as rotating segmental contactor 141 subtends 180° as described in IIg(5), the end of contactor 141 lies diametrically opposite rotating segmental contactor 142, and hence diametrically opposite to the originating angular position.

(18) In the general case, rotary motion of the lift cage initiated as described in IIg(14) to (17), is continued by motor 332, as long as either of rotating segmental contactors 141 or 143 pick up current originating at operators angular selector contactor 832.

(19) As soon as rotating segmental contactor 142 picks up current originating at contactor 832 during approach of lift cage 100 as destined alignment from IIf(7) motive power from motor 332 is discontinued, whereupon the situation described in IIg(13) is restored, lift cage 100 completing the remainder of its traverse under its own momentum, prior to final location.

(20) In interchange movements carried out at any one vertical alignment, as described in IIa(9) to (11) to enable trolleys 100 to enter and leave any one parking axis from any one aligned lift deck 101, in succession, the lift cage is rotated through 180° preceding or succeeding the nominated movement required, such that trolley axes PQ and RS are brought in turn into alignment with the particular parking axis. If the trolley $200n$ performing the nominated movement negotiates No. 1 end of rotating cage 100 therefore, succeeding or preceding trolley $200m$ will negotiate No. 2 end of the lift in order to serve the same parking axis served by trolley $200n$ and will run in the reversed directions relative to the lift during its traverses.

(21) Under interchange circumstances, and in a manner contrary to that described in IIg(6) therefore, rotating segment 142 is required to denote No. 2 end of the lift to suit the exchange and reversal of trolley $200m$ necessary for entry into the same parking axis as that negotiated by trolley $200m$.

(22) To meet the requirement outlined in IIg(21) and arising from IIg(20), each of angular positional contactors 144 on the hoisting carriage frame and wired direct to operators fixed angular selector contactors 830 as descibed in IIg(10) is wired additionally to complementary operators fixed selector contactor 833.

(23) Operators complementary fixed selector contactors 833 are mounted generally adjacent to operators fixed angular selector contactors 830, to lie in an arc concentric with that subtended by contactors 830, and at the same equi-angular intervals, as described in IIg(11), such that contactor 833$a$ corresponds with contactor 830$a$, contactor 833$b$ with 830$b$, contactor 833$c$ with 830$c$, etc.

(24) An additional moving contactor 834 is mounted on operators selector lever 831, at the same relative spacing with respect to contactor 832 as that of contactor 833$x$ with respect to corresponding contactor 830$x$, such that moving contactors 830 and 833 make simultaneous contact with any pair or corresponding contactors 830/833$a$, 830/833$b$, 830/833$c$, etc., at any one selected angular alignment $a$, $b$ or $c$, etc.

(25) Each of complementary contactors 833 is wired to the angular positional contactor 144 diametrically opposite to the angular positional contactor 144 wired to the corresponding operators selector contactor 830. Hence angular positional contactor 144$a$ is wired to complementary contactor 833$g$ in addition to operators selector contactor 830$a$. Similarly angular positional contactors 144$b$, $c$, $d$, etc., are wired to complementary contactors 833$h$, $j$, $k$, etc., in addition to selector contactors 830$b$, $d$, etc., respectively.

(26) For the performance of the interchange movement described in IIa(9) to (11) as described in IIg(20), current to operators moving angular contactor 832 is cut off and operators moving complementary contactor 834 is energised instead. This operation is co-ordinated with associated reversal of trolleys $200m$, and as a consequence of the transfer of current the angular positional contactor 144 diametrically opposite to that normally represented by the position of operators selector lever 831 is energised.

(27) The rotating segmental contactor 141 or 143 opposite to that which would normally be energised, therefore, picks ups current and causes a rotary traverse to be made, generally as described in IIg(13) to (19) the direction of rotation of lift cage 100 being such that the shortest and quickest traverse is made to attain the destined reversed position at which No. 2 end of the rotating cage comes adjacent to the selected parking axis, instead of No. 1 end as indicated in IIg(12).

(*h*) *Hoisting gear (400)*—(*See FIGURES 4 and 9*)

(1) The access lift is hung from both ends of lattice girder 470 by means of two sets of equally loaded symmetrically disposed support cables 401 arranged in pairs about columns D1 and D2 of the tower structure to lie in vertical planes parallel to the diametral axis of the columns, and which lie within the transverse width of the hoisting carriage clearance sloth $f_1$, $g_1$, $h_1$, $j_1$ and $f_2$, $g_2$, $h_2$, $j_2$.

(2) The inner lengths of support cables 401 lie parallel to the rails of vertical track 380, and the inner end of each cable is attached to support shackle 364 anchored to hoisting carriage frame as described in II$f$(9).

(3) Each of cables 401 is then carried in succession over idler pulleys 402 and 403 such that its outer length lies parallel to the outside faces $g_1$, $h_1$ or $g_2$, $h_2$ of the adjacent column D1 or D2, the radial width of which tapers outward from the top downward as indicated in I$b$(12) and shown in FIGURE 4.

(4) The outer ends of each pair of cables are attached by means of shackles 404 to equalising beams 405 which unite the parallel cables for attachment to balance weights 406 using central pin 407.

(5) Balance weights 406 are in total equal to a major fraction (80% or thereabouts) of the total unladen weight of all principal components of the lift. Viz. items 88, 100, 200 and 300, vacant of vehicles.

(6) Balance weights 406 are constrained to follow the tapered outer profile of columns D1 and D2 by guide wheels 408 pivotally attached to each weight and which roll along a track of light rails 409 laid along the outside faces $g_1$, $h_1$, $g_2$, $h_2$ of the columns, for the full extent of possible movement.

(7) Guide wheels 408 are flanged about their rims for engagement with the rail head flanks of 402 in order to provide lateral stability to the balance weights, and have cylindrical treads which bear normally on the rail head surfaces.

(8) The balance weights are caused to act constantly towards their respective tracks by the dead weight compoment acting normal to the rail surface due to the taper I$e$(3) as columns D1 and D2, in order to provide radial stability during movement of the weights along the passage described in I$b$(13).

(9) Balance weight cable shackles 364 may be either rigidly attached to the hoisting carriage frame or as an alternative, contrived to act against compression springs 410 under the action of cable tensile loading. In the event of one balance weight cable breaking the load would then be temporarily concentrated onto the adjacent cable through the action of equaliser beam 405. The expansion of spring 410 when relieved of load would be utilised to trip a limit switch 411 incorporated in a series circuit with similar limit switches at the other shackles through which an electric current normally flows. Breakage of the circuit could then be utilised to warn of balance weight cable breakage, and/or arranged to override one or more appropriate lift control circuits, transfer from hoisting carriage to control being via core in the hanging control cable.

(10) Motive power for the elevation of the access lift is transmitted from the drums of winding gear 500 situated on lattice girder 470 by means of flexible haulage cable 420.

(11) Haulage cable 420 passes from main winding drum 501, in turn, over idler pulley 421, pulley sheave 418 and idler pulleys 422 and 423, pulley sheave 418 and idler pulley 424 respectively to secondary winding drum 502.

(12) Idler pulleys 421 to 424 are generally similar to balance gear idler pulleys 402 and 403, all pulleys being arranged in transverse co-axial pairs supported from the upper struts of the lattice girder 470, which transmits the total loading due to balance weights, access lift and winding gear, by means of suitable seating to columns D1 and D2.

(13) The yokes of pulley sheaves 418 and 419 are extended downward in the form of drawbars 417 which pass through guides 365 attached to the hoisting carriage frame as described in II$f$(9), and are connected directly or alternatively, by means of intermediate mechanical linkage 425 to compress haulage springs 426 when the haulage cable 420 is in tension due to normal loading.

(14) The force on draw bars 417 necessary to compress springs 426 to the full extent of their working travel, is in magnitude, a small part of the minor fraction of the lift cage unladen total dead weight, is i.e. part of the load not balanced by weights 406 (see IIh(5).

(15) Draw bars 417 are shouldered at 415 to abut against stops 416 when springs 426 have attained full working travel, in order that full drawbar force i.e. half minor fraction plus half payload, can be transmitted direct to each end of the hoisting carriage frame, during all normal operations.

(16) Springs 426 are proportioned such that in the event of breakage of haulage cable 420, when the tension on drawbars 417 would be relatexd, sufficient energy is stored between both springs to effectively apply toggle brakes 430, which act against the rails of the vertical track to arrest downward motion of the lift.

(17) The action described in IIh(16) may be extended to release locating bolts 324 from their withdrawn positions by means of a mechanical linkage arranged to override release valves 355 described in IIf(32) or (35), or to break the energising circuit to solenoids described in IIf(36) by means of a trip switch.

(18) The general configuration of the toggle brake mechanism 430 is shown in FIGURE 9, the layout and action of which are contrived as follows:

(19) Drawbars 417 extend downward beyond shoulder 415 to connect with one end of lever 431 at pin joint 432. The other end of lever 431 is pivoted at pin joint 433 to the centre of equalising beam 434 and, at intermediate pin joint 435 connects with spring yoke 436 which slides in guide 437 attached to the hoisting carriage frame. Spring yoke 436 is maintained in tension due to spring 426 which is contained between guide 437 and yoke spindle end washer 438 held in place by nuts 439.

(20) Also pivoted at intermediate pin joint 435 is straight link 440, the opposite end of which joins the centre of equalising beam 441 by means of pin joint 442, to form in conjunction with the length of lever between joints 435 and 433, a toggle linkage acting against equalising beams 441 and 434.

(21) Under normal working conditions the toggle linkage is maintained in an arched attitude by the action of draw bar tension at pin joint 432, intermediate pin 435 being held at a higher relative level than end pins 433, 442 of the linkage.

(22) When tension in draw bars 417 is relieved spring 426 is allowed to expand causing the toggle linkage to flatten and force equalising beams 434 and 441 apart.

(23) Equalising beam 434 is connected at each end to compression trunnions 443 extended to pass through guide 444 attached to the hoisting carriage frame, to push directly against brake block 445 arranged to act on the rear rail head surfaces.

(24) Equalising beam 441 is connected at each end to tension trunnions 446 which transmit the thrust through tension pins 447 to brake block 448 arranged to act on the far rail head surfaces. Tensions pins 447 are guided at their inner ends by bushes 449 supported from hoisting carriage frame, and pass through the centres of the respective compression trunnions and near brake blocks, and between the twin rails of the adjacent tracks.

(25) Due to the large relative length of drawbar links 425 and spring yokes 436, lateral freedom is available at pin joint 435 to enable the toggle gear centred there-at, to accommodate itself under all conditions to the positions taken up by the opposed brake blocks 445 and 448 in relation to the adjacent rails.

(26) Under normal conditions therefore the brake blocks are held apart owing to the arched attitude of the toggle links, which is endorsed by tension springs 450 acting on and between equalising beams 434 and 441.

(27) In the event of cable breakage, due to the configuration of the haulage cable, both sets of brake gear act simultaneously, and because of the lateral freedom available to each set of gear, equal loads are applied between the inner brake blocks 445 and the outer brake blocks 484 of each set.

III. LIFT WINDING GEAR

(a) Layout (1) The winding gear 500 consists of two motorised cylindrical winding drums 501 and 502 which rotate about parallel and horizontal axes, each drum being attached to one end of haulage cable 420 in the manner described in IIh(11).

(2) Drum 501 is capable of accommodating the full working length of haulage cable 420, and forms the main winding drum of the mechanism. Drum 502 is capable of accommodating a limited working length of haulage cable 420, sufficient to cover inching movements at all decks of the tower structure if carried out in succession and in one direction only, and forms the secondary winding drum of the mechanism.

(3) The ends of main drum 501 are extended outwards and about the axis of rotation to form hollow journals 503 and 504 for support by bearings 505 and 506 contained in housings 507 and 508 respectively, attached directly to common baseplate 509.

(4) Baseplate 509 is incorporated into lattice girder 470 described in IIh(1) and (12), such that the axis of rotation of main drum 501 lies transversely to the common diametral axis of columns D1 and D2 which is spanned longitudinally by lattice girder 470, and is off set away from mid span (vertical axis O) as far as possible from idler pulley 421 in order to minimise the angular misalignment of the intermediate length of haulage cable across the length of drum 501.

(5) Secondary drum 502 runs on bearings 510 which are supported by fixed spindle 511 attached by means of brackets 512 and 513 to subframe 514.

(6) Subframe 514 is hinged from a bottom transverse tie of lattice girder 470 by means of co-axial pin joints 549, such that secondary drum 502 lies between main drum 501 and idler pulley 424 adjacent to baseplate 509 and generally below the level of idler pulley 424.

(7) The swinging end of subframe 514 adjacent to baseplate 509 is constrained to move between lower stops 515 and upper stops 516 attached to 509, under the combined action of tension in cable 420 and opposing tension in balance springs 517. Displacement of subframe 514 is therefore proportional to cable tension, and thus acts as a measure of dead weight imposed on the lift cage by various vehicle loading combinations.

(b) Main drum motive power (1) In order to generally minimise the duration of all parking sequences the access lift (Section II) is worked up to fixed safe limits of acceleration and retardation common to all conditions of loading, during all principal modular vertical traverses, power of corresponding magnitude being transmitted through main winding drum 501.

(2) During access lift ascent, power is transmitted from winding gear main drum 501 to lift cage and during descent, power is transmitted from lift cage to main drum by means of haulage cable 420. Motive power attached to main drum 501 is therefore made capable of both providing or absorbing mechanical energy at the rate appropriate to the loading and velocity of vertical traverse of the access lift, under all normal working conditions.

(3) The capacity of the motive power coupled to main drum 501 is of such magnitude, that when the access lift is fully laden (i.e. vehicles of max. permissible weight in every position provided in the cage) a fair commercial balance is achieved between the time taken to complete a principal traverse over the full vertical range of lift movement, and the cost at which electrical energy is available, i.e. optimum operational factors.

(4) For a principal vertical traverse through one modular height only, the percentage of the total duration of the movement spent running at maximum power is defined in IIIb(3) if attained, is likely to be very small when compared with the corresponding percentage run at full power during a traverse covering several modular heights. Consequently a single modular traversing movement can be performed at a fraction of full power without significant increase of overall duration in comparison with the same movement performed at full power, and since a single modular traverse represents the minimum principal traverse to be attained, movement through one modular height may be performed at fractional power expenditure with no practical disadvantage.

(5) For a principal vertical traverse through two modular heights only, if performed at the same fractional power and to the same rates of acceleration and retardation as given in IIIb(3), the duration of the movement will be almost double that taken for a single modular traverse, because the distance over which the movement takes place is doubled. Alternatively if a double modular traverse is made at full power the duration achieved will be about equal to that for a single modular traverse at fractional power, since the percentage of the total duration spent at full power is limited by the acceleration and retardation components of this period. As the need for successive double modular traverses may frequently exist, this movement can be performed most advantageously at an intermediate power of about double that of the fractional power provided for single modular traverses.

(6) To satisfy conditions outlined in IIIb(1), (2), (3), (4) and (5) motive power to main winding drum 501 is divided in the ratio 1:2 or thereabouts between two motors 518 and 519 respectively, which are together made capable of meeting requirements laid down in IIIb(1) and (3).

(c) *Winding gear main drive*

(1) Power to main winding drum 501 is transmitted by means of a system of differential gearing 520 common to the drive shafts of motors 518 and 519. As shown in FIGURE 11 both motors are supported on outward extensions of common baseplate 509, such that their output shaft axes of rotation coincide with the axis of rotation of main drum 501.

(2) The output shaft from motor 518 is connected by means of flexible coupling 521 to main drum input shaft 522 which is free to rotate in bearings 523 and 524 housed in drum hollow extension journal 503 and drum intermediate partition disc 525 respectively, to drive input spur wheel 526 rigidly attached to 522.

(3) The output shaft of motor 519 is similarly connected by means of flexible coupling 527 to main drum input shaft 528 which is free to rotate in bearings 529 and 530 housed in drum hollow extension journal 504 attached to or integral with drum endplate 531, to drive input spur wheel 532 rigidly attached to 528.

(4) Input spur wheel 526 meshes with orbital pinions 533 and input spur wheel 532 meshes with orbital pinions 534. Orbital pinion 533 is integral with middle pinion 535 in all cases, each integral pinion being free to rotate on a fixed shaft 536 supported between drum partition disc 525 and drum end plate 531. Orbital pinion 534 is integral with middle pinion 537 in all cases each integral pinion being free to rotate on fixed shaft 538 supported between 525 and 531 such that middle pinion 537 meshes with middle pinion 535.

(5) The overall ratio of compound gear train 526; 533/533; 535 is arranged such the input torque from motor 518 is converted to a resultant torque at main drum 501 equal to the resultant torque at main drum 501 converted by compound gear train 532; 534/534; 537 from the input torque delivered by motor 519. The resultant torque at main drum is at all times capable of overcoming haulage cable tension due to access lift loading, the torque characteristics of motors 518 and 519 being proportioned to meet this requirement.

(6) By stopping input shaft 528 main drum 501 can be driven entirely by motor 518 in accordance with IIIb(3) and similarly, by stopping input shaft 522 main drum 501 can be driven entirely by motor 519 in accordance with IIIb(4). Also by permitting input shafts 522 and 528 to rotate in the same direction main drum can be driven by motors 518 and 519 simultaneously in accordance with IIIb(1) and (2).

(7) When not transmitting power input shaft 522 is prevented from rotating by brake blocks 539 acting on brake drum 540 integral with half of coupling 521 on 522, which are loaded by self-acting spring 541 through levers 542. When power from motor 518 is to be transmitted by shaft 522, brake blocks 539 are released from contact with brake drum 540 by means of solenoid 543 arranged to be energised simultaneously with motor 518.

(8) When not transmitting power input shaft 528 is similarly locked by brake blocks 544 acting on brake drum 545 which is integral with half of coupling 527 on 528, under loading applied by self-acting spring 546 through levers 547. When power from motor 519 is to be transmitted by shaft 528, brake blocks 544 are released from drum 545 by solenoid 548 arranged to be energised simultaneously with motor 519.

(d) *Winding gear secondary drive*

(1) Secondary winding drum 502 is driven by means of motor 550 through one or more stages of reduction gearing to provide a slow speed inching traverse to complete every principal traverse made by the access lift, to enable precise alignment between lift decks and corresponding parking decks to be quickly obtained without appreciable shock.

(2) Motor 550 is of relatively low power and as shown in FIGURE 11 drives a worm and wheel reduction unit 551 the output from which is transmitted by means of pinion 552 to spur wheel 553 directly attached to drum 502, motor 550 and gear unit 551 being mounted on subframe 514.

(3) When not in motion, winding drum 502 is locked against rotation by means of brake blocks 554 acting on brake drum 555 directly attached to drum 502. Brake blocks 554 are applied by means of self acting spring 556 acting through levers 557, and are released from contact with brake drum 553 by means of solenoid 558 which is arranged to be energised simultaneously with motor 548.

(4) The direction of rotation of winding drum 502 is at all times complementary with the direction of rotation of winding drum 501 such that the resultant inching movement on the access lift is always a continuation of the preceding main modular traversing movement, i.e. when drum 501 has wound, drum 502 winds, and when drum 501 has unwound, drum 502 unwinds, during any one modular traversing movement.

(e) *Winding motor controls*

(1) In accordance with the method of operation outlined in IIIb(2) to (6), the normal action of motors 518 and 519 is applied to wind haulage cable 420 on to main drum 501, so causing the access lift to ascent.

(2) When the access lift descends under the action of its own weight, cable 420 unwinds causing main drum 501 rotate in the reverse direction to IIe(1). Under these circumstances, motors 518 and 519 are arranged as required to act as generators in order to provide a loading which opposes the free fall of the lift, such that the rate of descent can be regulated to suit the chosen operational requirements.

(3) During any vertical traverse, the winding gear will experience torque variations which are generally proportional to (a) the unbalanced dead weight, (b) the total friction of the lift and (c) the rate of change of momentum of the total moving masses.

(4) During an ascending traverse maximum torque is required to accelerate the lift from rest until normal speed has been attained, since the combined mechanical resistance of components $(c)+(b)+(c)$ has to be overcome.

(5) At normal speed of ascent component c is no longer required the remaining components a plus b acting as a steady loading on the winding gear which absorbs the total power applied.

(6) During retardation from normal speed of ascent to rest, torque from the winding gear is reduced below that of components $a+b$ to directly produce an effect opposed to the upward motion of the lift.

(7) During a descending traverse, no initial torque in required to start the lift from rest, but an opposing torque is necessary to control the rate of acceleration c to normal speed.

(8) At normal speed of descent, the magnitude of the opposing torque must be increased to completely eliminate component c, components a minus b acting as a steady effort applied to the main winding drum.

(9) During retardation from normal speed of descent to rest, maximum opposing torque must be provided to resist the combined mechanical action of components $(a-b+c)$.

(10) In paragraphs IIIe(3) to (9) the torque variations on the winding drum are considered entirely for any particular access lift loading. As the limits of acceleration and retardation are to be common to all conditions of access lift loading (IIIb(1)), the winding gear is required also to accommodate all possible variations in dead weight imposed on the lift.

(11) Motors 518, 519 and 550 are all reversible direct current machines of orthodox construction incorporating brush and commutator gear, armatures and separately excited field magnets, and arranged to operate at about constant armature current for all steady load conditions, differing torque requirements being satisfied by appropriate regulation of field strength.

(12) The field magnets of motors 518 and 519 are proportioned such that when the access lift is fully laden, as defined in IIIb(3) normal lifting torque is developed by each machine at about 75% full field strength intensity provided, in accordance with IIIe(5).

(13) At the same field intensity as IIIe(12) accelerating torque requirement IIIb(4) is met by armature starting current limited at about twice normal constant running speed current.

(14) Retarding torque requirement IIIb(6) is met by diminishing normal armature current, whilst maintaining field strength at about same intensity as given in IIIe(12).

(15) Due to the opposing effect of friction, the torque required to oppose steady descent is less than normal lifting torque given in IIIe(12), for the same value of armature current. Normal opposing torque IIIb(8) therefore obtained at a proportionately lower field intensity, which for a fully laden lift as defined in IIb(3) is anticipated to be at about 45% of full field intensity provided in the motors.

(16) Steadily increasing torque requirement IIb(7) is met by a gradual build up of armature current with increase of generating speed, until normal opposing torque IIIe(15) is developed.

(17) Maximum opposing torque IIIb(9) is required initially at normal generated armature current. For retardation during descent therefore, field strength is arranged to be at the full intensity provided, generated armature current being diminished with reduction in speed.

(18) For a particular access lift loading the differing fixed values of field strength associated with conditions IIIe(12), (15) and (17), are met by applying appropriate values of current to the motor field windings. The differing values of current are obtained from a source set at fixed potential, by direct switching via alternative parallel sub-circuits of appropriate relative resistance, respectively, i.e. greatest resistance for weakest field and no resistance for full field strength.

(19) The comprehensive field strength variations implied in IIIe(10) are met by varying the value of potential set for IIIe(18) by means of a variable resistance 560 in series with the common supply to the field sub circuits.

Variable resistance 560 is mechanically linked to sub frame 514 the displacement of which is made proportional to the total dead weight associated with haulage cable tension as described in IIIa(7). Variable resistor 560 is arranged to have maximum resistance at no sub-frame displacement i.e. 514 rests against bottom stops 515, and to have minimum resistance at maximum sub-frame displacement i.e. 514 rests against upper stops 516. The field strength intensities of motors 518, 519 and 550 are therefore always directly related to access lift total dead weight, to enable the winding gear to automatically accommodate itself to all variations in lift loading.

(20) When changes of lift motion are made by changing the value of torque applied through the winding gear, surges in field strength are induced by the automatic field regulating feature described in IIIe(19) under the sub-frame torque reaction. This effect is controlled by haulage cable resilience and the inertia of the total subframe mass, the damping effect of which may be augmented by dashpot 559 proportioned to cushion the change in motion applied to the lift, in order to dissipate the resultant impulsive loading on haulage cable 420.

(21) As (i) armature current during acceleration from rest in an ascent (IIIe(13)) is limited to about twice normal steady load current at all loads (IIIe(11)), (ii) the armature current in the subsequent retardation diminishes from normal value to zero (IIIe(14), (iii) as the armature current during both acceleration and retardation of a descent diminish from normal value to zero IIIe(16) and (17) the magnitude of current variation is common to all four cases. Also (iv) the torque transmitted by the winding gear is adjusted by field strength to have a regular relationship to the motion and mass of the lift for all conditions, the duration of acceleration and retardation components of a vertical traverse is constant for all cases.

(22) From (i), (ii), (iii) and (iv) of IIIe(21) a common pattern of current variation with respect to time is able to perform all changes required in the motion of the lift, since variable resistors 561 and 562, FIG. 12a, are in series with the armatures of motors 518 and 519 respectively for starting purposes can be also used to diminish armature current for stopping.

(23) The common pattern of armature current variation is obtained by regulating the value of resistance in series with the armatures at any instant, to suit the state of motion of the access lift at the same instant, by means of motorised variable resistors operating to a fixed sequence of suitably chosen events.

(24) Variable resistors 561 and 562 in series respectively with motors 518 and 519, are coupled by means of electro magnetic clutches 563 and 564, and suitable reduction gearing to constant speed slave motors 565 and 566 FIG. 12a respectively.

(25) The value of each step of resistance in variable resistors 561 and 562, in conjunction with the relative spacing of its associated contactors, is proportioned to form part of the fixed sequence of events chosen for each resistor.

(26) Each slave motor and its associated electro-magnetic clutch are wired in parallel sub-circuits energised from a common control circuit.

(27) The slave motor sub-circuits are arranged to be broken at the end of variable resistor travel by limit switches 567 and 568, slave motors and gearing being made uni-directional by a ratchet of friction device to prevent reversal of the motorised action, and so maintain full armature current to the respective winding motors.

(28) The clutch sub-circuits are arranged to be broken by winding motor protective devices i.e. no-load and overload release units.

(29) Each variable resistor moving contactor component is arranged to return to the maximum resistance position under the action of a return spring which may be suitably damped for adjustment of the duration of diminishing current.

(30) Control of each winding motor is exercised by energising the respective control circuit to start, and breaking the control circuit to stop. When energised slave motor and clutch act together to drive the respective moving contactor through full working range, and then maintain this position. Breakage in the control circuit immediately releases the clutch, enabling the contactor to return at a predetermined rate to the starting position. Breakage of the control circuit to stop may be deliberate to suit control requirements, or automatic for protection of the motors, i.e. failure to safety, by means of overload and/or no load release devices 569.

(f) *Winding gear operational controls*

(1) In order that the access lift shall be operated in the manner outlined in IIIb(1) to (6), lifting control over the winding motors is exercised selectively, such that motor 518, or motor 519, may be applied to the load, or motors 518 and 519 may be applied together to the load, and so exert low, intermediate or full power as required.

(2) Similar combinations of motive power to IIIf(1) are used to control lowering of the access lift at differing normal rates of descent.

(3) The difference between lifting and lowering conditions is also selective, since the differing torque requirements are met by choice of one of several alternative field strengths.

(4) From IIIb(1) to (6) motive power application is most effective when related to the length of traverse, such that the longer the traverse to be made the greater the magnitude of motive power that can be effectively utilised. Comprehensive motive power selection at the start of any vertical traverse is therefore related to the destined position to be attained at the end of the same traverse, as follows.

(5) The multicore power and control cables 570 attached to hoisting carriage frame top stay as described in IIf(38), are hung from spring return cable reeling drums 571 mounted to rotate on lattice girder 470 of the tower structure, to contain sufficient cable to cover the full vertical traverse of the access lift, and positioned such that the cable hangs vertically under the tension of the reeling drum.

(6) One or both cable reeling drums are arranged to drive a single rotary contactor 573 over a ring of fixed isolated segmental contactors: 574a, b, c, etc., by means of reduction gearing 572 the ratio of which is such as to cause contactor 573 to travel over every segmental contactor once only during the full extent of access lift vertical travel.

(7) The number of segmental contactors provided is equal to the number of positions necessary for the hoisting carriage to assume to enable the lift to serve all floors of the tower, and the angular relationship is such as to represent alignment between lift decks and tower decks at all levels, when full length segmental contact has been established with the moving contactor 573.

(8) Each of the reeling drum fixed contactors 573 is wired direct to one fixed contactor 801 of a complementary series arranged in line at the operators controller. Sliding over fixed controller contactors 801 are multiple operators selector contactors 802, 803, 804, 805, 806, 807 and 808 arranged at the same linear spacing as for contactors 801, in an integral unit 810 under operators control.

(9) At full length contact, contactors 803 to 807 together span five consecutive fixed contactors 801, whilst each of contactors 802 and 808 is alone made long enough to span all the remaining fixed contactors, when the sliding unit is at the appropriate extreme of its travel.

(10) The position of central selector contactor 805 along the row of fixed linear contactors 801a, b, c, etc., is used to denote the destined position required of the access lift with respect to the tower, since each of fixed contactors 801 also corresponds to a lift and tower alignment because of its connection to a respective contactor 574.

(11) During the normal operation of the access lift cable reeling drum rotary contactor 573 is energised, and when the lift is at rest feeds current into one of the alternative paths linking segmental contactors 574a, b, c, etc., to their respective linear contactors 801a, b, c, etc., the particular path energised, corresponding to the relative alignment at the same instant existing between lift and tower, as follows from IIIf(7).

(12) As central operators selector contactor 805 has been nominated to define the destined position required of the lift in IIIf(10) and as the particular contactor of 801a, b, c, etc., energised from contactor 573 represents the deck level alignment between lift and tower at all times from IIIf(11), the relationship existing between the destined position and the energised position in terms of linear contactor spacings, corresponds at all times to the length and direction of the required vertical traverse to be made by the lift, in terms of modular heights.

(13) From IIIf(12) it follows that any vertical traverse required can be specified in terms of linear 801 fixed contactor spacings, such that the resultant destined/energised contactor relationship existing at the same instant can be identified with a particular contactor of the operators multiple selector 810, since contactors 802 to 808 are at the same spacings as contactors 801 (IIIf(8)).

(14) The contactor identified as described in IIIf(13) is associated with a particular combination of motive power at the main winding down, and in accordance with IIIf(4) the more remote the identified contactor is from central contactor 805, along multiple selector 810, the greater the magnitude of associated motive power. Also the direction of application of the motive power is determined from the order of the identified contactor with respect to the central contactor.

(15) Each of the contactors 802 to 808 of the operators selector 810 is wired direct to a particular solenoid of a three position double acting relay switch arranged to make or break the slave motor control circuit or in the case of contactor 805 the inching motor starter circuit, and one of the alternative field strength circuits of the respective winding motors 518, 519 and 550, the relationship between the motor control circuit and relay solenoids being as described in IIIf(16) to (19) and solenoid selector contactor relationship being as described in IIIf(21).

(16) The slave motor contactor of each relay switch is energised from a source of current at fixed potential, and the field selector contactor of each relay switch is energised from a source of current the potential of which has been adjusted to suit the access lift loading as described in IIIe(10) and (19).

(17) The slave motor and field selector contactors of each relay switch are mechanically linked by means of insulated yokes 811 and 816 directly coupled to double acting solenoid armatures, to operate between three linear positions "up," "mid" and "down." In the "mid" position, which is obtained automatically by the self centering action of yoke control springs 811a and b, 816a and b when none of the associated solenoids is energised to develop its particular thrusting action, the slave motor lifting and lowering field contactors are arranged to break their respective circuits, whilst the respective stopping field circuit contactors are arranged to be completed.

(18) In the case of motor 518 the lifting field circuit is completed when relay yoke 811 is in the "up" position by means of contactor FU1 under the "up" thrust of either of solenoids 812 or 813. When relay yoke 811 is in the "down" position the alternative field circuit for lowering is completed by contactor FD1 under the down thrust of either of solenoids 814 or 815.

The circuit of slave motor 565 is completed in either "up" or "down" positions, but not in "mid" position of yoke 811, by means of contactors AU1 or AD1, i.e. whenever one of solenoids 812, 813, 814 or 815 is energized. In the "mid" position, when none of the solenoids is energised the stopping field circuit of motor 518 is completed by contactor FS1.

(19) Similarly in the case of motor 519 the lifting field circuit is completed when relay yoke 816 is in the "up" position, by means of contactor FU2, under the "up" thrust of either of solenoids 817 or 818. When relay yoke 816 is in the "down" position, the alternative field circuit for lowering is completed by contactor FD2 when the "down" thrust of either of solenoids 819 or 820. The circuit of slave motor 566 is completed in either "up" or "down" positions, but not in "mid" position of yoke 816 by means of contactor AU2 or AD2, i.e. whenever one of solenoids 817, 818, 819 or 820 is energized. In the "mid" position when none of the solenoids is energised, the stopping field circuit of motor 519 is completed by contactor FS2.

(20) In the case of inching motor 550 the direction of rotation is selected in conjunction with the lifting or lowering field strengths, which are arranged respectively for winding or unwinding motion of drum 502, lifting field circuit being completed by contactor FU3 under the "up" thrust of solenoid 822 on insulated relay yoke 821, and alternative lowering circuit being completed by the reverse action of yoke 821 under the down thrust of solenoid 823. Relay yoke 821 is spring biased to stay set in the position achieved by the preceding solenoid impulse.

(21) The solenoids of the motor control relays are associated with the contactors of the operators moving contactor 810, as follows:

(a) "Up" solenoids 812 and 817 are together wired to outer contactor 802.

(b) "Up" solenoid 818 is alone wired to outer intermediate contactor 803.

(c) "Up" solenoids 813 and 822 are together wired to inner intermediate contactor 804.

(d) Inching motor starter solenoid 575 is wired to oppose circuit breaker solenoid 576 and in parallel with hoisting carriage release valve 352 to central destined contactor 805.

(e) "Down" solenoids 815, 823 and 825 together wired to inner intermediate contactor 806.

(f) "Down" solenoids 819 and 824 are together wired to outer intermediate contactor 807.

(g) "Down" solenoids 814 and 820 are together wired to outer contactor 808.

(g) General winding gear operation (1) In the normal course of operation, when the hoisting carriage is at rest within the tower structure, haulage cable 420 is relieved of most of its tension because the weight of the access lift is transferred to the tower structure by locating bolts 324 resting on catchplates 326 under the action of springs 327 as described in IIƒ(18) to (20), the residual haulage cable tension maintaining the toggle brake gear disengaged from the vertical track rail members.

(2) From IIIƒ(10), (11) and (12) the destined position of the lift when at rest, coincides with the alignment position, and so central contactor 805 of the operators moving selector 810 picks up current originating at the cable reeling drum moving arm live contactor 573.

(3) Current at contactor 805 maintains electro-magnetic release valve 355 in the open position thereby preventing locating bolt release cylinders 344 from developing any effective piston thrust, and hence maintaining the engaged position of locating bolts 324 as described in IIƒ(32).

(4) To initiate any vertical access lift traverse central contactor 805 of operators moving selector is aligned with the fixed contactor 801, which corresponds with the new lift alignment required in order to define the destined position as described in IIIƒ(10).

(5) As a consequence of IIIg(4) current at operators central contactor 805 is cut off such that magnetic release valve 355 closes to enable fluid pressure to be built up to cause cylinders 344 to retract locating bolts 324 from engagement, at a rate which co-ordinates the operation with the development of lifting torque as described in IIIg(7), (8) and (9) below.

(6) As a parallel consequence to IIIg(5) current originating at reeling drum movement contact 573 instead of being picked up by central contactor 805 is picked up by one of the remaining intermediate or outer contactors of moving selector 810, such that for an ascent either of contactors 802, 803 or 804 may be energized, and for a descent either of contactors 806, 807 or 808 may be energized, in accordance with total modular height up or down as described in IIIƒ(12) and (13).

(7) Hence for an ascent of three or more modular heights in accordance with IIIƒ(4) and (14) contactor 802 picks up current originating at 573 which from IIIƒ(21a) energises "up" solenoids 812 and 817 which cause contactors FS1 and FS2 to open, and contactors FU1, AU1 and FU2, AU2 to close as described in IIIƒ(18) and (19). The stopping fields of motors 518 and 519 are thereby exchanged for the respective lifting fields, and upon closure of contactors AU1 and AU2 variable resistors 561 and 562 are set in action by slave motors 565 and 566 driving through electro-magnetic clutches 563 and 564 respectively as described in IIIe(24), such that steadily increasing armature current is admitted to winding motors 518 and 519.

(8) For an ascent of two modular heights only, in accordance with IIIƒ(4) and (14) contactor 803 picks up current originating at 573 which from IIIƒ(21) energises "up" solenoid 818 which causes contactor FS2 to open and contactors FU2 and AU2 to close as described in IIIƒ(19). The stopping field motor 519 is thereby exchanged for the lifting field and upon closure of contactor AU2 variable resistor 562 is set in action by slave motor 566 driving through electromagnetic clutch 564 as described in IIIe(24) such that steadily increasing armature current is admitted to winding motor 519 only.

(9) For an ascent of one modular height only, in accordance with IIIƒ(4) and (14) contactor 804 picks up current originating at 573 which from IIIƒ(21c) energises "up" solenoids 813 and 822 which cause contactors FS1 to open and contactors FU1 and AU1 to close as described in IIIƒ(18) and (20). The stopping field of motor 518 is thereby exchanged for the lifting field and upon closure of contactor AU1 variable resistor 561 is set in action by slave motor 565 driving through electro-magnetic clutch 563 as described in IIIe(24) such that steadily increasing armature current is admitted to motor 518.

(10) At an intermediate point during the build up of the respective armature current(s) the potential reaches sufficient intensity to enable solenoid 542 and/or solenoid 548 to release their respective brake drums from engagement under the tension of the associated springs, to permit motors 518 and/or 519 to rotate and so drive main drum 501 as described in IIIc(7) and (8) respectively, to wind on haulage cable 420.

(11) Since haulage cable 420 is relieved of most of its tension when the hoisting carriage is at rest, as described in IIIg(1), motor torque at the start of rotation, is in all cases of low magntiude. The lifting torque builds up gradually with increase of armature current which induces greater field intensity from the reaction of subframe 514 and its springs 517 as described in IIIa(7) and IIIe(10) and (19) to the increasing tension on haulage cable 420, as the weight in transferred thereto from locating bolt gear 324 and 326.

(12) Due to the elasticity of items 517 and 420, and the accommodating characteristics of the motor field the access lift experiences a gradual start, and when equilibrium between the contributing features has been established, rises with increasing speed, maximum armature current being applied as the respective slave motors complete the elimination of all starting resistance, to be cut out at full travel by limit switches 567 and/or 568.

(13) As the speed of ascent increases the rate of increase in speed (i.e. acceleration) falls until normal speed of ascent for full intermediate or low winding power is achieved as appropriate to the motor power engaged, normal armature current being achieved as full-back E.M.F. is developed at the balancing speed of the respective motors.

(14) The steady lift motion obtained as described above is then maintained as long as the particular selector contactor is energised from reeling drum moving contactor 573.

(15) Owing to the tension of its return spring and the ascending motion of the lift, cable reeling drum 571 rotates winding on more cable as the displacement of the lift with respect to lattice girder 470 diminishes. Live rotating contactor arm 573 is therefore driven to make contact with succeeding fixed ring segmenal contactors 574 such that fixed linear contactors 801 are energised in succession towards the destined position fixed in IIIg(4).

(16) Arising from and conversely to the action described in IIIg(15) the fixed segmental contactor 574w adjacent to and behind fixed segmental contactor 574x which is energised by live moving contactor 573 stops picking up current as soon as contact with 573 has been broken, all following contactors 574v, 547u, 574t, etc., having been made dead in a sequence which follows the progress of moving arm 573 around the segmental ring, due to the drive from reeling drum 571.

(17) As a consequence of IIIg(16), fixed linear contactors 801w, 801v, 801u, etc., are deprived of current from 573, and conversely to IIIg(14) the prevailing motion of the lift is discontinued to be replaced by a state of motion appropriate to the next contactor of moving selector 810 towards destined contactor 805, and appropriate also to a lower applied value of motive power.

(18) In the case of a traverse extending through three or more modular heights and initiated as described in IIIg(7), a change of motion occurs when the access lift has entered the modular section next but one to the destined alignment, such that instead of operators moving selector contactor 802 picking up current, current is picked up by adjacent contactor 803, thereby depriving "up" solenoids 812 and 817 of energising current, and at the same time energising "up" solenoid 818.

(19) Relay yoke 816 is therefore maintained in its set position since the thrust lost from solenoid 817, is replaced by an equal thrust from solenoid 818 which acts in the same direction, to maintain motor 519 at steady continuous load, since the setting of contactors FU2 and AU2 is maintained unchanged.

(20) At the same time relay yoke 811 centralises under the action of spring 811a, to join contactors FS1 and to break contact at FU1 and AU1. The lifting field of motor 518 is thereby exchanged for the stopping field, and by being deprived of current electro-magnetic clutch 563 is released such that armature current to motor 518 diminishes under the sprung return action of variable resistor 561. As the armature current of motor 518 diminishes the speed of rotation falls since the lessening motor torque falls below the opposite acting winding drum load torque to cause gradual retardation to rest during which the thrust of solenoid 542 is relaxed under the diminishing current to cause a gradual brake application on brake drum 539 by spring 540 to lock the shaft of motor 518 against further rotation as described in IIIc(7).

(21) At the succeeding contactor setting (802 to 803) from IIIb(5) and (6) the balancing speed corresponding to the reduced power being applied is about two thirds of the previous value, and it follows that the kinetic energy of the entire system at this speed will be about 44% of the previous maximum value. Following the 802–803 change therefore surplus energy becomes available, which, having finite value, assists motor 519. Motor 519 therefore experiences an increase in speed under the combined effect of reduced lifting torque, caused by the excess of upward momentum of the lift, and field weakening caused by the reaction of subframe 514 to the temporary relief of loading. As the lift continues upward the surplus energy is correspondingly expended, such that the speed of motor 519 reduces as assistance diminishes and the normal steady speed of a two modular ascent is established.

(22) In the case of a traverse extending through two modular heights, and which may have been initiated as described in IIIg(8), or equally, form a continuation of the sequence described in IIIg(18) to (20), a change of motion occurs when the access lift is entering the modular section next to the destined alignment and instead of operators moving selector contactor 803 only, picking up current, contactor 804 also picks up current, because moving contactor arm 573 bridges the gap separating the adjacent fixed contactors such that solenoids 813 and 822 are energised to initiate the full sequence described in IIIg(9) leading to steadily increasing armature current to motor 518, and lifting field initiation of motor 550.

(23) With the continued upward progress of the lift, and as described in IIIg(16) moving contactor 573 breaks contact with the path feeding selector contactor 803, whereupon solenoid 818 being deprived of energising current releases relay yoke 816 which centralises under the action of spring 816a. Contactors FS2 are therefore joined and contactors FU2 and AU2 broken such that the lifting field of motor 519 is exchanged for the stopping field, and by being deprived of current electro-magnetic clutch 564 is released, causing the armature current of motor 519 to diminish under the spring return action of variable resistor 562. As the armature current of motor 519 diminishes the speed of rotation falls, since the lessening motor torque falls below the opposite acting winding drum load torque to cause a gradual retardation to rest during which the thrust of solenoid 548 is relaxed under diminishing current to cause a gradual brake application on brake drum 545 by spring 546 to lock the shaft of motor 519 against further rotation, as described in IIIc(8).

(24) The circumferential length of moving contactor 573 with respect to the circumferential length of fixed segmental contactors 574 a, b, etc., is proportioned such that the build up of armature current in motor 518 to full working intensity takes place in an interval of time which coincides with the start of the retardation sequence of motor 519 as described in IIIg(22). At an intermediate stage during the interval therefore, solenoid 543 releases motor 518 which starts to rotate in the same direction as the rotating winding drum. During the subsequent part of the interval motor 518 rotates with an increasing speed related to the lessening speed of motor 519, by the prevailing speed of rotation of winding drum 501, which tends to remain uniform, because of the inertia of the complete moving system.

(25) At the succeeding contactor setting 803 to 804 from IIIb(4) and (6) the balancing speed corresponding to the reduced power being applied is about one half of the previous value (i.e. one third of full power), and it follows that the kinetic energy of the entire system at this speed will be about 25% of the previous value (i.e. about 11% of that at maximum speed). Following the 803–804 change therefore surplus kinetic energy becomes available, which having finite value assists the acceleration of motor 518 and resists the retardation of motor 519, because the lifting torque on the winding gear is temporarily relieved by the excess upward lift momentum, the corresponding reaction of subframe 514 being to weaken the field strength of both winding motors. As the lift continues upward, motor 519 is brought to rest motor 518 temporarily exceeding its normal steady lifting speed under the reduced lifting torque demand. The speed of motor 518, then steadily falls as assistance diminishes, whereupon the normal steady speed of a one modular traverse is established.

(26) In the case of traverse extending through one modular height, and which may have been initiated as described in IIIg(9) or equally form a continuation of the sequence described in IIIg(21) a change of motion occurs when the access lift has entered the destined modular section.

The change occurs at a distance which bears the same ratio to unit modular height as the ratio between the circumferential length of moving contactor 573 to the circumferential pitch of segmental contactors 574a, b, etc. At this point, due to the progress of a contactor 573 with the motion of the lift, operators moving selector contactor 804 is deprived of current originating at 573 such that motor 518 reduces speed to rest according to the retarding sequence described in IIIg(20), during which the access lift continues to ascend under the momentum and surplus kinetic energy of the system, to enter the inching range of the traverse, at diminishing speed.

(27) From IIIf(21d) as soon as "destined" contactor 805 picks up current originating at moving contactor 573, motor 550 is started since from IIIg(22) and IIIf(21c) the lifting field has been initiated at the preceding stage, such that as motor 518 comes to rest the upward speed of the access lift has been gradually diminished to inching speed.

(28) Also from IIIf(21d), and whilst the action described in IIIg(27) is in progress magnetic release valves 355 on the hoisting carriage, are energised from contactor 805 to permit bolts 324 to extend under the action of springs 327 as described in IIf(20).

(29) The inner tapered faces of catchplates 326 are arranged to have a vertical projected length greater than the normal inching range of the lift, and the leading upper profile of bolts 324 is shaped such that extension of bolts 324 is smoothly intercepted and controlled until the destined level of the lift has been established, under the gradual action of inching motor 550.

(30) The flat faces T and U of bolts 324 and catchplates 326 respectively, as described in IIf(19) are both inclined at a small common angle to the line of action of the bolts such that as the bottom outer corners of the bolts pass the upper inner corners of the catchplates, and the bolts again extend a mutual wedging action is induced whereby weight is transferred from lift to vertical track 380, under the thrust of bolt springs 327.

(31) The induced wedge action and the inching motion of the lift are mutually accommodating, such that the load on bolts 324 is regulated by the inching progress of the lift if necessary, to permit all bolts to reach the full extent of their travel.

(32) At the full extent of the travel of all bolts 324 a circuit separate from and parallel to that described in IIf(37), is completed by limit switches 357 only, which are arranged in series such that the inching motor control circuit breaker solenoid 576 is energised, thereby stopping the ascent of the lift which is locked at the destined alignment as described in IIIg(1), (2) and (3).

(33) For a descent of three of more modular heights, in accordance with IIIf(4) and (14) contactor 808 picks up current originating at 573 which from IIIf(21g) energises "down" solenoids 814 and 820, which cause contactors FS1 and FS2 to open, and contactors FD1, AD1 and FD2, AD2 to close as described in IIIf(18) and (19). The stopping fields of motors 518 and 519 are thereby exchanged for the respective lowering fields and upon closure of contactors AD1 and AD2 variable resistors 561 and 562 are set in action by slave motors 565 and 566 driving through electro-magnetic clutches 563 and 564 respectively as described in IIIe(24) such that steadily increasing armature current is admitted to winding motors 518 and 519.

(34) For a descent of two modular heights only in accordance with IIIf(4) and (14) contactor 807 picks up current originating at 573, which from IIIf(21f) energises "down" solenoid 819 which causes contactor FS2 to open and contactors FD2 and AD2 to close as described in IIIf(19). The stopping field of motor 519 is thereby exchanged for the lowering field and upon closure of contactor AD2 variable resistor 562 is set in action by slave motor 566 driving through electro-magnetic clutch 564, as described in IIIe(24), such that steadily increasing armature current is admitted to winding motor 519 only.

(35) For a descent of one modular height only in accordance with IIIf(4) and (14), contactor 806 picks up current originating at 573 which from IIIf(21e) energises "down" solenoids 815 and 823 which cause contactors FS1 to open and contactors FD1 and AD1 to close, as described in IIIf(18) and (20). The stopping field of motor 518 is thereby exchanged for the lowering field, and upon closure of contactor AD1, variable resistor 561 is set in action by slave motor 565 driving through electromagnetic clutch 563 as described in IIIe(24) such that steadily increasing armature current is admitted to motor 518.

(36) As a consequence of the initiating operation described in IIIg(4) and the action of electro-magnetic release valve 355 bolts 324 are retracted as described in IIIg(5), and because of the reversal of the wedge action described in IIIg(30), the weight of the access lift is gradually transferred to the haulage cable, as the current to the winding motor armature(s) is building up.

(37) At an intermediate point during the build up of the respective armature current(s) the potential reaches sufficient intensity to enable solenoid 542 and/or solenoid 548 to release their respective brake drums from engagement.

(38) Upon release of the respective brake drums, since the armature current to the winding motor(s) has an intermediate value only, but flows in the same direction as for lifting, and since the field strength has been selectively reduced as described in IIIe(15) and IIIg(33), (34) or (35) the torque developed by the motor(s) for winding, is overcome by the opposite acting dead weight torque due to the access lift haulage cable 420, therefore unwinds from the main winding drum 501, at a speed gradually increasing from rest, under the accelerating effect of the torque differential, whilst the slave motors complete the elimination of all resistance in series with the armatures of the winding motors, to be cut out at full travel by limit switches 567 and/or 568.

(39) As the speed of descent increases the rate of increase in speed (i.e. acceleration) falls until the normal speed of descent for full, intermediate or low winding power is achieved as appropriate to the motive power engaged, as full generating E.M.F. is developed at the balancing speed of the respective motors.

(40) The steady lift motion obtained as described in IIIg(39) is then maintained as long as the particular selector contactor is energised from reeling drum contactor 573.

(41) Owing to the tension of its return spring and the descending motion of the lift cable reeling drum 571 rotates, unwinding cable as the displacement of the lift with respect to lattice girder 470 increases. Live contactor arm 573 is therefore driven to make contact with succeeding fixed segmental contactors 574 such that fixed linear contactors 801x are energised in succession towards the destined position fixed in IIIg(4).

(42) Arising from and conversely to the action described in IIIg(41) the fixed segmental contactor 574y adjacent to and behind fixed segmental contactor 574z which is energised by live moving contactor 573, stops picking up current as soon as contact with 573 has been broken, all following contactors 574z, 574a, 574b, etc., having been made dead in a sequence which follows the progress of moving arm 573 around the segmental ring in the reverse direction that described in IIIg(16) due to the reversed drive from reeling drum 471.

(43) As a consequence of IIIg(42) fixed linear contactors 801y, 801z, 801a, etc., are deprived of current from 573, and conversely to IIIg(40), the prevailing motion of the lift is discontinued to be replaced by a state of motion appropriate to the next contactor of moving selector 810 towards destined contactor 805 and appropriate also to a lower applied value of motive power.

(44) In the case of a traverse extending through three or more modular heights and initiated as described in IIIg(33), a change of motion occurs when the access lift has entered the modular section next but one to the destined alignment such that instead of operators moving selector contactor 808 picking up current, current is picked up by adjacent contactor 807 thereby depriving "down" solenoids 814 and 820 of energising current and at the same time energising "down" solenoid 819.

(45) Relay yoke 816 is therefore maintained in its set position since the thrust lost from solenoid 820 is replaced by an equal thrust from solenoid 819 which acts in the same direction, to maintain motor 519 under continuous load since the setting of contactors FD2 and AD2 is maintained unchanged.

(46) At the same time relay yoke 811 centralises under the action of spring 811b, to join contactors FS1 and to break contact at FD1 and AD1. The lowering field of motor 518 is thereby exchanged for the stopping field, and the circuit feeding electro-magnetic clutch 563 broken. As variable resistor 561 would otherwise return to the position of maximum resistance under the action of its return spring, so diminishing the armature current on motor 518, and hence the opposing torque therefrom, an extension of the supply of energising current to electro-magnetic clutch 563 is provided by means of an alternative circuit closed by relay solenoid 824 energised only from selector contactor 807, to enable motor 518 to exert full stopping torque upon the establishment of the stopping field by contactor FS1.

(41) Since the torque at full field strength from IIIe(15) and (17) exceeds the lowering torque motor 518 is brought to rest whilst contactor 807 is energised and, with the continued descent of the lift, as soon as current is cut off from contactor 807 by the corresponding progress of moving contactor 573, electro-magnetic clutch 563 is released. Hence the current passed by variable resistor 561 diminishes with the return action to the position of maximum resistance, during which motor 518 is prevented from reversing by the decreasing armature current, and the thrust of solenoid 542 diminishes to cause a brake application to be made on brake drum 539 by the action of spring 540 whilst motor 518 is at or nearly at rest, to check further rotation as described in IIIc(7).

(48) At the succeeding contactor setting (808 to 807) from IIIb(5) and (6) the balancing speed corresponding to the reduced power being absorbed is about two thirds of the previous value, and it follows that the kinetic energy of the entire system at this speed will be about 44% of the previous maximum value. Following the 808–807 contactor change therefore surplus kinetic energy becomes available, which acting in the favour of the lift descent, has to be absorbed by the winding gear, before the change is completed.

(49) As a consequence of the increased opposing torque arising from the excess momentum at the access lift the generating load on motor 518 is temporarily increased, causing a rise in armature potential. Since in this condition the armature circuits of motors 518 and 519 are connected in parallel, the increase in potential across motor 518 opposes the potential across motor 519 causing the latter motor to be temporarily relieved of some generating load. The speed of motor 519 therefore increases until the potential of the current being generated rises to that prevailing on motor 518. As the surplus kinetic energy of the access lift is converted into current the speed of motor 518 falls because of the retarding effect of the increased torque on the lift, and hence the potential of the generated current decreases. With the further decrease of current from the armature of motor 518 by the introduction of more resistance by the return action of variable resistor 561, the generated potential diminishes. Consequently the current generated by motor 519 increases, which to be maintained requires increased torque. At the instant that motor 518 comes to rest, the speed of motor 519 is higher than the normal steady load speed, and therefore the required torque increase retards motor 519 until normal generated load is regained and the normal steady speed of a two modular descent is established.

(50) In the case of a traverse extending through two modular heights and which may have been initiated as described in IIIg(34), or equally form a continuation of the sequence described in IIIg(44) to (48), a change of motion occurs when the access lift is entering the modular section next to the destined alignment, and instead of operators moving selector 807 only picking up current contactor 806 also picks up current because moving contactor arm 573 bridges the gap separating the adjacent fixed contactors such that solenoids 815 and 823 are energised to initiate the full sequence described in IIIg(35), leading to steadily increasing armature current to motor 518 and lowering field initiation of motor 550.

(51) With the continued downward progress of the lift, and as described in IIIg(42) moving contactor 573 breaks contact with the path feeding selector contactor 807, whereupon solenoid 819 being deprived of energising current releases relay yoke 816 which centralises under the action of spring 816b. Contactors FS2 are therefore joined and contactors FD2 and AD2 broken such that the lowering field of motor 519 is exchanged for the stopping field, and the circuit feeding electromagnetic clutch 564 broken. As variable resistor 562 would otherwise return to the position of maximum resistance under the action of its return spring, so diminishing the armature current to motor 519 and hence the opposing torque therefrom, an extension of the study of energising current to electromagnetic clutch 564 is provided by means of an alternative circuit closed by relay solenoid 825 energised only from selector contactor 806 to enable motor 519 to exert full stopping torque upon the establishment of the stopping field by contactor FS2.

(52) At the succeeding contactor setting (807 to 806) from IIIb(4) and (6) the balancing speed corresponding to the reduced power being absorbed is about one half of the previous value (i.e. one third of full power), and it follows that the kinetic energy of the entire system at this speed will be about 25% of the previous value (i.e. about 11% of that at max. speed). Following the 807–806 change therefore surplus kinetic energy becomes available, which acting in favour of the lift descent, has to be absorbed by the winding gear before the change is completed.

(53) As a consequence of the increased opposing torque arising from the excess momentum at the access lift the generating load on motor 519 is temporarily increased, causing a rise in armature potential. Since in this condition the armature circuits of motors 519 and 518 are connected in parallel, and because of the extended period of little or no resistance in series with the armature of motor 519, the removal of all or most of the resistance in series with the armature of motor 518 is replaced by a complementary increase of opposing potential generated by motor 519.

(54) The increased generating load on motor 519 continues until the surplus kinetic energy is expended, the access lift being gradually retarded under the continued stopping torque during which the potential or the generated current correspondingly falls. The potential opposing the normal flow of current through the armature of motor 518 therefore also diminishes, such that current passes at an increased rate, and at an intermediate point attains sufficient intensity to energise solenoid 542 for the release of motor 518. Since the armature current is at intermediate value only and the lowering field has been engaged, the momentum torque on the lift exceeds the opposing torque of motor 518 and the motor is accelerated from rest to a speed in excess of normal lowering speed, to attain normal generating load, to complete the sequence described in IIIg(50).

(55) With the continued descent of the lift, current is cut-off from contactor 807 by the corresponding progress of moving contactor 573 and electro-magnetic clutch 564 is released. The current passed by variable resistor 562 therefore diminishes with the return to the position of maximum resistance, during which the thrust of solenoid 543 relaxes to cause a gradual brake application to be made on brake drum 544 by the action of spring 545, whilst motor 519 is at or nearly at rest, as described in IIIc(8), to check further rotation by motor 519.

(56) As the normal generating load is attained, the potential increases, and therefore the torque required for its maintenance is increased. Consequently the speed of descent of the access lift falls until normal potential is attained at which the normal steady speed of one modular descent is established.

(57) In the case of a traverse extending through one modular height and which may have been initiated as described in IIIg(35) or equally form a continuation of the sequence described in IIIg(51) a change of motion occurs when the access lift has entered the destined modular section.

(58) Since the normal generating load of a one modular descent would be maintained so long as contactor 806 is energised from current originating at 573, the speed of the descending lift would be normal and hence the kinetic energy would be about 11% of that at full power. Also as the stopping field of motor 518 would not be initiated until contact with contactor 806 is broken, retarding torque in excess of lowering torque would not be developed. Therefore the surplus kinetic energy would have to be dissipated between the point situated at the distance bearing the same ratio to unit modular height as the circumferential length of moving contactor 573 to the circumferential pitch of contactors 574a, b, c, etc., (i.e. Complementary point to that described in IIIg(26), and destined lift alignment.

(59) To develop the increased retarding torque required to arrest the motion of the lift and to enable a more gradual dissipation of the surplus kinetic energy therefor, the field strength of motor 518 is progressively increased with the approach to alignment. The progressive increase of field strength on motor 518 is derived from the gradual build up of armature load on separately exited ancillary generator 579 which is wired to augment the lowering field circuit of the main winding motor(s) to the intensity necessary for the opposing torque required to stop the access lift within the inching range.

(60) The ancillary generator 579 is mechanically coupled to the inching motor 550, and the field circuit of generator 579 is arranged to be energised simultaneously from the same source as that for the lowering field of motor 550 by means of the down thrust from solenoid 823 as described in IIIf(20).

(61) From IIIf(21a) as soon as destined contactor 805 picks up current originating at moving contactor 573 motor 550 is started, since from IIIg(50) and IIIf(21e) the lowering field has been initiated at the preceding stage. Following the acceleration of motor 550 and winding drum 502 from rest the the normal speed of rotation therefore, the load on ancillary generator 579 builds up to increase the opposing torque being developed be motor 518, and the access lift is brought gradually to inching speed, the surplus kinetic energy having been converted into generated current at temporarily enhanced potential.

(62) With the continued descent of the lift current is cut-off from contactor 806 by the corresponding progress of moving contactor 573, and electro-magnetic clutch 563 is released. The current passed by variable resistor 561 therefore diminishes with the return to the position of maximum resistance, during which the thrust of solenoid 543 relaxes to cause a gradual brake application to be made on brake drum 540 by the action of spring 542 whilst motor 518 is at or nearly at rest, as described in IIIc(7) to check further rotation by motor 518, the access lift continuing the descent by the action of the inching motor.

(63) From IIIf(21d) also, and whilst the action described in IIIg(61) is in progress magnetic release valves 355 are energised from contactor 805 to permit bolts 324 to extend under the action of springs 327, as described in IIf(20).

(64) Under the conditions described in IIIg(62) and (63) the access lift continues to descend at inching speed until the flat under surfaces T of locating bolts 324 make contact with the flat upper surfaces U of catchplates 326, whereupon destined alignment is established. The slow motion of motor 550 thereupon continues such that haulage cable 420 is relieved of load to cause reduced reaction from balance springs 517 such that sub-frame 517 returns to rest against lower stops 515 as a result of which limit switch 580 is closed. With the closure of limit switch 580 current to the armature of inching motor 550 is cut off by means of starter cut-out solenoid 576, and hence rotation is terminated, the lift thereby attaining the conditions described in IIIg(1), (2) and (3).

(65) From IIIg(32) inching motor is also subject to control by starter cut-out solenoid 576 and therefore to differentiate between ascending and descending inching movements, opposed contactors 581 are provided to complete one or the other of the alternative circuits energising solenoid 576. Differentiating contactors 580u and 580d, are mechanically linked to inching motor field selector yoke 821 such that when "up" solenoid 822 is energised contactors 581u close, and when down solenoid 823 is energised contactors 581d close.

(h) *Power supply*

(1) In the general case as a result of being parked in the tower by the access lift vehicles receive a gain in potential energy, which represents work done by the winding motive power in addition to that necessary to overcome friction, and which requires a corresponding total expenditure of electrical energy from the supply.

(2) Conversely in the general case also, the potential energy accumulated by the vehicles after having been parked, has to be dissipated upon withdrawal from the tower, by the access lift. Of the total energy involved, that not absorbed in friction, represents the electrical energy generated whilst providing the opposing torque required for the control of the lift during descent.

(3) As it is necessary to dispose of the surplus energy possessed by each vehicle upon withdrawal at ground level, which might otherwise be dissipated as heat generated as a result of prolonged braking, the power supply system of the lift is contrived to recover and store the surplus energy for further use as follows.

(4) A variable speed A.C. motor 585 is connected to the power supply by means of orthodox motor starter gear 584, and is direct coupled to flywheel 583 and D.C. generator 586, the armature of which is connected in series with the armature circuits of winding motors 518 and 519, through their respective variable resistors, 561 and 562.

(5) At normal speed of rotation generator 586 is made capable of furnishing all the current necessary to sustain motors 518 and 519 at full power simultaneously and the power of motor 585 is such as to drive generator 586 under this condition.

(6) Motor 548 and generator 586 are both made capable of running at a speed of rotation several times that of normal load speed, and the mass of flywheel 583 is such that, at the maximum speed of rotation of the coupled set, the kinetic energy is equivalent to the total energy released by about ten to twenty fully laden lift discharge traverses from about average height and with empty intermediate return movements.

(7) From IIIe(11) motors 518 and 519 are arranged respectively to work at about constant armature current for all steady rates of lift operation, and therefore the rate of transfer of energy to or from generator 586 will tend to be constant. As the kinetic energy possessed by flywheel 583 is proportional to the square of the speed of rotation of the flywheel under all circumstances, the speed variation arising from the constant rate of energy transfer will tend to be of parabolic form.

(8) As a consequence of IIIh(7) the torque variation experienced by flywheel 583, will have a complementary parabolic relationship to the speed of rotation of the flywheel, such that greatest torque occurs at low speed and least torque at high speed.

(9) Since the armature current on generator 586 is constant for any particular access lift motive power combination, the field intensity of generator 586 has to vary to suit the parabolic torque speed relationship such that maximum intensity occurs at normal speed and minimum intensity occurs at maximum speed imposed.

(10) The field windings of generator 586 are therefore arranged for separate excitation from series connected generator 587, whose speed is varied inversely to the speed of the main motor flywheel generator set, such that the upper operating speed generator 587 occurs at normal speed of generator 586 and the lower operating speed of generator 587 occurs at the maximum imposed speed of generator 586.

(11) The upper/lower operating speeds of generator 587 are chosen such that at intermediate speeds the current generated is appropriate to the degree of excitation necessary to develop corresponding intermediate values of torque acting between flywheel 583 and generator 586.

(12) Series connected generator 587 is driven throughout the chosen operating range of speed, by means of directly coupled motor 588 which is provided with an armature and field windings energised from two mutually opposed circuits A and B.

(13) The field winding A and armature circuit of motor 588 are arranged to run on current taken from the main winding circuit i.e. connected across the armature of generator 586. The combined effect of field winding and armature circuit A of motor 588 is arranged to cause generator 587 to be driven.

(14) Field circuit B is energised from separately excited generator 589 mechanically connected to the main motor flywheel generator set, which generates a potential tending to be directly proportional to speed of rotation of flywheel 583, and from IIIh(12) opposes the flow of current due to IIIh(13).

(15) The resultant armature current of motor 588 therefore attains maximum value when the main flywheel set is at normal speed and minimum value when the flywheel set is at maximum speed, and from IIIh(14) the variation of armature current on motor 588 is consequently inversely proportional to the speed of rotation of the flywheel set. Therefore as the field of motor 588 is substantially of constant intensity the speed of motor 588 varies inversely over the chosen speed range with the speed of the flywheel.

(16) As flywheel 583 is arranged to store energy at above the normal speed of rotation of generator 586 the contribution of motor 585 is required only at speeds below this value.

The supply of motor 585 is therefore cut out at normal speed by means of relay 590, energised from separately excited generator 589 and arranged to overcome the action of its return spring at the current value corresponding to the potential developed by generator 589 at this speed.

When the speed of rotation falls below normal motor 585 is cut in by the return action of the relay, as the thrust at this speed is less than that of the return spring. The energy reserve available to winding motor 518 and 519 is therefore maintained above a predetermined minimum level under all circumstances.

(17) The various field, control and lesser power circuits which operate from current at constant potential as described in their respective sections are arranged to be energised during normal operation generally from main generator 586. During the start of the flywheel from rest however, this source of current is not available until normal speed of flywheel rotation has been attained, and auxiliary supply is therefore provided by means of compound wound generator 591 driven by directly coupled A.C. motor 592.

(18) To facilitate the start of general operation in the tower the action of auxiliary generator 591 is coordinated to the action of the main generator 586 by means of suitably linked contactors arranged to operate in conjunction with the auxiliary motor starter 593 and main motor starter 584, which controls A.C. motors 592 and 585 respectively.

(19) Normal operation of the entire lift power system is arranged to be attained from rest in six stages a representative layout of switching and starter contactors being illustrated in diagram corresponding to the following sequence of events:

(a) Moving contactors 595 and auxiliary starter contacts 593 at zero shut down position.

(b) Stage (1) Completed auxiliary motor 592 started no load on generator 591.

(c) Stage (2) Completed auxiliary motor 592 at normal operating speed no load on auxiliary generator 591.

(d) Stage (3) Completed load applied to generator 591 and external constant potential mains energised by action of moving contacts 595 and 596a, to permit operation of associated components if or as required independently of main motor flywheel generator set.

(e) Stage (4) Completed constant potential current supply to external circuit cut-off, motor 585 started and starting assistance provided by motoring main generator 586 from auxiliary generator 591 by means of contactors 597 and 598. Running variable field circuit with series generator 587 broken by trip switch 599 at this stage only.

(f) Stage (5) Completed all external power and control circuits cut-off main motor 585 runs flywheel up to set operating speed, power to auxiliary motor 592 discontinued.

(g) Stage (6) Completed main motor runs at up to normal speed subject to control of relay 590 as described in IIIh(16). Main winding power circuit closed by contactors 598 and main generator applied to working load as required by winding motors. Constant potential main current supply restored from main generator 586 by means of contactors 596b. Normal working condition attained.

(20) Close down performed by continuing above sequence into zero shut down position in readiness for repeating cycle of operations.

(j) *Emergency operation of lift*

(1) Since either of main winding motors 518 and 519 has been made capable of operating the lift as generally described in IIIc, in the event of failure by either motor, the motor remaining is capable of maintaining the lift in operation to avoid immobilisation of the tower.

(2) In the case of failure by motor 519 all vertical traverses will be performed by motor 518 only, control over which will be exercised as for normal operation in one, three and greater modular traverses, but since fom IIIf(21b and f), and IIIg(8) and (34) motor 519 only is required in a two modular traverse, motor 518 would not start if a two modular traverse be selected.

(3) For emergency operation by motor 518 only therefore, "up"—intermediate contactors 803 and 804 are interconnected by closure of emergency switch E1 and "down" intermediate contactors 806 and 807 are interconnected by closure of emergency switch E2, such that solenoids 812 and 813 can maintain contactors AU1, FU1 and solenoids 814 and 815 can maintain contactors AD1, FD1, set to suit continuous operation during the contactor changes made on approach of the lift to destined alignment by the action of reeling drum moving contactor 573.

(4) In the case of failure by motor 518 all vertical traverses will be performed by motor 519 only, control over which will be exercised as for normal operation in two, three and greater modular traverses, but from IIIf(21c) and (e) and IIIg(9) and (35) motor 518 only is required for a one modular traverse. Motor 519 would therefore, neither start nor stop the lift for a one modular traverse because neither of the outer intermediate selector contactors 803 and 807 would become energised.

(5) For emergency operation by motor 519 only, a one modular traverse may be initiated also by the use of emergency switches E1 and E2 since intermediate contactors 803 and 804 are interconnected with solenoids 818 and intermediate contactors 806 and 807 are interconnected with solenoids 819 thereby also.

(6) From IIIb(6) motor 519 is about twice as powerful as motor 518, and therefore a one modular traverse performed by motor 519 would be covered at a speed higher than normal, and hence would not necessarily conform to the pattern of events during approach to destined alignment.

(7) For emergency operation by motor 519 therefore additional resistance RE is introduced into the armature circuit to adapt this machine to suit the reduced speed/power characteristics required for a one modular traverse and as such a duty is required only when a one modular traverse is called for, control of emergency resistance RE is associated with inner selector contactors 804 and 806 as follows.

(8) The circuit joining starter resistors 562 to the armature of motor 519 is formed as two parallel loops, loop Em of which contains emergency resistor RE and loop Nm of which is unrestricted and normally maintained closed by relay switch E3, by the action of solenoid E4 wired to operators selector contactor 804 or alternatively by the action of solenoid E5 wired to operators selector contactor 806, both circuits being initiated simultaneously by closure of double pole switch E6.

(9) In the case of failure or due to overload or no load the failed motor will be isolated automatically from the control circuit by the action of release devices 569 acting on the slave motor circuit of the respective motor and to enable the failed motor to be isolated for other causes the slave motor and field circuits of motors 518 and 519 may be broken by emergency double pole isolating switches E7 and E8 respectively.

(10) Whilst the emergency switches E1, E2, E6, E7 and E8 may be controlled by independent manual operation, to facilitate a rapid change to emergency working each emergency switch is operated by a relay solenoid to enable the various changes to be selectively co-ordinated, to adapt the circuit appropriately to the surviving motor.

(11) Emergency switches E1 and E2 are mechanically linked to operate by means of either of solenoids E9 or E10, whilst double pole switches E6, E7 and E8 are operated by solenoids E11, E12 and E13 respectively, all switches closing when their respective solenoids are energised.

(12) Emergency working is initiated by means of operators three-way control switch, 826 the off position of which denotes normal operation, the first position of which denotes motor 519 as failed, the second position denoting motor 518 as failed, switch 826 being wired to the control circuit supply main.

(13) For the failure of motor 519 therefore, the first position of switch 826 is wired to relay solenoids E9 and E13 and that selector contactors 807 and 806 and also 803 and 804 are interconnected as described in IIIj(3) and motor 519 is isolated as described in IIIj(9), upon operators closure of switch 826 to the first position in order to energise solenoids E9 and E13.

(14) For the failure of motor 518, the second position of switch 826 is wired to relay solenoids E10, E11 and E12 such that selector contactors 807 and 806 and also 803 and 804 are interconnected as described in IIIj(5), motor 518 is isolated as described in IIIj(9), and the power of motor 519 is modified as described in IIIj(7) and (8) upon closure of switch 826 to the second position in order to energise solenoids E10, E11 and E12.

IV. LIFT ANCILARY EQUIPMENT (a) *Access Ramps 600 (see FIGURE 13)*

(1) For the purpose of loading vehicles onto the lift during entry and unloading vehicles from the lift during exit, ramps 600 are arranged to provide a smooth connecting path over the inner boundary W'X'Y'Z' at floor level "E" as described in IIc(5) and (11), between access bays as described in IIc(6) to (9) and pallets 88 spaced as described in IIb(2) on any suitably vertically and rotationally aligned lift deck 101 of the access lift.

(2) Entrance and Exit access ramps 600 are arranged in diametrically opposite pairs to enable incoming vehicles to directly follow outgoing vehicles onto vacated pallets 88, to avoid need of intermediate rotary traverses, the common diametral axis of each entrance/exit ramp set lying in the same vertical plane as the common diametral axis to the corresponding pair of parking axes on adjoining lower structure decks.

(3) The ramps of all access bays are of generally similar construction, and are formed as articulated flat rectangular decks, the transverse width of which coincides with the width overall of two pallets 88 side by side on parallel parking axes as shown in FIGURE 5.

(4) Each articulated ramp consists of two flat deck members, a primary deck member 601 and a secondary deck member 602, both members being of a light-weight construction with some degree of flexibility to facilitate alignment with pallets 88, when resting on lift decks 101.

(5) The primary deck member 601 of each set of ramps is hinged to the floor of the adjacent access bay by means of co-axial pin joints 603 arranged between ramp deck support arms 604 and support brackets 605 anchored to the tower structure such that deck member 601 is constrained to swing about a horizontal transverse axis whose alignment is below access floor level.

(6) The secondary deck member 602 is attached at its inner edge to the free end of primary member 601 by means of co-axial hinged connections 606 to swing about an axis at all times parallel to that of support pins 603.

(7) The free outer edge of secondary deck member 602 is supported and constrained by resiliently tyred rollers 607 mounted on extension arms 608, and arranged to roll along horizontal recesses 609, which are formed in the same vertical planes as the parking axes of adjoining tower structure decks and to the same profile as the trolley track recesses in order to align with the lift deck track recesses.

(8) Extension arms 608 are proportioned and shaped such that when deck member 602 is folded with respect to deck member 601 the free outer edge of member 602 is raised above the lift access bay top surfaces 105, 108 and 610 respectively to provide working clearance, and when deck members 601 and 602 are fully extended with their respective upper surfaces in line with the adjoining access bays and aligned lift decks, both members rest in direct contact with lift and access bay top surfaces 105, 108 and 610 respectively.

(9) The fully extended length L*f* of each ramp deck is such that an unbroken path is provided up to the adjacent ends of pallets 88 when resting on lift decks 101, the components of hinge members 606 being arranged to lie below the vehicle path when the ramps are in this position, to afford unobstructed passage to the vehicles.

(10) When fully withdrawn deck member 602 folds to form an acute angle with deck member 601, the projected length L*j* of which is such as to fall outside the tower structure inner deck boundary W'X'Y'Z', to ensure a clear vertical passage to the lift cage decks 101.

(11) Each set of ramps is operated by means of independent double acting hydraulic rams 611 mounted in trunnion brackets 612 anchored to the tower structure, and which act on inward extensions of the primary deck support arms 604 through pin joints 613. The arc of movement of pin joints 613 about the axis of pin joints 603 is arranged for minimum obliquity with respect to the line of action rams 611 which are disposed such that the outward thrust causes the associated primary deck member to rise towards the withdrawn position.

(12) During normal operation the access ramps experience a continuous withdrawing tendency under the out-thrust of their respective operating rams 611 which is maintained by means of fluid in common outer cylinder pipe line 614 under steady pressure caused by the action of hydraulic accumulator 615.

(13) Hydraulic accumulator 615 is proportioned to store sufficient energy for the effective withdrawal of either set of associated ramps, and rams 611 are proportioned to develop an effective out thrust at the steady pressure of the accumulator, such that subject to no extraneous additional resistance, all ramps are capable of automatic withdrawal.

(14) Extension of the ramps for vehicular access to or from the lift is performed by the inward thrust of hydraulic rams 611 from the action of fluid under pressure provided by independent motorised pumps 616 from reservoirs 617. Due to the action described in IV*a*(12) and the necessarily smaller effective inward area of rams 611 the working thrust for extension of the ramps is developed at a higher level of pressure, such that during extension of the ramps, the ram of accumulator 615 is elevated to absorb the energy necessary for subsequent withdrawal.

(15) Due to the acute angle between ramp deck members 601 and 602, the inward component of the mechanism has a starting value of low magnitude. To facilitate the start of extension therefore, short inclined ramps 618 are provided on the floor of each recess 609 upon which support rollers 607 rest when the ramps are fully withdrawn, the resultant side thrust due to the inclines augmenting the inward starting thrust of the ramps.

(16) During all extensions of the ramps, pumps 616 are controlled by pressure switches 619, situated in the common cylinder inner pipe lines 620 of each set of ramps to run at all pressures necessary for access ramp extension and to cut out at pressures attained above this value.

(17) Each ramp when fully extended is hydraulically locked in the open position by fluid trapped in pipe lines 620 by check valves 621, situated between pump outlet and cylinder inner entry.

(18) Withdrawal of ramps 600 from the access positions is controlled by the release of fluid from pipe lines 620 by means of electro-magnetically operated valves 622 which return the released fluid to reservoirs 617 for further use.

(*b*) *Access bay gates 630*

(1) When access ramps 600 are fully extended and a smooth flat passage exists across the aligned lift deck, gaps on either side of each set of ramps exists between the ends of the lift deck handrails 121 as described in II*c*(13) and the particular tower inner columns B1 to B6 as shown in FIG. 5, which render the track recesses accessible to occupants of vehicles.

(2) To mitigate the hazard described in IV*b*(1) therefore, each access bay is provided with a pair of gates 630 arranged to block the vehicular path between the respective access bay area and the lift deck area when closed, and to block the gaps described in IV*b*(1) when open.

(3) Each gate is supported in axially locating pivot bearings 631 to swing about a vertical axis adjacent to a tower column and towards the lift when open. The height of the gates is arranged to coincide with the height of the lift deck handrails 121, with which the gate connects when open, as shown in FIGURE 13.

(4) Each gate is arranged for independent operation by means of double acting rams 632 situated below general access floor level and acting on levers 633 attached to downward extensions of the gate hinge shafts 634 and disposed such that an outward stroke closes the gates.

(5) The common outer cylinder pipe line 635 to each set of gates is interconnected to the common outer cylinder pipeline 614 of the associated ramps such that during normal operation the gates experience a continuous closing tendency under the steady pressure caused by hydraulic accumulator 615.

(6) The gates are open for vehicular access to and from the lift by the inward stroke of rams 632 by the action of the fluid under pressure taken from the respective inner pipelines 620 of ramp rams 611.

(7) Control over each access gate is exercised by means of three way control valves 636 which are situated between pipelines 620 and the inward pipe lines 637 to rams 632 and which are arranged to operate between two positions A and B.

(8) When control valve 635 is set in position A the supply of fluid under pressure to rams 632 is cut off, the inward pipe branches to rams 632 being connected directly to reservoir 617 such that inward side of the rams can exhaust under the outward closing thrust due to accumulator fluid pressure. Control valve 635 is loaded by means of spring 638 to cause a tendency at all times towards position A, to facilitate the conditions described in IV*b*(5).

(9) When control valve 635 is set at position B the supply of fluid under pressure to rams 632 is connected and the exhaust pipe line to reservoir 617 closed, such that pressure is applied to cause an inward stroke of rams 632 which opens their respective access gates. Operation of control valves 636 for opening gates 630 is performed by solenoids 639 which when energised overcome the action of springs 638.

(*c*) *Operational control of access ramps and gates*

(1) From IV*a*(14) extension of each ramp is performed by running the respective motorised pump 615, and withdrawal of each ramp is performed by energising electromagnetic release valve 622. Control over the access ramps is therefore exercised by energising either one of the two alternative circuits feeding pumps 616 and valves 622.

(2) Current to the ramp control circuits is taken from operators moving contactor 860 which is energised from the common source, and which is arranged to move between and make contact with either of fixed control contactors 861 and 862, such that when contact is made between contactors 860 and 861, motorised pump 616 is set in action (directly or by starter relay), release valve 622 remaining closed, and when contact is made between contactors 860 and 862 release valve 622 can be energised to open, and motorised pump remains inoperative.

(3) From IV*b*(9) for the access gates to be opened, control valve solenoids 639 are energised. Since the opening movement of the gates is dependent upon the operation of motorised pumps 616, current for the operation of gate control valves 636 is made available simultaneously with that to pumps 616 by means of a parallel circuit which is also wired to operators fixed contactor 861.

(4) As it is necessary for the access ramps to be fully extended before the respective gates are opened in order to avoid conflict with the ramp deck members 601 and 602, the parallel circuit to control valve 636 is maintained open by means of overriding limit switches 627 situated to register the ends of the working inward stroke of ramps 600. Limit switches 627 are arranged in series with control valve solenoids 639 such that as soon as the inward stroke of rams 611 has been completed control valves 636 can operate under the action of solenoids 639 when energised.

(5) Conversely to the sequence described in IVc(4) to avoid conflict between ramp deck members 601 and 602 and access gates 630 it is necessary that gates 630 shall be closed before their respective ramps are withdrawn from the lift cage.

(6) From IVa(17) when fully extended, ramps 600 are locked by the action of check valves 621. Limit switches 627 cannot therefore operate to break the flow of current to solenoid 639 and so allow control valve 633 to return to position A for the closure of the gates as described in IVb(8).

(7) To enable control valve 635 return to position A therefore, circuit breaker relay switch 628 is arranged in series with solenoid 639 such that the circuit is normally maintained closed by the spring return action of the switch and the circuit is broken when the relay solenoid 629 of switch 628 is energised.

(8) Relay switch solenoid 629 is wired direct to operators fixed contactor 862, and is parallel to the circuit of electro-magnetic release valve 622, which is normally maintained open by the action of gate limit switches 640, arranged in series with the release valve solenoids.

(9) Gate limit switches 640 are situated to register the end of the outward stroke of rams 632 such that magnetic release valves 622 are deprived of current from operators fixed contactor 862 until access gates 630 have completely closed. When the access gates have been completely closed by the out strokes of rams 632 limit switches 640 close the circuit between operators fixed contactor 862 and magnetic release valves 622.

(10) To facilitate the general operation of the tower the corresponding control circuits of diametrically opposite access ramp and gate sets are wired in parallel pairs to common operators fixed contactors 861 and 862 provided for each diametral entrance/exit bay set, such that operators control, over vehicular access to and from the lift is dependent on movement of contactor 860 only.

(11) The complete opening sequence is therefore as follows. Operators moving contactor 860 is moved to energise fixed contactor 861, pumps 616 thereby being set in action to cause hydraulic accumulator 615 to rise, and diametrally opposite entrance and exit ramps 600 to be extended simultaneously inward by the inward thrust of rams 611. At the completion of the inward stroke of rams 611 limit switches 627 close, and control valves 636 move to position B whereby gates 630 open under the inward thrust of rams 632. At the end of travel fluid pressure on all rams rises until pressure switches 619 cut out pumps 616, ramps and gates being locked open by the action of check valves 621, control valves 636 being held at position B by current from contactor 861.

(12) The complete closing sequence is as follows. Operators moving contactor 860 is moved to energise fixed contactor 862, whereupon relay switch 628 releases control valve 636 which returns to position A.

Rams 632 thereby exhaust under outward thrust caused by fluid under pressure from accumulator 615 such that gates 630 close. Upon the completion of the outward stroke of rams 632 limit switches 640 close, permitting release valves 622 to open and allow rams 611 to exhaust under the outward thrust due fluid under pressure from accumulator 615, so withdrawing entrance and exit ramps 600 outwards and clear of the lift.

(13) Since the space occupied by each set of ramps 600 when fully extended, from IVa(1) overlaps the inner boundary W'X'Y'Z' of access floor area E, the horizontal motion of ramp outer deck members 602 can interfere with the vertical motion of lift deck members 101.

(14) To prevent the conflicting movement described in IVc(13) operators control over all access ramps and gates is overridden such that movement of the ramps can only take place when the lift cage is correctly aligned for vehicular access, and operators control over vertical and rotary motions of the lift is overridden such that movement of the lift can only take place when all ramps are fully withdrawn and vehicular access to the lift is blocked.

(15) Correct vertical alignment of any lift deck 101 for vehicular access is identified by means of limit switch 650 attached to hoisting carriage side member 302 and arranged to close by interaction with short local trips 651 attached to vertical track baseplates 383 and spaced only to suit the lift deck access alignments (i.e. one trip for each lift deck).

(16) Correct angular alignment of rotating cage 100 with respect to any one of the diametral entrance/exit axes is identified by means of one of alternative limit switches 652 or 653 which are attached to hoisting carriage bottom stay 301 and spaced to suit the alternate diametral entrance/exit axes. Limit switches 652 and 653 are arranged to close by interaction with short local trips 654 attached below lift cage bottom deck member 101 in symmetrically opposite positions about the axis of rotation O (i.e. one trip for No. 1 end of cage and one trip for No. 2 end).

(17) Alternative limit switches 652 and 653 are wired in parallel loops each of which is wired in series with limit switch 650. The alternative parallel loops are each wired to an operators moving contactor 860 corresponding to one of the diametral entrance/exit axes. Limit switch 650 is wired to the hoisting carriage common supply main, which forms the common source of current to operators moving contactors 860.

(18) In order that the operators moving contactor 860 selected can be energised therefore, from IVc(15) the lift must be at a vertical access alignment and from IVc(16) the lift must be at the angular alignment corresponding to the moving contactor 860 selected by the operator with No. 1 end towards the entrance or exit. Under these conditions only current from the hoisting carriage main can pass via limit switch 650 and one of limit switches 652 or 653 to the appropriate moving contactor 860 and unless both limit switches are closed by correct compound alignment the access ramps remain inoperable.

(19) Complete withdrawal of all access ramps in the tower identified by limit switches 655 arranged to close at the end of the outward stroke of the main rams 611 of each ramp 600, by interaction with moving trips 656. Limit switches 655 of each ramp are wired in series to form a common circuit to relay solenoid 657. (See FIGURE 12.)

(20) Solenoid 657 when energised is arranged to maintain the continuity of the common source of lift control current by closing contactors 658, which are spring biased to open when not under thrust from solenoid 657.

(21) In order that solenoid 657 can be energised therefore, all ramps must be fully withdrawn to enable all limit switches 655 to close, and until all ramps are fully withdrawn operators control over all lift motions is overridden by the self acting breaking action of relay contactors 658, to prevent conflict of lift decks with ramps as described in IVc(14).

(d) Spare pallet bays (700) (See FIGURE 14)

(1) In the general case pallets 88 resting within the inner annulus of the tower obstruct direct access to pallets within the outer annulus of the tower which rest on the same or adjacent parking axes of a common deck, as shown in FIG. 1.

(2) Access to the outer pallets therefore necessitates one or other of the various interchange movements as described in IIb(10) to (13) wherever an inner annular position is occupied.

(3) In order to expedite the general working of the tower the need for intermediate interchange movements as indicated in IVd(2) is minimised by maintaining an absence of unoccupied pallets from the inner parking annulus of the tower such as to afford direct access to as many pallets in the outer annulus as possible at all times.

(4) Accommodation of the spare unoccupied pallets from the inner annulus which result from IVd(3) is provided by means of spare pallet bays 700 situated in the basement of the tower as described in Ic(14).

(5) The combined capacity of both groups of spare pallets bays 700 is equal to all, or a substantial fraction of the entire inner parking annulus of the tower in order that direct access to the outer parking positions can be maintained until approximately two thirds of all positions have been occupied.

(6) The spare pallet bays each consist of an open upright framed rack structure 701 symmetrically disposed about the vertical planes Me Fo and Mo Fe at levels corresponding to lift vertical alignments when lift top deck is at the level of access floor E.

(7) The rack structure of each spare pallet bay comprises of upright corner members 702 extending over the same levels at the lift cage when aligned as in IVd(6) upper intermediate and lower transomes 703, 704 and 705 respectively which unit pairs of corner members 702 at each end and longitudinal spacer members 706 which unit pairs of corner members 702 at each side.

(8) Upper and intermediate transomes 703 and 704 are spaced along corner upright members 701 at intervals corresponding to unit modular heights and longitudinal spacers 706 are arranged such that corresponding transomes of both ends of each bay lie in common horizontal planes.

(11) Lugs 707 of horizontal pallet sets as described in IVd(10) are arranged at common corresponding relationships to all upper and intermediate transomes 703 and 704 in each spare pallet bay.

(12) Successive pallets 88 are supported by successive lugs 707 spaced at equal intervals along upright corner members 702 below and away from the respective transomes, the regular spacing of lugs 707 throughout being such that a working clearance exists between the upper faces of each pallet and the soffit of the adjacent lug or transome.

(13) Each of the framed rack structures as described in IVd(6) to (12) is constrained to move in a vertical path between tower basement walls 21 and central tower columns D1, C12 and D2, C6 as shown in FIGURE 5, by means of flanged guide wheels 708 arranged to rotate on spindles 709 attached to corner upright members 702 by means of brackets 710, which engage with vertical rails 711 anchored to walls 21 and columns D1, C12 and D2, C6 of the tower structure.

(14) The groups of spare pallets corresponding to each lift deck position are served from beneath by horizontal tracks 712 each of which is arranged symmetrically about vertical planes Me Fo or Mo Fe at levels spaced at and with respect to the common modular spacings of the tower structure.

(15) Tracks 712 extend from the line of inner deck boundary W'X'Y'Z' to the remote end of their respective spare pallet rack structures, and form independent channel beams supported from below by means of sleeper beams 713 and cantilever brackets 714 incorporates into the adjacent tower structural members.

(16) The transverse profile of each of tracks 712 corresponds with the common parking track recess profile as described in Ib(3) and (5) to enable the respective transversing trolleys 200 to pass from and to the lift, when cage 100 is suitably aligned.

(17) The rack structures of each spare pallet bay are arranged for movement along their respective vertical tracks by the action of vertical screwed shafts 715 axially located from the tower structure and which engage with mating nuts 716 anchored to each bottom transome 705.

(18) Screwed shafts 715 rotate in upper steady bearings 717 attached to the soffits of tracks 712 and axially locating thrust bearings 718 incorporated in high ratio reduction gear unit 719, through which shafts 715 are driven from input shafts 720.

(19) The pitch, direction of rotation and gear ratio of shafts 715 are identical for all units, and the input shafts 720 of both units to each rack structure are mechanically coupled by means of layshaft 721 to receive the common drive from reversible electric motors 722.

(e) Operational control of spare pallet bays 700 (See FIGURE 12)

(1) During normal operation each of the spare pallet racks is intended to accommodate or dispense pallets at all of its respective working levels at any one time, to enable full or half lift sets of pallets to be transferred between lift cage 100 and spare pallet bays 700 simultaneously.

(2) As a consequence of IVe(1) an equal number of spare pallets 88 is maintained at the different levels of each rack structure, which, when at rest is arranged to be maintained in one or two alternative relationships with respect to the associated service tracks 712.

(3) When at the lower relative position to their respective service tracks 712 each rack is aligned such that whilst still deriving support lugs 707, the under side of the bottom pallet of each group is in contact with the upper edge of the adjacent service track channel 712 and from IVd(16) a normal parked pallet to parking track relationship exists.

(4) When at the upper relative position to their respective service tracks 712 each rack is aligned such that the under side of the bottom pallet of each group is held clear of the upper edge of the adjacent service track channel 712 by one lug pitch as described in IVd(12). The succeeding vacant lugs are therefore at, and replace the parking relationship described in IVe(3).

(5) For withdrawal of pallets from the spare pallet bays racks 701 are aligned as described in IVe(3) to enable unladen trolleys 200 to enter beneath each bottom pallet of the rack groups, trolleys 200 being in the depressed attitude as follows from IIe(28) and (29).

(6) For the deposition of pallets into the spare pallet bays, racks 701 are aligned as described in IVe(4) to enable trolleys 200 bearing surplus pallets 88 to enter beneath the respective preceding bottom pallets, each trolley being in the elevated attitude as necessarily follows from IIe(18) and (25).

(7) Due to the general structural and geometric conception of the tower, the relationship existing between the pallets accommodated by racks 701 and the central vertical axis O does not lie within either of the inner or outer parking annuli, and therefore the normal destined translation control of the trolleys is invalid.

(8) Correct alignment of trolleys 200 for engagement or disengagement with pallets 88 within spare pallet bays 700 is obtained by substituting local translational control for normal translation control at the trolleys by means of changeover switches 260 mounted on each trolley frame, for operation by track side ramps 730, on service tracks 712 only.

(9) The active length of ramps 730 is arranged to start between lift and inner trolley annular alignment and to extend within their respective racks by the distance necessary to cover alignment of their trolleys for engagement or disengagement with the spare pallets. The transverse height of each ramp is such that effective operation of changeover switches 260 obtains when trolley frames 201 are elevated or depressed.

(10) Changeover switch 260 consists of three isolated sets of fixed contactors 261, 262 and 263, which are served respectively by isolated moving contactors 264, 265 and 266 mechanically united by a common yoke.

(11) Fixed contactors 261 are wired in series with the inner annular selector circuit between trolley fixed contactor 247 and complementary contactor 847 and fixed contactors 262 are wired in series with the outer annular selector circuit between trolley fixed contactor 248 and complementary 848, as described in IIe(9).

(12) Fixed contactors 263 are wired between operators complementary contactor 848 and trolley intermediate fixed reeling drum contactor 259. Intermediate contactor 259 has the same circumferential length and radius as trolley fixed contactors 247 and 248, and is spaced between contactors 247 and 248 at an angular relationship which when full length contact is established with trolley moving contactors 244, corresponds to the translational alignment of the trolleys within the spare pallet bays for engagement or disengagement with their respective pallets.

(13) The yoke of changeover switch 260 is spring-loaded such that continuity of inner and outer annular circuits as described in IIe(9) and IVe(11) is maintained by moving contactors 264 and 265 at all times other than for spare pallet movements, whilst under the same conditions the access bay intermediate circuit described in IVe(12) is maintained broken.

(14) When tripped by track side ramp 730, the normal selector circuits IIe(9)–IVe(12) are broken and the intermediate circuit IVe(12) is completed by contact with moving contactor 266.

(15) Upon correct translational alignment between trolleys and spare pallets being secured by the means described in IVe(8) to (14) engagement may be performed as described in IIe(18) and disengagement performed as described in IIe(19).

(16) Operators control over engagement and disengagement within the spare pallet bays is exercised as described in IIe(20) and from IIe(29) to (31) and IIe(25) to (27) is subject to normal overriding control to confine these operations to the appropriate translational alignment of the respective trolleys.

(17) To avoid conflct between bottom spare pallets and approaching laden trolleys and also to facilitate the engagement of bottom spare pallets with unladen newly arrived trolleys, the operation of spare pallet racks by motors 722 is co-ordinated to enable unladen trolleys enter when their respective racks are aligned as described in IVe(3) and to enable laden trolleys to enter when their respective racks are aligned as described in IVe(4).

(18) Before the conditions described in IVe(17) can be set up it is necessary that (a) from IVd(12) unladen pallets only shall enter the spare pallet bays and (b) from IVe(1) and (2) all trolleys serving any one pallet rack at any one time, shall be either laden or unladen, since simultaneously entry at the different levels of one rack by laden and unladen trolleys is inadmissible.

(19) Due to IVd(4) and Ic(14) requirements IVe(18) (a) and (b) occur only at diametrically opposite angular alignments of lift cage 100 when at the bottom terminal modular alignment.

(20) Correct vertical alignment of lift cage 100 with spare pallet bays 700 is identified by means of limit switch 740 attached to hoisting carriage side member 302 and arranged to close by interaction with short local trip 741 attached to vertical track base plate 383 and spaced only to suit the lift deck spare pallet bay alignment.

(21) Correct angular alignment of lift cage 100 with spare pallet bays 700 is identified by means of limit switch 742 attached to hoisting carriage bottom stay 301 and arranged to close when the lift cage is in alignment with the spare pallet bays by the action of short local trips 743 attached to and below lift bottom deck 101, symmetrically opposite positions about vertical axis O.

(22) Limit switch 742 is wired direct to the hoisting carriage common supply main and in series with limit switch 740 to operate relay solenoid 744. When energised as a consequence of correct lift alignment with the spare pallet bays, relay solenoid 744 is arranged to break the trolley master control circuit by withdrawing moving contactor 745 from fixed contactors 746 is series with master control solenoid 851, and to complete trolley master control bypass circuit by closing fixed contactors 747 with moving contactors 748.

(23) When solenoid 744 is relaxed, as follows from any different alignment, the bypass circuit is broken, return spring action opening contactors 747 and 748 and closing contactors 745 and 746, to restore the trolley master control circuit.

(24) When the trolley master control circuit is broken from IIf(37) trolleys 200 are confined to lift cage 100. To enable trolleys 200 to enter their respective spare pallet bays therefore, the bypass circuit forms a parallel loop to the trolley master control circuit, which is closed only when requirements IVe(18a) and (b) are fulfilled, and from which the conditions outlined in IVe(17) are set up.

(25) The conditions necessary to satisfy requirement IVe(18a) are identified at the lift cage by the action of photo-electric cells 123 and relays 125 as described in IIc(15), the subservient circuits of which are wired to circuit breaker relays 731, arranged in series with the trolley control bypass circuit. Relays 731 are arranged to break the trolley control bypass circuit only when energised, and at all other times maintain bypass circuit under return spring action. Should a vehicle be present on any one pallet therefore, the bypass circuit is broken thereby confining the respective group o ftrolleys to their central alignments in the lift.

(26) The conditions necessary to satisfy requirement IVe(18b) are identified at the trolleys by the action of reversing trip switches 232 as described in IId(26) which are each wired across a double acting relay 732 arranged to control either one or two alternative control circuits PE, or PD, which correspond with engagement of disengagement between trolley and pallet in all cases. Corresponding contactors of relays 732 for each lift half set of trolleys are arranged in series such that unless either one of control circuits PE or PD, is completed by engagement on all lift decks or disengagement on all lift decks both circuits PE and PD remain open.

(27) Engagement circuits PE are wired in series with limit switches 751 which are spring loaded to close and, relay solenoids 753 which when energised, initiate starters 723 which cause motors 722 to lower their respective pallet racks towards the lower relative position as described in IVe(3).

(28) Disengagement circuits PD are wired in series with limit switches 752 spring loaded to close, and to relay solenoid 754 which when energised, initiate starters 724 which cause motors 722 to raise their respective pallet racks towards the upper relative position as described in IVe(4).

(29) Limit switches 751 and 752 are arranged to break at opposite extremes of travel of common trip levers 755 which bear onto the under side of lowermost pallet of the respective racks, and are so contrived that extremes of travel coincide with lower and upper relative positions IVe(3) and (4) of the respective racks, such that the engagement circuit PE is broken at the lower relative position and the disengagement circuit PD is broken at the upper relative position, the related actions of motors 722 initiated as described in IVe(27) and (28) respectively, thereby being terminated.

(30) Since unladen trolleys may simultaneously enter their respective racks during the operation described in IVe(27) the trolley master control bypass circuit is completed by a direct loop from engagement circuit PE which is in parallel with limit switches 751 and solenoids 753.

(31) Since laden trolleys may not enter their respective racks until the operation described in IVe(28) has been completed, the trolley master control bypass circuit is completed by a loop from disengagement circuit PD which is subject to the action of limit switches 756 arranged to close by means of common trip 755 at the upper relative position of the racks only, and otherwise to remain open by return spring action. Until the racks are in the upper relative positions therefore, the associated trolleys are confined to the lift cage, as follows from IVe(24).

(32) From the foregoing description, the complete sequence of events associated with the operation of spare pallet bays 700 is therefore, as follows:

When hoisting carriage bolts 324 and 339 have been fully extended to secure hoisting carriage and rotating cage as described in IIf(18) to (21) and IIf(25) to (27) in their respective alignments with the spare pallet bays only, limit switches 740 and 742 initiate the trolley master control bypass circuits to replace the trolley master control circuits which would otherwise be set up as in IIf(37) the exchange of circuits being caused by the action described in IVe(22), such that trolleys 200 are confined to lift cage 100 until the master-bypass circuit has been completed.

(33) The trolley master control bypass circuit can only be completed when no vehicles are on the pallets and also when all trolleys are in the same laden or unladen state as follows from IVe(25) and (26) respectively, whereupon the spare pallet racks adapt the relationship necessary to receive or dispense their pallets as described in IVe(27) to (29) in accordance with the laden or unladen state of their respective trolleys, operators control over the trolleys being restored as soon as an unobstructed path is registered as described in IVe(30) and (31).

(34) Operators control over the spare pallet bays is exercised only by means of the translational and pallet engagement controls of the trolleys, as described in IIe(4) to (16) and IIe(18), (19), subject to overriding controls IIe(25) to (27) and IIe(28) to (30). The trolleys are adapted for the peculiar alignment of the spare pallet bays automatically as described in IVe(8) to (14), the outer annular position along the equivalent parking axis being selected by the operator when trolleys 200 are required to enter the spare pallet bays.

V. GENERAL OPERATIONAL CONTROL (SEE FIGURES 15 TO 25)

(a) Principle of general operational control (1) Operators controls for all of the various movements as described in IIe and g, IIIf and g and IVc and e are centralised at a common console 900 within the tower structure, which to enable personal contact between vehicle occupants and operator to be available if required is situated at access floor level E adjacent to column B5 and between the exit bays of the tower.

(2) With the exception of pallet interchange movements at the upper level E of the spare pallet bays, all pallets 88 when being manipulated by the lift are out of sight to the operator. Also to facilitate the withdrawal of parked vehicles for exit, it is necessary that their respective parked positions shall be recorded.

(3) From Va(2) therefore, control console 900 is contrived to simulate the various relationships which are set up between lift and tower due to the exercise of operational control over the various motions, and to register the location of occupied and unoccupied parking space throughout the tower structure. A comprehensive illustration of the instantaneous state of affairs within tower and lift is thereby available at all times to the operator, from which suitable movements of the lift and/or its ancillaries may be initiated.

(4) Operators controls console 900 is composed of two principal moving members viz. concave rack 901 and turret 999, which are contained by cabinet 950 such that rack 901 is constrained to move about a vertical path and turret 999 is pivoted to swing about the vertical axis of concavity of rack 901.

(5) The vertical motion of rack 901 with respect to cabinet 920 represents the vertical motion of hoisting carriage 300 with respect to the tower structure, whilst the rotary motion of turret 999 with respect to the cabinet represents angular motion of rotating cage 100 with respect to hoisting carriage 300. Rack 901, cabinet 950 and turret 999 therefore represent the tower structure, hoisting carriage 300 and rotating cage 100 respectively.

(6) The distribution of occupied and unoccupied pallets 88 throughout the tower structure is registered within rack 901 by means of corresponding market tablets 970, movement of pallets 88 between lift and tower by the action of trolleys 200 being represented by movement of tablets 970 between turret 999 and rack 901 by the action of turret mounted horizontal bolts 996 which are mechanically associated with the respective trolley controllers 990.

(7) The relative movements of rack 901, turret 999 and horizontal bolts 996 are co-ordinated with the movements of operators hoisting rotational and translational selector contactors respectively. Destined vertical angular and translational traverses required to be made by the lift are therefore selected at the control console 900 with respect to the prevailing state of affairs within the tower.

(8) Since vertical and angular traverses of the lift may be performed only when all trolleys 200 are at their respective central lift alignments as described in IIc(16), and since trolleys 200 may only leave lift cage 100 at correct vertical and angular alignments as described in IIf(37) all hoisting rotational and translational movements necessary to move a particular pallet 88 may be set up in advance, each succeeding lift movement commencing as soon as the relevant conditions necessary have been fulfilled by the completion of the previous action.

(9) In normal operation, as soon as a new destined alignment has been set up by use of the respective selector contactors for hoisting, rotation or trolley traverse, movement of the appropriate lift motion subject to Va(8) will take place. To facilitate observation of tablets 970 as required before such movements are made therefore, all energised selector contactors may be overridden by means of operator's master control switch 899 arranged to break the master control circuit when pedal 949 is depressed such that rack 901 and turret 999 may be moved without the corresponding following lift movements taking place.

(10) From Va(7), (8) and (9) therefore a particular pallet may be traced, the appropriate selector contactors set to align the lift therewith, and the operation initiated at any instant required by the operator, this method of operation being applicable to all parking positions throughout the tower.

(11) The method of operation indicated in Va(7) to (10) is adapted at appropriate control console rack/turret relationships to cover operators control over access bay ramps 600, and access gates 630 as described in IVa, b and c by means of treadle switches 864 arranged to interact with turret bolts 996, in order to co-ordinate operational control of ramps with particular lift alignments.

(12) The method of operation indicated in Va(7) to (10) is adapted also to cover operational use of spare pallet bays 700 as described in IVd and e by means of spare tablet magazines 975 spaced at appropriate control console rack turret relationships.

(b) Concave rack 901

(1) Concave rack 901 consists of a series of flat horizontal plates 902, 903, 904 and 905 all of which are made of non-magnetic material. The inner edge of each plate is formed to an arc which is concentric with the vertical pivoting axis of turret 999, all plates conforming to a common general outline.

(2) The inner edges of plates 902 are pierced by rectangular slots, equal in all respects throughout and arranged in parallel pairs which are symmetrically disposed about equally spaced radial axes subtended by the pivoting axis of the turret.

(3) The projected radial length of all rectangular slots is such that two market tablets 970 as described in V$a$(6) and V$e$(2) and spaced end to end may be accommodated.

(4) In the case of rack plates 902 only, the number of rectangular slots provided in each plate is equal to the number of outer annular tracks in each parking deck A of the tower structure.

(5) From V$b$(2), (3) and (4) therefore, rack plates 902 are geometrically analogous to the parking decks A of the tower structure, radial axes A101, B101, C101, etc., of rack plates 902 being arranged to represent radial axes AO, BO, CO, etc., of the parking decks, as shown in FIGURE 1.

(6) For a particular tower structure the number of plates 902 incorporated into rack 901 is made equal to the number in parking decks A provided in the tower, radial axes A101, B101, C101, etc., of successive rack plates being arranged to lie respectively in common vertical planes. Corresponding rectangular slots for all plates 902 therefore, lie vertically in line.

(7) To represent trolley refuge and exchange bays as descrcibed in I$c$(2) the inner edge of rack top plate 903 is slotted about radial axes M101 and F101 only, and is otherwise unbroken.

(8) To represent access floor level E as shown in FIG. 3, the inner edge of intermediate plate 904 is slotted about radial axes F101 and M101 only to correspond with spare pallet bay upper service tracks 712 as described in IV$d$(14) and (15). On radial axes H101 and K101 only special provision is made for treadle switches 864 the treadle pushes of which are arranged to span the combined width of the equivalent pairs of rectangular slots about the respective radial axes.

(9) Treadle switches 864 incorporate fixed contactors 861 and 862 associated with access ramps and gates as described in IV$c$(2), moving contactor 860 being mechanically linked to the respective treadle pushes which are spring loaded to maintain contact between contactors 860 and 862. The relationship of each treadle push to rack plate 904 is arranged such that by interaction with tongs 971 of the horizontal bolts 996 in alignment with rack plate 904 over length of travel G see V$d$(7) contact can be established between contactors 860 and 861 to enable access ramps 600 and gates 630 to extend, and when tongs 971 are withdrawn, access ramps and gates withdraw automatically as contactors 860 and 862 establish contact by return spring action.

(10) To represent basement floor levels as described in I$c$(15) the inner edges of rack bottom plates 905 are slotted about radial axes F101 and M101 to correspond with spare pallet bay lower service tracks 712 and about radial axes B101, C101, D101, H101, J101 and K101 to correspond with the basement parking tracks.

(11) At the M101 and F101 slots of intermediate and bottom rack plates 904 and 905 respectively, only special provision is made for spare tablet magazines 975 which are arranged to accommodate tablets 970 corresponding to spare pallets 88 resting in the respective spare pallet bays. Spare tablet magazines 975 are contrived to store or dispense tablets 970 in accord with the working of the spare pallet bays.

(12) Rack plates 902, 903, 904 and 905 are spaced to the sequence indicated at uniform intervals by means of spacers 906 and are united by means of the bolts 907 to form a rigid framed structure, to which are attached slide brackets 908, spaced adjacent to the outer edge of the common rack outline.

(13) Slide brackets 908 engage with vertical slide rails 909 which are rigidly supported within console cabinet baseplate 921 and top plate bracket 922 such that rack 901 may slide freely along a vertical path with the concave inner edges of all rack plates facing towards the operators working position.

(14) The entire dead weight of concave rack 901 and its full content of tablets 970 are counter balanced by weight 910 which is arranged to act on the rack by means of parallel chains 911. Chains 911 are attached to rack 901 by means of shackle 912 and passed over idling guide pulleys 913 and 914 which are pivoted to top plate bracket 922, and are anchored by means of shackles 915 to balance weight 910 arranged to hang freely.

(15) Concave rack 901 is propelled along its vertical path by means of operators hand wheel 916 which is rigidly connected to sprocket chain wheel 917 by shaft 918 arranged to rotate in bearings 919 supported from console cabinet 950. The drive from sprocket wheel 917 is taken by primary roller chain 920 which is connected by transfer links 923 to secondary chains 924 and 925, links 923 being arranged to lie generally below sprocket wheel 917.

(16) Secondary chain 924 is coupled to the bottom of concave rack 901 by means of central shackle 926 the reversal of the chain path necessary being derived from idling guide wheel 927. Secondary chain 925 is coupled to the bottom of balance weight 910 by means of central shackle 928, the reversal of the chain path necessary being derived from idling guide wheels 929 and 930.

(17) Guide wheels 927 and 929 are pivoted from bracket 931 and guide wheel 930 is pivoted from bracket 932, brackets 931 and 932 being rigidly anchored to cabinet baseplate 921, such that lengths of chain directly attached to rack 901 and balance weight 910 lie vertically.

(18) Primary chain 920 secondary chains 924 and 925 balance weight 910 and chain 911, and rack 901 form a closed mechanical linkage, all points of which are arranged to permit a constant length of travel equivalent in terms of rack plate spacings to the length of hoisting carriage travel in terms of tower modular heights, limits of travel being positively defined by upper and lower slide rail stops 933 and 934 respectively, spaced such that rack top and bottom plates 930 and 905 may lie with respect to a common datum level Z—Z.

(19) To positively locate intermediate rack plates 902, 904 and 905 with respect to common datum level Z—Z catch 935 rigidly attached to concave rack 901 is arranged to engage with any one of mating slots S formed to the same spacing as described in V$b$(12) and corresponding with the successive rack plates, in swinging detent plate 936.

(20) Swinging detent plate 936 is integral with vertical shaft 937 pivoted at base plate bearing 938 and top bracket being 939, and is maintained in engagement with catch 935 under the action of tension spring 940 anchored to bracket 922 and acting on lever 941 rigidly attached to shaft 937, such that concave rack 901 is held in positive vertical alignment.

(21) Release of concave rack 901 from positive vertical alignment is performed from operators pedal 942 rigidly attached to lever 943 by means of shaft 944 pivoted to rotate in baseplate bracket 945. Lever 943 is linked by means of pull rod 946 to lever 947 rigidly attached to shaft 937, such that when pedal 942 is fully depressed, the tension of spring 940 is overcome and dedent 936 is swung clear of catch 935, to permit movement of rack 901 by hand wheel 916.

(22) In accordance with V$a$(7), operational selection of lift destined vertical alignment as described in III$f$ and $g$ generally, is derived from the movement of concave rack 901 along its vertical path by the rotation of operators hand wheel 916, as follows.

(23) Operators fixed contactors 801a, b, c, etc., which each represent a vertical alignment available to the lift, are mounted by means of insulated support 829, to the rear of concave rack 901 such that all contactors are in line and parallel to vertical slide rails 909, corresponding points on adjacent contactors being arranged to the same spacing as described in V$b$(12).

(24) Operators fixed contactors 801 etc., are individually spring loaded to bear in direct contact with operators multiple selector 810, which as described in III$f$(8) embraces selector contactors 802 to 808. Selector contactors 802 to 808 are arranged vertically in line with contactor 802 lower most, as a series of conductor bars mounted along insulated support 809, adjacent conductors being isolated by gaps shorter in length than the effective length of contactors 801, etc.

(25) Insulated support 809 to multiple selector 810 is rigidly attached to the frame work of the control console cabinet, at a vertical alignment which, when concave rack 901 is at the upper limit of its travel, and catch 935 is in full engagement with the top slot of dedent 936, the fixed contact 801 corresponding to the lowermost alignment available to lift cage 100, makes full contact with the middle length of central selector contactor 805.

(26) Since operational control of lift winding gear 500 is derived from events associated with particular contactors of operators selector 810 as described in III$f$ generally, correct mutual alignment between rack mounted contactors 801a, b, c, etc., and cabinet mounted selector contactors 802 to 808, is necessary for any vertical traverse to be made by the lift.

(27) Contactors 802 to 808 are therefore deprived of energizing current until correct mutual alignment is secured, by means of limit switch 828 wired in series with reeling drum moving selector contactor 573, and interacting with arm 948 rigidly attached to detent shaft 937. Arm 948 is arranged such that when one of the slots of detent plate 936 is in full engagement with concave rack catch 935 continuity of the energising circuit to contactor 573 is maintained by limit switch 828, and at all times during disengagement of catch and detent 936 continuity is broken by limit switch 828.

(28) By the means described in V$b$(27) vertical movement of the access lift from rest is prevented until concave 901 is correctly aligned to suit any particular complete traverse, and from III$g$ generally, if incorrect alignment of concave rack 901 occurs whilst the lift is in vertical motion, the lift is brought to rest as the various relay solenoids are deprived of energising current.

(29) Upon selection of a particular destined vertical alignment of the access lift as described in V$b$(2) and III$g$(4) and (6), from III$f$(11) and (12) the 574$x$ to 801$x$ circuit energised by reeling drum contactor 573 represents the instantaneous modular alignment of the lift with respect to the tower structure. Each 574 to 801 circuit is therefore wired to an indicating lamp 827 arranged in parallel to the respective 801 contactor such that when energised by contactor 573 lamp 827 is illuminated.

(30) Lamps 827a, b, c, etc., are grouped in the corresponding sequence on console fascia plate 951 such that when the access lift is in vertical motion vertical movement of the lift is proved to the operator as successive lamps illuminate and extinguish in a sequence towards the selected destined position. When the lift arrives at the selected destined alignment, the indicating lamp sequence is ended the lamp representing the selected alignment remaining illuminated only.

*(c) Control console cabinet 950*

(1) Control console cabinet 950 is a generally upright rectangular enclosure which is arranged to contain concave rack 901, balance weight 910 and attendant mechanism throughout the full working range of movement, and is rigidly attached to slide rails 909 by means of baseplate 921 and top bracket 922.

(2) The horizontal cross section of the cabinet is basically rectangular, and embraces the full width of concave rack 901, whilst the upper length of the cabinet front plate 951 facing the operator, is formed to a concave profile concentric with the slotted edge of rack plates 902 to 905.

(3) The concave profile of cabinet fascia plate 951 is arranged to cover the entire inner length of concave rack 901, opening A extending for the full slotted width of rack plates 902 to 905 and for a height corresponding to several rack plate spaces, being formed in fascia plate 951 for access to rack slots, and marker tablets.

(4) The vertical relationship of the central horizontal zone of opening A with respect to the console cabinet is arranged to represent the relationship existing between lift cage deck levels and hoisting carriage frame, such that the concave rack plates in alignment with the central horizontal zone of opening A correspond with the tower decks with which the lift cage decks are in alignment.

(5) The upper and lower horizontal zones of opening A are arranged to cover adjacent groups of concave rack plates in order to permit representative observation to be made of tower decks in advance of the lift decks.

(6) As a guide to the operator of the whereabouts of particular pallets within the tower opening A is arranged to be subdivided into a series of vertical zones, A, B, C, D, etc., each of which can cover any number of vertical rows of concave rack slots. The extent of each vertical zone is determined by the operator to suit prevailing circumstances and is indicated at the control console by means of loose marker tabs 952 formed to clip into engagement with fascia plate slots X adjacent to the upper and lower edges of opening A and spaced in line with each of the rectangular slots across the concave rack.

(7) Control console cabinet 950 forms the intermediate structural link which unites concave rack 901 and its associated elements with control turret 999, turret 999 being supported from the cabinet front by means of bracket 953.

(8) Bracket 953 is situated at a height above operating floor level suitable for convenient working access to turret 999, and is formed as a stiff hollow cantilever box structure integral with or rigidly attached to cabinet front plate 954 and fascia plate 951, to carry large diameter hollow pivot housing 955.

(9) Pivot housing 955 is set co-axially with the axis of concavity 101 of concave rack 901, and is in direct engagement with the hollow intgeral mating spigot of turret mounting 998, such that turret 999 is supported above bracket top plate 956 and constrained to rotate about axis O101.

(10) Turret mounting 998 is secured in and moved about pivoting axis O101 by means of operators lever 831, which is rigidly located and attached to the downward end face of the mounting spigot and which is arranged to protrude through slot F formed in bracket side plate 957.

(11) The edges of slots F to side plate 957 are flanged outwards, top and bottom flanges 958 and 959 respectively following a curved outline of constant radius about vertical axis O101. The curved outline of flanges 959 and 959 is notched on common radial axes spaced at the same angular intervals as radial axes A101, B101, etc., to concave rack 901 such that each notch K corresponds with a particular radial axis of the tower structure.

(12) Lever 831 is arranged to be positively located about its arc of movement by means of catch 961 formed as an integral extension of operators handle 960 which is pivoted to lever 831 at pin joint 962. Catch 961 is maintained in engagement with any pair of radial notches by the action of spring 963 anchored to lever 831, release from engagement being obtained by suitable local movement of handle 960.

(13) The principal horizontal axis of turret mounting 998 coincides with the vertical pivoting axis O101 to lie radially with respect to concave rack 901, and the angular relationship of principal axis OX to lever 831 is such that when lever 831 is positively located at a particular notch K as described in Vc(12), principal axis OX coincides with the corresponding radial axis of concave rack Y101.

(14) In accordance with Va(7) operational selection of lift destined angular alignment as described in IIg generally is derived from the movement of lever 831 about its curved path by operators handle 960 as follows.

(15) Operators fixed contactors 830 which each represent an angular alignment available to the lift cage are mounted by means of insulated support 858 within turret support bracket 953 such that all contactors are on a line at constant radius about O101 and corresponding points on adjacent contactors are at the same angular intervals as described in IIg(11), Vb(2) and Vc(11).

(16) Operators fixed contactors 833 which each represent an angular alignment available to the lift cage diametrically opposite to corresponding fixed contactors 830, are also mounted on insulated support 858 as described in Vc(15) and IIg(22) and (23).

(17) Operators moving contactors 832 and 834, as described in IIg(11) and (24) which serve fixed contactors 830 and 833 are spring loaded towards their contact faces and attached by means of insulated support 859 to lever 831 such that when lever 831 is positively located to suit a particular radial axis Y101 of the concave rack as described in Vc(13), full length contact between moving contactors 832 and 834 and fixed contactors 830y and 833y respectively is established.

(18) Upon selection of a particular destined angular alignment of the access lift as described in Vc(14) rotating cage segmental contactor 141 or 143 is energised by current originating at operators moving contactors 832 or 834, as a consequence of which all fixed angular selector contactor circuits, whose respective positional contactors 144 are in contact with the energised segmental contactor 141 or 143, are energised in addition to the circuit representing the required destined angular alignment, all remaining angular selector 832 or 834 to 144 circuits being dead.

(19) Each angular selector circuit is therefore wired to an indicating lamp 835, arranged in parallel with fixed contactors 830 and 833, such that when their respective circuits are energised the lamps are illuminated.

(20) Lamps 835 are arranged in a representative circular sequence on top of turret support bracket 953, such that when the access lift cage is in rotary motion angular movement of the lift cage is proved to the operator as successive lamps of a rotating group (five or six) illuminate and extinguish in sequence.

(21) The rotating group of illuminated lamps continues for the duration of the selected angular traverse, and when the destined alignment has been attained all lamps other than that representing the required angular 142 only becomes energised.

(d) Control turret 999

(1) Control Turret 999 is a complete electro-mechanical unit the purpose of which is to incorporate all of the various operators controls, indicators and interlocks necessary for the general operation of all traversing trolleys between lift cage and tower decks as described in II(d) and (e) generally.

(2) Turret 999 is supported by direct engagement with turret mounting 998 as described in Vc(7) to (10) and from Vc(11) to (17), and Vb(13), (21) to (24) takes up angular and vertical relationships to concave rack 901 which correspond directly with simultaneous destined angular and vertical relationships between lift and tower. Exercise of the various trolley controls is thereby co-ordinated to suit the prevailing situation of the access lift within the tower structure.

(3) In principle the mechanism of turret 999 is contrived to enable the transfer of tablets 970 between any slot of concave rack 901 and the body of turret 999 in a manner analogous with, and directly related to the transfer of pallets 88 between any parking position and lift cage 100, by the action of operators controls common to each tablet/pallet set of corresponding functions, to be applied only when appropriate conditions have been satisfied.

(4) The basis of control turret 999 is radial frame 997 formed as a cantilever arm to support flat horizontal sliding bolts 996 and associated details in side by side pairs symmetrically disposed about a common vertical plane which in all normal working circumstances coincides with the principal radial axis OX and the pivoting axis O101 of turret mounting 999.

(5) One pair of bolts 996 is provided in turret 999 for each deck 101 provided in the rotating cage 100 of the access lift, and all bolts 996 are constrained to horizontal paths, parallel to principal axis OX by means of guide slots P which slide over retainer pins 995, two slots P and pins 995 being provided to each bolt, the cross section of all bolts 995 being generally rectangular.

(6) The vertical spacing of adjacent side by side pairs of bolts 996 is equal to the vertical spacing of adjacent rack plates contained by concave rack 901 whilst the configuration of radial frame 997 with respect to mounting 998 pivot housing 995 and support bracket 953, is such that the underside face of each bolt can make sliding contact with upper face of an adjacent rack plate, when concave rack 901 is correctly located as described in Vb(19).

(7) The movements of sliding bolts 996 with respect to radial frame 997 correspond with comparable movements of trolleys 200 with respect to lift cage 200, the length of travel of bolts 996 being made equal to the projected radial length of two tablets 949 with the over travel Q necessary for working clearance to exit between rack plate inner edge and outer extremity of bolt 996 when withdrawn.

(8) Sliding bolts 996 are mechanically connected by pinned connecting links 994 and levers 993 to the corresponding operators trolley control handle 990 supported on shaft 992 from turret side plates 991, which are rigidly attached to turret radial frame 997, the configuration of the mechanism being such that the movements of bolts 996 occur in similar directions to movements of handles 990 made by the operator.

(9) Each operator's trolley control handle 990 is arranged to combine the directional translation alignment and pallet engagement contactors described in IIe(3) and (4); (9) and (10), and (21) respectively for its particular trolley, and is mounted within turret 999 at a situation representative to the position occupied by the trolley within lift cage 100.

(10) The general assembly of operators trolley control handle 990 is shown in FIGURE 20. Handle 990 is rigidly attached to shaft 992 which rotates in a boss integral with side plate 991, and is axially located by a flanged shoulder integral with and at the inner end of shaft 992. Lever 993 is arranged with a large diameter boss which bears against the flanged shoulder of shaft 992 for axial stability, and rotates on a spigot at the inner end of and integral with shaft 992, being retained by cap 989 rigidly attached to shaft 992.

(11) The amount of angular movement of lever 993 with respect to shaft 992 is limited by lug C formed in the abutting face of lever 993 which projects into recess D formed in the abutting face of the flanged shoulder of shaft 992. The difference in angular length between recess D and lug C is such that movement of operators live trolley traverse contactor 842 rigidly mounted on the shaft 992 by means of insulated support 889 under the action of operators handle 990 can be made to establish contact with either of alternative trolley directional contactors 840 or 841 which are rigidly attached to lever 993 by means of insulated support 885, contactors 840 and 841 being of common radius and mutually isolated.

(12) In accordance with Vd(8) therefore, when lever 990 is moved towards rack 901, under all normal circumstances contactor 840 is energised to initiate an outward traverse of its trolley, and when lever 990 is moved away from rack 901 contactor 841 is energised to initiate an inward traverse as described in IIe(4) contactors 840 and 841 being connected to their respective circuits by brushes 890 attached to but insulated from turret side plate 991.

(13) Translational alignment of trolleys 200, performed as described in IIe(6) to (13), is determined by movement of handle 990 beyond the limits described in Vd(11), by means of translation contactor 849 formed as an integral branch of contactor 842, which bears against fixed contactors 846, 847 and 848 mounted on insulated support 887 from trolley side plate 991. Fixed contactors 846, 847, 848 together subtend the arc necessary to maintain full contact with contactor 849 for the whole of the movement of handle 990, mid contactor 847 having a circumferential length which spans the point of outward travel of bolt 996 occurring at one tablet length plus over travel G as described in Va(7).

(14) To provide proof of trolley movement in response to the selective movement of control handle 990, indicator lamps 886, 887 and 888 are wired direct to contactors 846, 847 and 848 respectively and in parallel with trolley contactors 246, 247 and 248 respectively. When control handle 990 is moved to initiate a trolley movement therefore, as described in IIe(12) and (13) the lamp indicating the required destined alignment is illuminated.

(15) To provide proof of arrival of a trolley at its selected destined alignment, trolley contactor 245 driven as in IIe(6) is arranged to span the remaining trolley fixed contactors (i.e. other than the live destined circuit) and is energised from the trolley supply main by means of fixed contactor 269 which are closed by moving contactors 270 under the thrust of trolley relay solenoid 249. Since solenoid 249 is energised at a trolley alignment only as follows from IIe(11) contactor 245 is energised at a trolley alignment only and therefore the remaining indicator lamps are illuminated in addition to that representing the destined trolley alignment, (i.e. Lamps 886, 887 and 888 illuminate together when any selected trolley alignment has been established).

(16) Pallet engagement control which depends on switch 850 is described in IIe(17) to (21) only, is incorporated in the hollow centre of shaft 992, and comprises of contactors 884 and 883 supported by insulated core 882.

Contactor 884 is directly connected to live contactor 842 and contactor 883 is directly connected to contactor 881 which is supported outside and about shaft 992 by insulated liner 889 common to contactor 842.

(17) Connection between contactor 883 and the corresponding trolley magnetic release valve 228 is made by brush 880 attached to but insulated from turret side plate 991, contactors 883 and 884 being sprung apart to maintain engagement as described in IIe(18). Disengagement as described in IIe(19) and (20) is performed by pressing contactors 883 and 884 together between insulated support 879 and insulated plunger 878 sliding within handle 990, by means of dead beat trigger 850. Trigger 850 is pin jointed to handle 990 such that a downward movement denotes trolley disengagement and an upward movement denotes trolley engagement with a pallet 88, plunger 878 being returned by spring 850A to enable contactors 883 and 884 to disconnect.

(18) Current to operators trolley directional selector contactor 842 from which alignment selector contactor 849 and pallet engagement contactor 884 are energised for each trolley control handle, is supplied by means of brush 877 attached to and insulated from turret side plate 991.

*(e) Tablets and tablet gear 970*

(1) For every pallet 88 used in a given tower a marker tablet 970 is provided, a common identification number being allocated to both tablet and the pallet it represents, the function of each tablet being to register the location of the pallet represented within the confines of the tower at all times as indicated in Va(6) and to register also the occupied or unoccupied state of the corresponding pallet.

(2) The basis of each tablet 970 is formed by tablet body 969 which is essentially a rectangular prism the sides of which are grooved to engage with the parallel edges of any rack plate slot of concave rack 901, with a limited amount of vertical and lateral working clearance. The tablet may therefore, be freely moved about the longitudinal axis only of any slot, removal of a tablet from a slot necessitating longitudinal movement of the tablet.

(3) In accordance with Va(6) movement of tablets 970 between turret 999 and concave rack 901 is performed by sliding bolts 996, as described in Vd(4) to (8) the outer ends of which are formed as protruding tongs 971 rigidly attached thereto. Tongs 971 are arranged to align with the longitudinal axes at corresponding rack plate slots as described in Vb(2), and to engage with recesses L formed on the underside of tablet bodies 969 such that the remote end of recess L has slightly less depth than the nearer end.

(4) The longitudinal relationship of tong 971 with the corresponding bolt 996 is such that when bolt 996 is at the outer extreme of travel, the outer end of tong 971 is in contact with the inner end of an adjoining rack-plate rectangular slot, and wehn bolt 996 is at the inner extreme of travel the end of tong 971 clears the curved inner edge of rack plates by distance Q in accordance with Vd(7).

(5) The flat upper face of tong 971 is arranged at a slight down gradient towards concave rack to engage under tablet recess L, the plane of contact being arranged to lie within rack plate thickness, tong thickness being such as to prevent angular movement of turret 999 about axis O101 whilst extended into any rack plate slot, and tong length being such as to accommodate one tablet only, a view of the tong and bolt end being shown in FIGURE 19.

(6) Engagement and disengagement of bolts 996 with and from tablets 970 for the purpose given in ωVe(3), is carried out by means of electromagnets 875 attached to the outer ends of bolts 996 and permanent magnets 876 attached to the nearer ends of tablets 970, each being disposed across tablet width as shown in FIGURE 18, the cores of electro-magnets 875 and permanent magnets 876 being arranged to lie within the same horizontal planes as occupied by bolts 996 as described in Vd(6) and tablets 970.

(7) The longitudinal spacing of electro-magnets 876 with respect to bolts 996 is such that when any tablet 970 experiences full length support by tong 971 as described in Ve(5) contact is established with permanent magnet 876 the gradient of tong 971 facilitating close vertical alignment during approach to a tablet, and increasing clearance during the withdrawal of bolt 996 upon disengagement.

(8) The energising coils of electro-magnets 875 are wired across reversing trip switches 232 of the corresponding trolleys 200 the reversal of current arising from interaction of trolleys 200 and pallets 88 as described in IId(26) causing reversal of polarity of electro-magnets 875. The polarity of permanent magnets 876 are mutually arranged such that current flowing in direction E as specified in IId(26) causes attraction, and current flowing in direction D as specified in IId(26) causes repulsion, between bolts 996 and tablets 970 in every case.

(9) Since from IId(26) the operation of reversing switch 232 has been made dependent on engagement and disengagement between its trolley and any pallet, and from IIe(25) to (32) such operations are confined to the destined translation alignments available to the respective trolley, the tablet representing the particular pallet being served, can only undergo engagement or disengagement with the particular bolt as the corresponding operation in the tower is being completed. The resultant interaction between bolts 996 and tablets 970 therefore, provides proof of response of trolleys 200 to pallet engagement control and as a consequence further proof of response to translation control and also a means of timing succeeding operations of trolleys 200.

(10) The number allocated to each tablet is formed on the plan face as slotted numerals which penetrate the full thickness of tablet body 969, each numeral having an elongated form to facilitate viewing from an oblique angle and from the general direction of turret 999.

(11) To differentiate between occupied and unoccupied pallets 88 each tablet 970 is provided with a changeable aspect device formed as a transverse shutter 968 arranged to slide within tablet thickness. Shutter 968 is pierced by aperture(s) C spaced such that when at the left hand extremity of sliding across travel, each aperture coincides with an identical aperture slotted through the plan face of tablet body 969, at a point generally adjacent to the tablet number.

(12) When shutter 968 is at the left hand extremity of travel as described in Ve(11) tablet 970 indicates that the corresponding pallet is occupied, whilst, when at the right hand extremity and the apertures are blocked the tablet indicates that the corresponding pallet is unoccupied and available.

(13) The ends of shutters 968 extend beyond the sides of their respective bodies and are formed as upturn lugs J to engage with aspect changer forks 972, the sides of tablet bodies 969 being recessed as necessary to afford lateral clearance to lugs J whilst aspect shutters 968 are retained at either extremity of travel by means of sprung register detent 967 anchored to and within tablet body 969.

(14) For each sliding bolt 996 of turret 999 an aspect changing device is provided, which is mounted from turret radial frame 997 and which consists of a moveable fork 972 arranged for two way transverse operation with respect to the line of action of bolt 996 under one of the alternative opposite thrusts caused by double acting solenoid 874 when energised.

(15) Each aspect changer fork 972 is arranged to face in the direction of concave rack 901 and is so spaced as to engage with one lug J of any tablet aspect shutter 968 when the respective tablet 970 is supported by tong 971 as described in Ve(6) and (7), and the corresponding bolt 996 is at the inner extremity of travel and fully withdrawn.

(16) The internal shape of fork 972 is of convergent form, the greater width of which is such as to intercept lug J of the tablet aspect shutters for either extremity of travel as specified in Ve(12), the general spacing and configuration of lugs J and forks 972 being so arranged as to lie clear of the tablet apertures.

(17) Solenoids 874 are composed of two mutually opposite acting sets of windings both of which are associated with the corresponding lift deck relays 126 which work in conjunction with photo electric cells as described in IIc(15). The solenoid of relay 126 is arranged to be energised when light beams 125 reach photo electric cells 123, the resultant thrust causing relay fixed contactors 157 to be closed by relay moving contactors 158 when light beams 125 are broken by the presence of a vehicle, the solenoids relax, permitting contactors 157 and 158 to open, under return spring action.

(18) Relay moving contactors 158 are mechanically linked to moving contactors 159 which when solenoid thrust is relaxed, close fixed contactors 160 under return spring action, and open fixed contactors 160 when solenoid thrust is applied. Fixed contactors 157 and 160 are both wired to the lift power main such that when a vehicle is present at the corresponding lift position contactor 160 is energised, and when the same lift position is unoccupied contactor 157 is energised.

(19) Fixed contactors 160 are wired direct to the first winding of aspect changer solenoid 874 such that when energised as described in Ve(18) the resultant thrust causes fork 972 to move towards the left hand side. Fixed contactors 157 are wired in series with limit switch 873 arranged to close at the inner end of travel of corresponding turret bolt 996, to the second winding of solenoid 874, such that when energised the resultant thrust causes fork 972 to move towards the right hand side.

(20) Since for any pallet to enter the lift it is necessary that the associated bolt 996 shall have completed the corresponding movement in turret 999, lug J of the corresponding tablet will be intercepted by the respective fork 972 during the movement of the trolley controller, fork 972 accommodating itself to the particular attitude of the lug because (a) limit switch 873 is open until end of travel, and (b) no vehicle is present in lift before entry of pallet.

(21) If the pallet is occupied on entry therefore, the first solenoid winding is energised, and hence from Ve(19) and (20) aspect shutter 968 is moved to denote the corresponding tablet 970 as occupied, until the vehicle is removed from the lift. Should the vehicle be parked, the tablet maintains the occupied aspect by the action of detent 967, because the tablet leaves the fork before the pallet leaves the lift. Should the vehicle make its exit, and the pallet is thereby vacated, from Ve(19) the second winding of solenoid 874 is energised causing the vacant aspect to be set up in tablet 970, because lug J is still in engagement with fork 972 as no trolley controller movement has been made. The vacant aspect of the tablet would therefore prevail if the pallet were discharged from the lift whilst vacant, or until the pallet were reoccupied when the aspect would revert to the occupied state prior to discharge.

(22) To facilitate observation of tablets 970 representing pallets on the parking decks, the plates of concave rack 901 in the zone of fascia plate opening A are illuminated from below and behind by means of lamps 872 mounted from cabinet 950. The light beam therefrom is arranged to penetrate the slotted numerals described in Ve(10) and tablet aspect apertures K when shutter 968 is aligned as described in Ve(11) to provide a contrast with the shadows cast by rack plates and tablet bodies.

(23) To facilitate observation of tablets 970 representing pallets in the lift cage local illumination from above is provided adjacent to each bolt 996, by means of lamps 871 mounted on turret radial frame 997 short periscopes 973 being provided to project tablet images clear of the sides of bolts 996.

*(f) Parking plan control*

(1) From Vb(3), Vd(7) and (13) and Ve(4) and (7) any tablet 970 can be deposited at the remote end of any rack plate slot, normally served by the sliding bolts 996 of a particular side of turret radial frame 997 by the exercise of the appropriate trolley controls to represent and as a consequence of, the corresponding trolley/pallet operation performed in the outer annulus of the tower.

(2) From Vb(3), Vd(7) and (13) and Ve(4) and (7) also a further tablet 970 can be deposited as the near end of the same rack plate slot in Ve(1) normally served by the same or a vertically adjacent bolt 996 by the exercise of the appropriate trolley controls to represent and as a consequence of, the corresponding trolley/pallet operation performed at the inner annulus of the tower.

(3) A particular rack plate 902 can therefore be occupied by tablets deposited in succession as described in I$f$(1) to correspond with II$a$(4), and as described in II$f$(2) to correspond with II$a$(5), alternate radial pairs of rack plate slots only receiving a second tablet, such that the resultant rack plate/tablet pattern is geometrically analogous with the corresponding parking deck/pallet pattern indicated in FIGURE 1.

(4) Due to the configuration of the pallet parking plan in FIGURE 1, access to outer parking positions is subject to the conditions laid down in II$a$(7), (8) and (9) which are recognisable by the positions occupied by corresponding tablets on the particular rack plate 902, tablets 34 and 35 at the remote ends of slots A$e$O and B$o$O representing pallets 34 and 35 at outer positions of the parking axes A$e$ R$o$ and B$o$ R$e$ respectively, whilst tablet 37 at the nearer end of B$o$O represents obstructing pallet 37, for the example given in II$a$(9) to describe the general case.

(5) Since tablet 37 is between tablet 35 and an unoccupied bolt 996$o$ when all are in line with slot axis B$o$O, travel of bolt 996$o$ is confined to serving the nearer end of the particular rack plate slot such that the corresponding trolley is confined to serving the inner position of the corresponding parking axis, because from V$d$(13) translational selection is confined to an inner destined alignment.

(6) In a similar manner, an occupied bolt 996$o$ would be prevented from entering any rack plate slot containing two tablets, because translational selection in this case would be confined to lift destined alignment only, and therefore any laden trolley is prevented from entering any parking axis containing two pallets.

(7) Due to the geometrical configuration arising from tablet length and width, with respect to the lesser angle subtended by adjacent rack plate radial axes than the angle subtended by adjacent parking deck angles, tablet 34 on slot A$e$O is not necessarily obstructed by tablet 37 on slot B$o$O, in the manner of the obstruction of pallet 34 by pallet 37.

(8) There is therefore no comparable barrier to the entry of an occupied bolt 996$e$ into slot A$e$O with respect to tablet 37 such that from II$e$(6) to (13) and V$d$(13) the resultant movement of the corresponding trolley control handle could cause conflict between the associated trolley and pallet 37.

(9) To prevent the conflict described in V$f$(8) trolley control is exercised in accordance with the particular angular alignment of the lift, whereby the inner translation selection of all trolleys is overridden on alternate corresponding angular alignments of access lift and turret as follows.

(10) Trolley controller live brushes 877 are each energised from alternative parallel loops of the master control circuit initiated by means of tow rows of fixed contactors 836 and 837 mounted on insulated support 858 and concentric with turret pivoting axis O101 all fixed contactors being wired to the common master circuit. The angular spacing of fixed contactors 836 coincides with the radial axes AO, CO, EO, etc., whilst the angular spacing of fixed contactors 837 coincide with radial axes B$o$, D$o$, F$o$, etc., alternative contactors being at differing radial or otherwise arranged on separate circular paths, to avoid transverse overlap.

(11) Fixed contactors 836 and 837 are served by moving contactors 838 and 839 respectively which are mounted on operators angular selector lever 831 by means of insulated support 859, to establish contact with their respective fixed contactors only when lever 831 is appropriately aligned, such that contactors 838 and 839 are energised alterately at succeeding adjacent angular alignments.

(12) The trolley control master circuit is wired via contactor 869 from contactors 837 such that when energised therefrom, current to trolley controller brush 877 is taken direct from the master control circuit. From V$f$(10) and (11) therefore, trolley control handle 990 is energised permitting normal control on axes BO, DO, FO, etc., enabling both outer and inner parking positions to be utilised, subject to the safeguards described in V$f$(5) and (6).

(13) The trolley control master circuit is wired via contactor 869 also via alternative parallel loops which incorporate alternative limit switches 868 and 867 respectively from contactors 836, limit switch 868 being arranged to close at the outer extremity only, and limit switch 867 being arranged to close at the inner extremity only, of the travel of corresponding bolts 996.

(14) From V$f$(10), (11) and (13) therefore, control over trolley when aligned with axes A$o$, C$o$, E$o$, etc., is restricted by the action of limit switches 868 and 867 to the outer and inner extremities of travel of bolts 996, which correspond respectively with the outer annular and central lift destined translation alignments of their respective trolleys only.

(15) From V$f$(15) it follows that before effective control over a trolley 200$e$ is made available, it is necessary for the associated bolt 996$e$ to enter a rack plate slot A$e$O etc., to the full extent of travel (i.e. tong 971$e$ touches remote end of slot A$e$O etc.,) and hence either, or both, bolt 996$e$ or/and slot A$e$O shall be vacant of tablets, so denoting clear access to the corresponding outer parking position.

(16) In the event of bolt 996$e$ and slot A$e$O both containing a tablet, the travel of bolt 996$e$ into slot A$e$O would be limited by the length of the extra tablet such that limit switch 868 remains open, associated trolley 200$e$ remaining immobilised thereby, within lift cage, and since pallet engagement control would be also ineffective, from V$f$(8) the tablet on bolt 996$e$ would not disengage, and so could not be deposited at the nearer end of slot A$e$O.

(17) For the case which arises as described by example in V$f$(4) and II$a$(9) wherein pallet 34 on axis A$e$O is obstructed by pallet 37 on axis B$o$O, sideward extensions Q to bolts 996 are provided the faces of which intersect with faces of electro-magnets at an angle equal to that subtended by adjacent radial axes, and the overall width of which is such as to overlap the adjacent slot of the adjacent radial axis when tong 971 has entered a particular concave rack slot by one tablet length only.

(18) In the example indicated in V$f$(17) therefore, the passage of bolt 996$e$ along slot A$e$O towards tablet 34 would be terminated at the inner end of slot A$e$O because tablet 37 would be held at the inner end of slot B$o$O by tablet 35 and thus engage with side extension Q of bolt 996$e$, to prevent further bolt extension. Since limit switch 868 in this instance would remain open, a situation identical with V$f$(16) would, therefore prevail irrespective of the presence or absence of tablets on bolt 996$e$, and from V$f$(9) the removal of pallet 37 being made a prerequiste for access to pallet 34.

(g) *Pallet identification and identifiication gear*

(1) Whilst the mode of operation indicated in V$d$(3) and described in detail in V$d$, V$e$ and V$f$ generally, ensures that every movement and state of occupation of pallets 88 are registered and proved by the operations experienced by their respective tables 970, to prove that each tablet is maintaining its correct relative relationship to the corresponding tablet at all times, means are provided whereby the pallet in engagement with a particular trolley 200 can be identified independently of the action of the respective tablet gear.

(2) The mechanical elements of the pallet identification gear are described in II$d$(27) recessed pallet number plates 90 each being provided with three rows of projecting studs 91, 92, 93 spaced at intervals along concentric arcs about the central vertical axis of the number plate and situated on the flat arc of the recess, the numbers of studs in each row corresponding to the digital values of the number allocated to the particular pallet, respectively as shown in FIGURE 21.

(3) Digital studs and number plate bodies are both made of electrically conductive material, and when the respective pallet is in engagement with any trolley, the entire number plate 90 is electrified by means of current received from one or two alternative sprung contactors 280 and 281 mounted at diametrically opposite points at a common radial distance R from the central vertical axis of the trolley, both contactors being independently mounted and insulated from trolley frame 201 by means of insulated support 282, to lie on the trolley longitudinal axis.

(4) Contactors 280 and 281 are wired in series with white lamps 865 and red lamps 866 respectively to the master control circuit, whilst the flanged edge of each pallet number plate 90 is arranged to contain contactor 94 about the longitudinal axis towards one end, by distance R to permit contact with either of contactors 280 or 281, and is recessed diametrically opposite to avoid contact with both contactors 280 and 281 at Z.

(5) In normal operation the nose end of vehicles being parked are arranged to leave lift cage 100 via. No. 1 end. All pallet number plates are therefore arranged to receive current from contactors 280, such that white indicator lamp 865 is illuminated.

(6) In interchange movements the same pallet used in Vg(5) would be manipulated to the same position by a trolley from the opposite side of the lift cage, acting via the No. 2 end, and therefore pallet and trolley would establish a reversed relationship, such that the pallet number would receive current from contactor 281 of the particular trolley, thereby causing red indicator lamp 866 to be illuminated to indicate that a complementary interchange sequence would be required from the lift before the vehicle can make a normal exit from the lift.

(7) The number of a particular pallet is transmitted from the trolley with which it is engaged by means of trolley transmitter 234 as shown in FIGURE 22 and as described in IId(26) to align with pallet number plates 90 on the common central vertical axis of trolleys 200 and pallets 88. Each transmitter 234 consists essentially of three sprung, co-radial contactors 283 arranged to rotate about the common central vertical axis and spaced to the same respective radii as each row of number plate digital studs.

(8) Rotating contactors 283 are mounted by means of insulated support 284 to arm 285 rigidly attached to vertical shaft 286 which is pivoted to rotate in bearing 287 integral with, or rigidly attached to transmitter body 288 by the action of motor 289 mounted on transmitter end plate 290 through reduction gears 291 and 292.

(9) Transmitter body 288 is attached to trolley frame 201 by means of insulated support 282, the upper part being shaped to the outline described in IId(27) and to embrace the rotating contactor gear at the axial alignment necessary to enable contactors 283 to touch their respective digital studs during engagement of the trolley with any pallet.

(10) Upon engagement and from Vg(2), (3) and (9) therefore each contactor 283 will receive a fixed number of electrical impulses during every revolution of arm 285 which is appropriate to a digit of the pallet number the resultant signals being collected from their respective contactors 283 by means of sprung brushes 293 which bear against fixed continuous collector rings 294 separately attached to transmitter body 288 by means of insulated support 295 and concentric with the axis of rotation of shaft 286.

(11) Each fixed collector ring 294 is wired via an insulated terminal block 296 direct to a solenoid operated self cancelling counter device 69, as shown in FIGURE 23 mounted at the operator's end of control turret 999. Counters 69 are composed of single acting solenoid coil 87 arranged to withdraw core 86 against the opposed extending tendency of spring 85. Core 86 is pin jointed at 84 to pawl 83, shaped to rotate ratchet wheel 82 one tooth per solenoid impulse, under the slight down thrust of spring 81 anchored to counter frame 80.

(12) Ratchet wheel 82 is rigidly attached to indicator drum 79 which rotates on shaft 78 fixed to frame 80, against an opposing torque caused by spiral coil spring 77 anchored to frame 80 by means of pin 76 and contained in an annular recess formed in the drum to provide a return rotary action.

(13) The action of drum 79 under solenoid impulses is controlled by retaining pawl 75 pivoted at 74 and jointed at 73 to core 72 of solenoid 70 which is subject to an outward thrust from spring 71 in opposition to the withdrawing thrust of solenoid 70, such that accumulative rotation of drum 79 is maintained under successive impulses of each transmitter revolution.

(14) Solenoid 70 is wired direct to sprung contactor 297 attached to and insulated from transmitter body 288 which engages with live trip 298 incorporated into the rotating assembly and energised from the transmitter body by contactor 299 to establish contact in advance of all digital contactors 283. When solenoid 70 is energised therefore retainer pawl 75 is withdrawn to permit drum 70 to return to its datum attitude under the action of spiral spring 77, thereby cancelling the preceding indication.

(15) The circumference of each indicating drum 79 is marked by successive numerals spaced at the same equal angular intervals to the teeth of ratchet wheels 82, and as a consequence of Va(14) the action described in Vg(13) is limited to a number of ratchet wheel teeth which is equal to the number of digital studs in the corresponding row $n$ of the pallet number plate 90.

(16) The numeral exhibited at the maximum angular displacement achieved by indicator drum 79 therefore, is equal to the corresponding digit of the pallet number plate, such that by the combination of numerals displayed by the respective counters during every revolution of trolley transmitter contactors 283 the identity of the particular pallet is established, the cyclic cancellation due to solenoids 70 indicating that engagement is being maintained.

(h) *Parking procedure*

(1) To generally facilitate the withdrawal of vehicles for exit, the parked locations to be taken by vehicles on entry are allocated according to an anticipated time of departure the resultant parking duration being utilised to indicate into which zone of the tower a vehicle shall be placed.

(2) The extent of each tower parking zone is determined and defined as described in Vc(6) each zone receiving a particular identification symbol, whilst the length of parking duration required for a particular vehicle is specified according to a predetermined scale of fees by inserting coins of appropriate total value into a parking meter arranged to translate the duration specified into identification symbols common to the various parking zones of the tower.

(3) The symbol displayed by the parking meter for a particular vehicle therefore, indicates the zone of the tower into which the particular vehicle shall be placed, and is associated with the pallet used, for the duration of the parking operation only, in order to provide the reference from which the vehicle is retrieved for exit.

(4) In principle each parking meter 50 consists of a rotating disc member 51 geared to rotate once per 12 hours by the action of synchronous motor 49, and provided with a reference point 52 on its surface, the angular position of which with respect to fixed concentric circular scale 53 denotes time of day.

(5) Constrained to rotate with disc 51 is a series of studs 54a, 54b, 54c, etc., all of which are at a common radial distance to the axis of rotation each stud being set at an angular displacement with respect to a common radial datum, equal in magnitude to the angular displacement experienced by disc 51 during a particular parking duration.

(6) The common radial datum is constrained also to rotate with disc 51, and is positively defined by datum stop 55 arranged to lie on a different circular path to the duration studs, and constrained to rotate on the same axis of rotation is insulated radial pointer 56 carrying separate contactors 57 and 58, contactor 57 being arranged to engage with datum stud 55 when at the start of travel, and contactor 58 being arranged to engage with successive duration studs, with increasing displacement from the common datum.

(7) Pointer 56 is geared to rotate by the action of several coin slot mechanisms each of which is geared to a ratio proportional to the values of and is arranged to suit the physical features of differing types of coins. The combined action of two or more mechanisms is made cumulative such that the displacement caused to pointer 56 is at all times proportional to the total value inserted.

(8) Due to the action of motor 49, pointer 56 when resting against datum stop 55 is compelled to rotate with disc 51. The common drive from all coin slot mechanisms therefore incorporates a slipping device to accommodate movement of pointer 56 with respect to a datum point on the drive, when the drive is stationary.

(9) The slipping device consists of an electro-magnetic clutch 59 energised from the master control circuit by the action of limit switches 60 set to close by the insertion of coins into the slots of the parking meter and arranged to maintain the energising circuit to clutch 59 until reset, whereupon pointer 56 is restored to datum stop 55 by the action of a return spring 61 anchored to disc 51, in readiness for a succeeding parking operation.

(10) All duration studs 54a, 54b, etc., and datum stop 55 are insulated from disc 51 and electrically bonded to slip-ring 62 which is energised from the trolley master control circuit by means of fixed brush 63, such that duration studs 54a, 54b, 54c, etc., and datum stop 55 are continuously electrified.

(11) With the movement of pointer 56 in relation to disc 51 as a result of the actions described in V$h$(7) and (9), fromV$h$(6) and (10) a series of electrical impulses will be collected by contactor 58 during the passage of contactor 58 over successive duration studs 54a, 54b, etc., the number of impulses experienced being equal to the number of duration studs 54 with which contact was established during the travel of pointer 56.

(12) Contactor 58 is wired via slipring 64 and fixed brush 65 to solenoid 87a of an independent counter device 69a which is identical in principal to counter device 69 as described in V$g$(11) to (14) ratchet wheel 82a and indicating drum 79a being arranged to display successive identification symbols with successive solenoid impulses.

(13) The final symbol displayed by counter 69a therefore corresponds with the duration stud 54 last in contact with contactor 58, and from V$h$(5) indicates the identity of the parking zone into which the particular vehicle shall be placed, the final symbol being retained in view by the action of retainer pawl 75a.

(14) Counter 69a is incorporated into the same framing as counter 69 to form an integral unit as shown in FIGURE 23, which is mounted on turret frame 997 to lie behind an aperture B formed in turret indicator panel 974 to occupy, in conjunction with trolley indicator lamps 886, 887 and 888, and pallet lamps 865 and 866 as described in V$d$(14) and V$g$(4) respectively a position representative of that occupied by the corresponding trolley 200 within the access lift cage 100.

(15) From V$h$(14) any one parking meter may be required to serve more than one lift deck. The interconnecting circuit from each parking meter is therefore wired to contactor 891 mounted on insulated support 829 at the same relationship to rack plate 904 as described in V$b$(22).

(16) The complementary interconnecting circuits to counters 69a are wired to contactors 892 mounted vertically in line on insulated support 809 to the same spacing as successive adjacent rack plates, and arranged such that when concave rack 901 is aligned as described in V$b$(24) contact is established with the upper contactor 892 a particular parking meter 50 thereby being interconnected with the upper counter of turret 999 when the upper lift deck is aligned with access level E, and similarly for successive lower levels.

(17) Parking meters 50 are situated in both tower exit bays and adjacent to the exit paths of each bay, and a full set of contactors 891 and 892 are provided to interconnect the particular meters used the counters 70a corresponding to the lift positions offered.

(18) To provide the reference necessary for the withdrawal of a particular vehicle for exit, the combined pallet number and parking zone indication displayed at the corresponding aperture B of turret indicator panel 974, is repeated at the associated parking meter 50 by means of counters 69b and 69c.

(19) Counters 69b and 69c work on the same principle as counters 69 and 69a operating solenoids 87b, 70b and 87c and 70c being wired to work off the same electrical impulse sequences as solenoids 87 and 70 and 87a and 70a respectively, the action of counters 70b and 70c being arranged to compose and maintain corresponding typographical digits and symbols into the same order as displayed at the turret aperture.

(20) The mechanism of parking meters 50 is contrived to synchronise or isolate the instantaneous typographical composition described in V$h$(19) to operate a ticket printing and issuing device acting in conjunction with the coin slot mechanism specified in V$h$(6) such that in acknowledgement for coins inserted a ticket is issued bearing an identification reference which registers the parked location to be taken up by the particular incoming vehicle, after which pointer 56 is allowed to reset as described in V$h$(9).

(21) Since parking meter counters 69b only, are required to work in conjunction with more than one turret counter 69 the interconnecting circuits to solenoids 87b and 70b are wired from contactors 893 and 894 respectively mounted on insulated support 829 at the same relationship to rack plate 904 as described in V$b$(22) whilst the complementary parallel interconnecting circuits from turret counter solenoids 87 and 70 are wired to contactors 895 and 896 respectively mounted on insulated support 809 at the same vertical alignments as contactors 892 and described in V$h$(16).

(22) From V$h$(21) therefore, parking meter counters 69b repeat the indication displayed by the turret counter 69 which coincides with the lift deck in alignment with access floor level E only and since a parking meter is provided for each exit lane a full set of contactors 893 to 896 is provided to interconnect particular parking meters used with corresponding lift positions offered.

(23) In the case of counters 69 and 69b the counting sequences are cancelled at the end of cycle by the action of solenoids 70 and 70b, whereas from V$h$(13) the counting sequences of the associated counters 69a and 69c respectively are retained. To provide the cancellation necessary before a succeeding parking operation therefore solenoids 70a and 70c are wired to parking meter pointer contactor 57 such that when pointer 56 is released according to V$h$(9) and (20), contact is established with datum stop 55 as described in V$h$(6) as a consequence of which solenoids 73a and 73c are energised, to retract retainer pawls 76a and 76c.

(24) Solenoids 70a and 70c are interconnected by means of contactors 897 and 898 arranged as for contactors 896 and 895 respectively to accommodate the various lift levels and parking meters involved, and since a vertical lift traverse is necessary to permit a successive vehicular entry, contact between contactors 897 and 898 breaks, such that retainer pawl 75a is maintained in engagement until the preceeding vertical alignment of the lift is restored whilst retainer pawls 75c are released in readiness for the succeeding entry.

*(j) Multiple trolley control 986*

(1) To facilitate operations at spare pallet bays 700 in which all trolleys 200 from one or both sides of lift cage 100 each withdraw or deposit a pallet 88 by means of identical operational sequences, and to facilitate similar operations elsewhere within the tower when comparable circumstances arise, provision is made in control turret 999 whereby all of the respective parallel operations involved, are co-ordinated to take place under unified control.

(2) Co-ordination of translational control for all trolleys on each side of the lift is obtained by mechanically interlocking the respective trolley control handles by means of vertical bolts 986 the inner edges of which are arranged to engage with slots V formed in horizontal bolts 996 at a common longitudinal relationship to tongs 971 for all bolts.

(3) Vertical bolts 986 are supported on cross-heads 985 and constrained to a vertical path with respect thereto by means of pins 987 which engage in slots C formed in bolts 986, and arranged such that engagement with bolts 996 described in $Vj(2)$ takes place at the lower limit of travel only.

(4) For the independent trolley control condition normally maintained, vertical bolts 986 are retained at the upper limit of travel by means of compression springs 988 housed in and acting against cross heads 995, which bear against an integral abutment on each bolt 986.

(5) To permit the passage of horizontal bolts 996 necessary for independent trolley control, the inner edges of vertical bolts 986 are slotted at H the shape and spacing of slots H being such as to clear the outer edges or bolts 996 when bolts are at the upper limit of travel only.

(6) Cross heads 985 are constrained to move about paths parallel with and equal in length to the paths of horizontal bolts 996 with respect to turret 999 by means of intermediate slide rails 984 and 983 attached to radial frame 997 such that when bolts 986 are aligned as decribed in $Vj(2)$ and (3) movement of bolts 996, 986 and cross heads 985 can take place as a unit over the full travel of bolts 996.

(7) Operator's control over the action of bolts 986 is exercised by means of cams 982 axially located from, and constrained to rotate in cross head 985 the cam profile being arranged to bear against a flat horizontal face defined by downward extension W formed integral with each bolt 986, and shaped to cause full up to down travel of their respective bolts as described in $Vj(4)$, (5) and (3) by means of a partial rotation.

(8) The axis of rotation of each cam 982 is arranged to coincide with the longitudinal axis of the respective lower intermediate slide rail 983 which is constrained to rotate in and axially located by radial frame 997 by the action of operators handle 980 situated below the turret indicator panel 974, slide rail 983 and cam 982 being interlinked to maintain a fixed rotary relationship whilst permitting relative axial movement equivalent to and associated with $Vj(6)$, by means of key 981.

(9) For multiple control to be established, due to $Vj(2)$ all horizontal bolts 996 are required to be at identical translation alignments with respect to radial frame 997. To facilitate operator's control over vertical bolts 986 therefore, cross heads 985 are arranged to bear against stops 979 rigidly attached to radial frame 997, under the action of return spring 978 anchored to radial frame 997.

(10) The spacing of stop 979 is such that when cross head 985 is aligned as described in $Vj(9)$ vertical bolts 986 are at the same longitudinal relationship with radial frame 997 as slots V, of bolts 996, when bolts 996 are at the inner extremities of travel. It therefore follows that all trolley controlled handles 990 are necessarily set for central lift translational alignments before multiple trolley control can be introduced.

(11) Co-ordination of pallet engagement control for all trolleys on each side of the lift is obtained by electrically interconnected all energising circuits to trolley magnet release valves 228 by means of bridge contractors 852 rigidly attached to and insulated from lower intermediate slide rail 983 by bush 853 and arranged to establish contact with spur contactors 854 formed in each of the circuits joining trolley controller contractors 883 with their respective magnetic release valves 228.

(12) Spur contactors 854 are supported from radial frame 997 by means of insulated supports 855 in groups corresponding to all trolleys on each side of the lift, the shape and angular relationship of bridge contactor 853, with respect to cam 982 being such that contact is established between contactors 852 and 854 when vertical bolt 986 is at the lower extremity of travel.

(13) Multiple trolley translational control and multiple pallet engagement control are therefore inaugurated simultaneously by the manipulation of operators handle 980 such that for each side of the lift cage all trolleys 200 can be operated together by the use of one trolley controller, the triggers 988 of the remaining controllers being left at the engaged position.

*(k) Lift interchange control.—(See FIGURES 24 and 25)*

(1) Interchange movements carried out by the access lift at any one vertical alignment of hoisting carriage 300 entail reversed translation trolley transverses with respect to lift cage 100 in conjunction with diametrically opposite angular alignments of lift cage 100 with respect to the tower, when compared respectively with the movements normally performed, to serve any one radial parking axis.

(2) Also as a consequence of interchange working, for any radial axis AO, BO, CO etc., the respective parking axes AoO, BoO, CoO, etc., which are normally served a trolley 200o, ecch trolley taking up a reversed direcwhilst the respective parking axes AeO, BeO, CeO, etc., normally served by a trolley 200e, are served instead by a trolley 200o, eamh trolley taking up a reversed directional relationship to the exchanged pallets 88o and 88e involved.

(3) To maintain the principle of general operational control outlined in $Vd(3)$ in the circumstances described in $Vk(2)$ therefore, it follows that the engagement of a trolley 200o with a pallet 88e or vice versa, necessitates the engagement of the corresponding turret bolt 996o with the corresponding tablet 970e or vice versa, respectively.

(4) To satisfy the condition given in $Vk(3)$ the entire mechanism embraced by turret radial frame 997 is arranged to move laterally with respect to the normal radial axis of turret 999 by a distance on either side of the radial axis equal to the perpendicular distance between the parallel central longitudinal axes of each radial pair of concave rack plate rectangular slots such that tongs 971o may enter slots AeO, BeO, CeO etc., and alternatively that tongs 971e may enter slots AoO, BoO, CoO, etc., according to the direction of lateral movement made.

(5) Lateral movement of turret radial frame 997 with respect to the normal radial axes AO, BO, CO, etc., of the concave rack is provided for by integral sliding surfaces formed across the base of radial frame 997 to engage with integral mating surfaces formed at the top of turret mounting 998, the sliding members being proportioned to allow the extent of slide travel defined in $Vk(4)$ to either side of the normal radial axis as described described in $Vd(4)$.

(6) When in the attitude necessary for a tong 971o to enter a slot AeO, BeO, CeO etc., the opposite tong 971e is no longer capable of achieving alignment with any slot, and similarly when tongs 971e are alternatively aligned to enter slots AoO, BoO, CoO etc., tong 971o is no longer capable of achieving alignment with any slot.

(7) Movement of non-aligned tongs 971 with respect to concave rack 901 is therefore restricted, by means of gate 977 which is rigidly attached to turret mounting 998 and shaped to engage with slots V2 formed in bolts 996 when bolts 996 are at the inner extremity of travel with respect to radial frame 997.

(8) In order to cover all lateral alignments other than the normal central radial alignment of radial frame 997, also, horizontal bolts 996 are extended outward behind slots V2 to intercept the extension of the nonalignable bolts 996 as soon as lateral movement of radial frame 997 has been made.

(9) For interchange working operational control of trolleys 200 is inaugurated by means of intermediate reversing contactors 844 and 845 as described in IIe(5) and operational control of lift cage angular alignment is inaugurated by transferring angular selection from contactors 830 to complementary contactors 833 as described in IIg(22) to (27).

(10) The lateral movements of turret radial frame 997 with respect to turret mounting 998 as described in V$k$(3) to (5) are utilized to perform the contactor changes described in V$k$(9) as follows.

(11) Reversing contactors 844 and 845 are rigidly attached to the underside of radial frame by means of insulated support 856 such that each contactor lies on a separate lateral path. When radial frame 997 is aligned centrally as described in V$d$(4) contactors 844 and 845, establish contact with fixed contactors 844$n$ and 845$n$ suitably spaced for the central alignment and rigidly attached to turret mounting 998 by means of insulated support 857, thereby permitting normal trolley control.

(12) When at the alignment described in V$k$(11) also, control is established between contactor 843 which is wired to and energised from the master control circuit being mounted on insulated support 856 also, and contactor 843$n$ mounted also on insulated support 857 and wired to moving angular selector contactor 831, thereby permitting normal angular selective control.

(13) When at either extremity of lateral travel as described in V$k$(4) contact as described in V$k$(11) and (12) is broken, contact instead being established between contactors 844 and 845; and contacts 845$i$ and 844$i$, contactors 844$i$ and 845$i$ being mounted on insulated support 857 to suit both alternative relative alignments, contactors 844$i$ being electrically bonded to contactors 845$n$ each group of fixed contactors being wired to the respective trolley 200$i$ thereby permitting interchange trolley control.

(14) When at the alignment described in V$k$(13) also, contact as described in V$k$(12) is broken, contact instead being established between live contactor 843 and one of contactors 843$i$, contactors 843$i$ being also mounted on insulated support 857 to suit both alternative relative alignments, both contactors 843$i$ being wired direct to moving angular selector contactor 834, thereby permitting interchange angular selective control.

(15) Operator's control over the lateral movement of turret 999 is exercised by means of operating handle 964 anchored to turret mounting 998 by pinned link 965 to act on turret radial frame 997 an indexing detent 966 between items 998 and 997 being provided to register and maintain chosen lateral alignment at each of the three alternative relationships involved.

(16) From V$k$(9) to (14) therefore, the conditions necessary for normal or interchange working may be selected, whilst from V$k$(3) to (6) and V$e$, $f$ and $g$ generally, all interchange movement carried out by trolleys 200 within the tower are appropriately registered the change of working conditions depending on the operator's use of selector lever 964 only.

Having described my invention wholly in the context of a mechanical car parking installation to which purpose the invention owes the form disclosed herein, I desire it to be understood that in such a form the device is but a preferred embodiment within the general scope of the invention, since it will be readily obvious to anyone acquainted with the art, that provided the modular sizes of such an installation are not exceeded, unit loads of other kinds can be handled by the means which are described and therefore it is intended that application of the invention shall not be confined solely to the parking of automobiles, but can embrace a general warehousing function also.

What I claim is:

1. A multi-story storage installation which is comprised of a storage tower structure formed essentially as a stationary regularly spaced vertical series of identical annular storage decks whose circular inner boundaries lie concentric to a common vertical axis, and which is served throughout by means of an access lift incorporating one or more lift cage deck members of sufficient dimensions to accommodate at least two unit loads which are especially automobiles although not necessarily so, side by side with their longitudinal axes parallel to, equidistant from and on both sides of a common vertical plane, the lift cage being constrained by means of a hoisting carriage to move within the storage structure in such a manner that the common vertical axis of the storage structure is at all times contained by the common vertical plane of the lift cage so as to enable the lift cage to be elevated and rotated with respect to the storage structure, each lift deck being formed to come into close direct proximity with the inner boundaries of the annular storage decks such that wherever a lift deck can be brought into vertical alignment with a storage deck, two or more parallel access paths to the storage positions become simultaneously established, whereupon by means of traversing trolleys incorporated into the lift deck, the unit loads can be manipulated longitudinally into and out of their storage positions along axes which are parallel to and equidistant from regularly spaced diametral axes of the annular storage decks and which lie tangentially to a circle whose diameter is defined by the parallel parking axes of the unit loads.

2. A tangential multi-story storage installation according to claim 1 wherein the rotatable cage of the access lift is constrained to move within the storage structure by means of a hoisting carriage formed as an open rectangular framed vehicle which embraces the rotatable lift cage symmetrically in and about a single vertical diametral plane and wherein the lift cage is constrained to rotate and is supported by means of bearings anchored co-axially within upper and lower diametrally disposed cross members of the hoisting carriage frame such that by means of a motorised friction roller mounted on the frame of the hoisting carriage and acting against and within a cylindrical drive ring concentrically atached to the lift cage and by means of radially acting retractable bolt mechanism mounted on the hoisting carriage frame arranged to engage with a notched selector ring concentrically attached to the lift cage, the lift cage can be moved into and positively located at any one of a number of predefined angular relationships to the storage structure, control over rotating and angular locating mechanism being co-ordinated in such a manner that the rotatable lift cage will take up a selected predefined angular relationship to the storage structure in the direction which requires least angular movement.

3. A tangential multi-story storage installation according to claim 2 which embodies self propelled transporter trolleys each of which is arranged to traverse a track to any one of several storage places lying on the track and remote from a central origin, each trolley being controlled through a taut trailing cable leading from the central origin and which is accommodated and tensioned for the locomotion of the trolley by means of an appropriately biased cable reeling drum, the cable reeling being coupled to drive an electrical contactor device in a manner which is directly related to the distance traversed by the trolley and by means of which electrical contactor device, precise stopping location of the trolley at a predefined storage place can be selectively predetermined at a remote operational control point.

4. A tangential multi-story storage installation according to claim 3 wherein the self propelled transporter trolley is contrived to elevate and depress its frame beneath a loadable pallet in order to engage or disengage the loadable pallet and wherein the self propelled transporter trolley is remotely controllable and automatically interlocked to deposit or collect the loadable pallets only at the predefined storage places along the track and is automatically interlocked to run with its frame in the elevated attitude only when in engagement with a pallet or to run with its frame in the depressed attitude only when completely disengaged from such pallets.

5. An installation according to claim 4 wherein the identity of a pallet in engagement with a trolley is derived from electrified digital studs set in concentric arcs within a recessed number plate lying within the thickness of the pallet and arranged to align and engage with a motorised rotary collector contactor device carried by the trolley in such a manner that during engagement an electrical impulse is produced at each stud in the course of every revolution of the collector contactor device, the number of such impulses received by the respective contactors of the collector device during each revolution being transmitted to and counted at a remote point by by means of independently acting electro-magnetic ratchet counter devices contrived to display digits equal in numerical value to the number of digital studs provided in the respective concentric arcs of the particular pallet number plate, the pallet number plate being formed to receive electrifying current from one of two alternative sources within the trolley such that the particular source drawn upon by the pallet number plate provides an indication of the direction in which the pallet is disposed with respect to the trolley.

6. A tangential multi-story storage installation according to claim 4 wherein the self-propelled transporter trolleys are arranged to run along, within and to be guided by linear recesses of a common rectangular or symmetrically trapezoidal transverse profile which are formed within and below the surface of the respective lift deck member and within the fabric of, below the surface of and along the parking axes of each annular storage deck member and wherein the self-propelled trolleys act in conjunction with rectangular and flat pallets of limited rigidity and of limited vertical thickness which are provided for the transportation of unit loads between the lift cage and the storage places of the annular storage decks.

7. A tangential multi-story storage installation according to claim 2 wherein upright side members of the hoisting carriage are arranged to lie outside the loading access paths of the rotatable lift cage when the common vertical diametral plane of the lift cage is in angular alignment with either of its adjacent oblique predefined angular relationships with the vertical diametral plane of the hoisting carriage and wherein the upright side members of the hoisting carriage are arranged to lie between the parallel equidistant and collaterally disposed loading access paths when the common vertical plane of the lift cage is in alignment with the vertical diametral plane of the hoisting carriage.

8. A tangential multi-story storage installation according to claim 7 wherein the annular deck members of the storage structure are slotted at their inner boundaries and in a common vertical diametral plane to provide a passage for the hoisting carriage, the hoisting carriage being constrained to a vertical path by means of cylindrically treaded centrally flanged guide wheels acting in conjunction with diametrally opposite pairs of collaterally disposed rails anchored along and within the slotted passages of and to suitably disposed columns of the storage structure, and in such a manner that a uniform gap is maintained between, behind and along each pair of collaterally disposed rails, the hoisting carriage being supported and suspended within the storage structure by means of independent cables acting in conjunction with balance weights collectively appropriate in magnitude to the unladen moving weight of the lift, the lift cage being propelled by means of a single independent haulage cable arranged in an equalising configuration to act on the remote and opposite ends of the hoisting carriage frame through drawbars interlinked with independent spring loaded brake mechanisms within the frame of the hoisting carriage and contrived to apply associated brake blocks which are arranged to act normally with respect to the inward and outward faces of the adjacent collateral pair of twin rails upon relaxation of tension in the haulage cable.

9. A tangential multi-story storage installation according to claim 8 wherein opposite ends of the single haulage cable wind on to separate and independently motorised winding drums of which the greater drum constitutes a main winding drive and the lesser drum constitutes an inching drive, the main winding drive being coupled by means of a differential gearing system to separate motors in such a manner that either motor can be made to act independently of the other or that the motors can be made to act together at will, each motor being provided with an automatic brake arranged to prevent rotation of the motor whenever the particular motor is non-operative, the inching drive being permanently coupled to a motor which is controlled to act automatically in conjunction with the extension of retractable motorised bolts mounted on the frame of the hoisting carriage, into engagement with appropriately situated catchplates anchored to the storage structure for the expeditious alignment and positive location of the lift cage at any storey at and for the completion of any vertical traverse by the lift.

10. A multi-story car parking installation according to claim 9 in which the winding gear of the lift incorporates a load weighing feature which consists essentially of a sprung subframe disposed in such a manner as to react to variations in haulage cable tension, displacement of the subframe according to haulage cable tension being applied by means of interlinked electrical apparatus to regulate the torque applied by or on the winding motors such that a fixed relationship between winding torque and total moving weight of the lift cage is maintained for all states of motion experienced by the lift and in which lift lifting, lowering and stopping movements are established by, at and are sustained at predetermined steady rates by means of apparatus contrived to selectively regulate the torque to be exerted by or on the lift winding motors, the lift winding motors being also arranged to operate singly or together in the order of power capability under the control of automatically selective apparatus which is contrived to apply to the winding gear motive power whose magnitude is related to predetermined lengths of vertical travel to be made by the cage of the lift.

11. A multi-story car parking installation according to claim 10 wherein selective operation of the separate but differentially coupled winding motors is derived automatically from the preselective energisation of appropriate control circuits to the respective separate winding motors by means of an operators multiple selector contactor acting in conjunction with independent parking deck selector contactors which are energised according to lift vertical displacement from a live moving contactor which is driven through suitably proportioned reduction gearing from the reeling drum of a taut hanging cable between the lift cage and the associated parking structure.

12. A multi-story car parking installation according to claim 11 wherein the energy imparted to vehicles as a consequence of their manipulation at the installation by means of elevating machinery and due to parking the vehicles at levels which are higher than the level at which entry of the vehicles to the installation has been made, is partly recovered before exit of the vehicles by the regenerative operation of the elevating machinery whenever vehicles are being lowered and wherein the energy thus recovered is absorbed for temporary storage by means of a motored flywheel apparatus which is also arranged to act as a generator to render the recovered energy available for subsequent use as and when required.

13. A tangential multi-story car parking installation according to claim 6 wherein each deck of the rotatable lift cage can be served in turn by means of motorised articulated ramps contrived to align with flat rectangular pallets resting on the lift deck which is being served in order to provide a smooth vehicular access path to and from convergent sectors of a street level annular deck member of the storage structure and which are arranged to provide for the transient simultaneous accommodation of several vehicles arriving at or departing from the parking installation and whose access to the rotatable lift cage is controlled by means of motorised gates which are contrived to block the vehicular paths when closed and to align with handrails of the aligned lift deck when open, the motorised ramps and motorised gates being mutually interlocked to avoid conflict of movement and interlocked to act only upon appropriate angular and vertical alignment being established with the rotatable lift cage and in all other circumstances to remain withdrawn from and clear of the lift space.

14. A tangential multi-story storage installation according to claim 6 which incorporates closely pitched racks into which flat pallets which might otherwise obstruct access to further pallets on a common storage floor and situated beyond an inward pallet position with respect to the direction of access can be withdrawn in order to avoid unnecessary obstruction of access to the stated further pallets when the pallet from the inward position is unoccupied, the closely pitched racks being motorised and contrived to embrace service tracks and being so constrained and controlled with respect to the service tracks that the flat pallets when unoccupied can be deposited therein or withdrawn therefrom by means respectively of normal depressing or normal elevating movement carried out in conjunction with traverses to or from a suitably predetermined alignment along the service tracks by flat topped self propelled trolleys.

15. A tangential multi-story storage installation according to claim 14 wherein the service tracks have the same transverse profile as and are arranged to align with, all deck recesses of the rotatable lift cage whenever the rotatable lift cage is at a particular position within the storage structure such that upon alignment with the service tracks being established by the lift cage, unoccupied flat pallets can be simultaneously transferred between lift cage and motorised racks by normal operation of the flat topped self propelled trolleys acting from all decks of the rotatable lift cage, trolleys, lift cage and motorised racks being mutually interlocked to act only at appropriate mutual alignment between lift cage and service tracks, only when all trolleys on a particular side of the lift cage are either totally free of pallets or totally in engagement with pallets and only when every engaged pallet is unoccupied.

16. A tangential multi-story storage installation according to claim 1 in which the various relationships to be taken up by the rotatable lift cage of the access lift with respect to the storage structure are predetermined at an operational control console by means of mechanically associated elements formed to act in a manner geometrically analogous to and to represent the structural and manipulative elements of the storage installation, the mechanically associated elements being mechanically interlinked with electrical contactor gear to control the respective lift motions in a manner which will bring about a relationship between lift cage and storage structure corresponding with relationships selectively set up at the control console between analogous mechanically associated constituent elements of the control console.

17. A tangential multi-story storage installation according to claim 6 in which the self propelled trolleys are independently controlled by means of respective single operators control handles, each control handle incorporating electrical contactors arranged to act in conjunction with the taut trailing cable reeling drum driven contactor gear, traction motor starter gear and frame elevating gear of its particular trolley, such that the extent and direction of resultant trolley movement along a parking axis track and pallet engagement or disengagement representative in extent and direction and movements appropriate to pallet engagement or disengagement when made by the operators control handle.

18. A tangential multi-story storage installation according to claim 16 in which the location of the storage pallets within and throughout the multi-storey structure is denoted by the positions into which moveable marker tablets, each representing a particular pallet, are placed within a slotted rack contrived to represent the multi-storey structure, by means of an electro-magnetic-mechanical device constrained to move with respect to the slotted rack in a manner analogous to the movement of the manipulative access lift with respect to the multi-storey structure and contrived to engage or disengage the marker tablets in a manner analogous to and dependent on the engagement or disengagement respectively of the represented pallets by means of the self propelled trolleys acting from the rotatable cage of the access lift, the occupied or unoccupied state of the represented pallets being noted by means of an aspect changing shutter in the respective tablets which is arranged register according to the state of occupation detected during the transient entry of pallets into the lift cage and under the action of an appropriately acting fork and lug engagement on the shutter contrived to occur whenever such a marker tablet is caused to enter the electro-magnetic-mechanical device.

19. A tangential multi-story storage installation according to claim 18 wherein control over each of the self propelled trolleys is exerted through the medium of an electro-magnetic-mechanical device which embodies single respective operators trolley control handles interlinked with travelling bolts provided for the transfer of marker tablets between various points within the slotted rack in such a manner that the length of bolt travel with respect to any slot of the slotted rack is directly related to the translational selector contactor spacing in the single operators trolley control handles in such a manner that bolt travel in extent equal to a given number of tablet lengths will initiate a corresponding trolley traverse along the track of a parking axis in extent equal to the same number of pallet lengths, each of the travelling bolts carrying an electro-magnet whose polarity is controlled by means of a pallet detector device mounted on the respective trolley and which is arranged to align with and to attract or repel suitable permanent magnets incorporated into the marker tablets in a manner dependent on engagement or disengagement respectively between the respective trolley and the represented pallet acting within the structure of the installation.

20. A tangential multi-story storage installation according to claim 16 wherein the operators control console is contrived to represent the storage tower structure by means of a concave rack arranged to slide along a path parallel to the axis of concavity and to represent the rotatable lift cage by means of an electro-magnetic-mechanical device in the form of a turret arranged to swing about the axis of concavity of the concave rack and which incorporates travelling bolts contrived to represent the respective trolleys of the rotatable lift cage and to interact with the marker tablets in and along slots of the concave rack on axes which lie parallel and equidistant from equally spaced radial axes subtended from the axis of concavity in such a manner that effective operational control over the motions of the self propelled transporter trolleys is limited to occur in those areas of the annular storage decks not obstructed by pallets and by means of further associated contactor gear, to restrict the deposition of pallets into the inner annular storage area in order to maintain a common parking plan vertically in line through all levels of the storage tower structure.

21. A tangential multi-story car parking installation according to claim 20 wherein particular vehicles stored on flat pallets and deposited into zones of the associated storage tower structure which are allocated with respect to anticipated times of vehicular departure, are retrieved according to an expendible reference ticket issued and allocated on entry into the installation by means of a parking meter contrived to establish the appropriate parking zone from the proposed parking duration for the particular vehicle and to record a reference given to the appropriate parking zone in conjunction with the identity of the pallet which is to be used for the parking of the particular vehicle.

22. A tangential multi-story car parking installation according to claim 20 wherein all travelling bolts on the one side of the electro-magnetic-mechanical device are identically notched for mechanically interlocking by means of a single notched vertically sliding bolt in such a manner that all bolts of an interlocked group act in unison, the vertical bolt being carried parallel to the movement of the travelling bolts on a parallel sliding crosshead from the turret frame, simultaneous operation of the travelling bolts as a group thereby establishing corresponding multiple operation of all trolleys from the corresopnding side of the rotatable lift cage, the electro-magnetic-mechanical turret device having electrical contactors so interconnected and so disposed as to cause translational traverses of the self propelled transporter trolleys to take place in a direction reversed to the direction of normal operation with respect to the rotatable lift cage in association with a direction of rotation which is contrary to normal rotation with respect to the tower storage structure in order to provide for an interchanged mode of operation by the lift, the interchanged mode of operation becoming established upon the completion of a laterally off-setting movement of the turret frame with respect to its pivot mounting whereby one travelling bolt of a collateral pair is made to engage that marker tablet which is normally served by the other travelling bolt in order to denote at the operators control console the complementary resultant relationship thereby established between the corresponding transporter trolleys and pallets within the storage structure.

References Cited

UNITED STATES PATENTS

| | | | |
|---|---|---|---|
| 1,593,665 | 7/1926 | Moores | 214—16.1 |
| 2,715,970 | 8/1955 | Carr | 214—16.1 |
| 2,785,809 | 3/1957 | Riblet | 214—16.1 |
| 2,846,186 | 8/1958 | Smith | 214—16.1 |
| 2,873,089 | 2/1959 | Porter | 214—16.1 |
| 3,032,212 | 5/1962 | Gaskin et al. | 214—16.1 |
| 3,115,257 | 12/1963 | Kubik | 214—16 |
| 3,263,831 | 8/1966 | Francis | 214—16 |

FOREIGN PATENTS

| | | |
|---|---|---|
| 1,192,994 | 4/1959 | France. |
| 914,316 | 7/1954 | Germany. |

ROBERT G. SHERIDAN, *Primary Examiner.*

R. B. JOHNSON, *Assistant Examiner.*